United States Patent
Sasaki et al.

(10) Patent No.: US 9,930,353 B2
(45) Date of Patent: Mar. 27, 2018

(54) IMAGE DECODING DEVICE AND METHOD

(71) Applicant: SONY CORPORATION, Tokyo (JP)

(72) Inventors: Masao Sasaki, Kanagawa (JP); Takashi Fukuyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/774,768

(22) PCT Filed: Mar. 14, 2014

(86) PCT No.: PCT/JP2014/056831
§ 371 (c)(1),
(2) Date: Sep. 11, 2015

(87) PCT Pub. No.: WO2014/156708
PCT Pub. Date: Oct. 2, 2014

(65) Prior Publication Data
US 2016/0044323 A1    Feb. 11, 2016

(30) Foreign Application Priority Data
Mar. 29, 2013    (JP) .................................. 2013-074759

(51) Int. Cl.
*H04N 19/44*    (2014.01)
*H04N 19/129*    (2014.01)
(Continued)

(52) U.S. Cl.
CPC ........... *H04N 19/44* (2014.11); *H04N 19/117* (2014.11); *H04N 19/129* (2014.11);
(Continued)

(58) Field of Classification Search
CPC .......................................... H04N 19/00–19/99
See application file for complete search history.

(56) References Cited

U.S. PATENT DOCUMENTS

| | | | |
|---|---|---|---|
| 7,236,177 B2* | 6/2007 | Sih ........................ | H04N 19/423 345/537 |
| 2003/0026487 A1* | 2/2003 | Wada .................... | H04N 9/7921 382/232 |

(Continued)

FOREIGN PATENT DOCUMENTS

JP    2006-279574    10/2006

OTHER PUBLICATIONS

Benjamin Bross, et al., High Efficiency Video Coding (HEVC) text specification draft 10 (for FDIS & Last Call), Joint Collaborative Team on Video Coding (JCT-VC) of ITU-T SG 16 WP 3 and ISO/IEC JTC 1/SC 29/WG 11, Jan. 14-23, 2013, pp. 1-310, 12$^{th}$ Meeting: Geneva, CH.

(Continued)

*Primary Examiner* — Sean Motsinger
(74) *Attorney, Agent, or Firm* — Paratus Law Group, PLLC

(57) ABSTRACT

The present disclosure relates to an image decoding device and method capable of suppressing an increase in an encoding or decoding load. The present disclosure includes: a decoding section configured to decode encoded data obtained by encoding image data for each of a plurality of certain areas obtained by dividing a picture using a plurality of blocks obtained by dividing the area as processing units, for each of the areas; a reordering section configured to reorder decoding results of the encoded data of the respective blocks obtained for the respective areas by the decoding section in a raster scan order of the entire picture; and a transform section configured to transform the decoding results of the respective blocks reordered in the raster scan order of the entire picture by the reordering section and generate decoded image data. The present disclosure can be applied to the image decoding device.

14 Claims, 34 Drawing Sheets

(51) Int. Cl.
*H04N 19/96* (2014.01)
*H04N 19/117* (2014.01)
*H04N 19/174* (2014.01)
*H04N 19/167* (2014.01)
*H04N 19/423* (2014.01)
*H04N 19/86* (2014.01)
*H04N 19/172* (2014.01)
*H04N 19/176* (2014.01)
*H04N 19/60* (2014.01)

(52) U.S. Cl.
CPC ......... *H04N 19/167* (2014.11); *H04N 19/172* (2014.11); *H04N 19/174* (2014.11); *H04N 19/176* (2014.11); *H04N 19/423* (2014.11); *H04N 19/60* (2014.11); *H04N 19/86* (2014.11); *H04N 19/96* (2014.11)

(56) References Cited

U.S. PATENT DOCUMENTS

| | | | | |
|---|---|---|---|---|
| 2005/0286775 | A1* | 12/2005 | Jeffrey | G06T 1/60 382/232 |
| 2008/0055119 | A1* | 3/2008 | Sadowski | H04N 19/176 341/50 |
| 2011/0051812 | A1* | 3/2011 | Tanaka | H04N 19/176 375/240.12 |
| 2012/0183074 | A1* | 7/2012 | Fuldseth | H04N 19/119 375/240.24 |
| 2012/0294542 | A1* | 11/2012 | Lee | H04N 19/44 382/233 |
| 2013/0070849 | A1* | 3/2013 | Schlanger | H04N 7/32 375/240.12 |
| 2013/0279817 | A1* | 10/2013 | Wan | H04N 19/13 382/233 |
| 2014/0003525 | A1* | 1/2014 | Fuldseth | H04N 19/176 375/240.16 |
| 2015/0146794 | A1* | 5/2015 | Hoang | H04N 19/96 375/240.24 |
| 2016/0044323 | A1* | 2/2016 | Sasaki | H04N 19/129 382/233 |

OTHER PUBLICATIONS

Gary J. Sullivan, et al., Video Compression—From Concepts to the H.264/AVC Standard, Proceedings of the IEEE, vol. 93, No. 1, Jan. 2005, pp. 18-31.

Hendry, et al., AHG 4: Asynchronous Tile Output, Joint Collaborative Team on Video Coding (JCT-VC) of ITU-T SG 16 WP 3 and ISO/IEC JTC 1/SC 29/WG 11, Jul. 11-20, 2012, pp. 1-8, 10th Meeting: Stockholm, SE.

* cited by examiner

IMAGE DECODING DEVICE AND METHOD

CROSS REFERENCE TO PRIOR APPLICATION

This application is a National Stage Patent Application of PCT International Patent Application No. PCT/JP2014/056831 (filed on Mar. 14, 2014) under 35 U.S.C. § 371, which claims priority to Japanese Patent Application No. 2013-074759 (filed on Mar. 29, 2013), which are all hereby incorporated by reference in their entirety.

TECHNICAL FIELD

The present disclosure relates to an image decoding device and method, and more particularly, to an image decoding device and method, which are capable of suppressing an increase in a decoding load.

BACKGROUND ART

Recently, devices for compressing and encoding an image by adopting an encoding scheme of handling image information digitally and performing compression by an orthogonal transform such as a discrete cosine transform and motion compensation using image information-specific redundancy for the purpose of information transmission and accumulation with high efficiency when the image information is handled digitally have become widespread. Moving Picture Experts Group (MPEG) and the like are examples of such encoding schemes.

Particularly, MPEG 2 (International Organization for Standardization (ISO)/International Electrotechnical Commission (IEC) 13818-2) is a standard that is defined as a general-purpose image encoding scheme, and covers interlaced scan images, progressive scan images, standard resolution images, and high definition images. MPEG 2 is now being widely used in a wide range of applications such as professional use and consumer use. Using the MPEG 2 compression scheme, for example, in the case of an interlaced scan image of a standard resolution having 720×480 pixels, a coding amount (bit rate) of 4 to 8 Mbps is allocated. Further, using the MPEG 2 compression scheme, for example, in the case of an interlaced scan image of a high resolution having 1920×1088 pixels, a coding amount (bit rate) of 18 to 22 Mbps is allocated. Thus, it is possible to implement a high compression rate and an excellent image quality.

MPEG 2 is mainly intended for high definition coding suitable for broadcasting but does not support an encoding scheme having a coding amount (bit rate) lower than that of MPEG 1, that is, an encoding scheme of a high compression rate. For example, with the spread of mobile terminals, it is considered that the need for such an encoding scheme will increase in the future, and thus an MPEG 4 encoding scheme has been standardized. An international standard for an image encoding scheme was approved as ISO/IEC 14496-2 in December, 1998.

Further, in recent years, standards such as H.26L (International Telecommunication Union Telecommunication Standardization Sector Q6/16 Video Coding Expert Group (ITU-T Q6/16 VCEG)) for the purpose of image encoding for video conferences have been standardized. H.26L requires a larger computation amount for encoding and decoding than in existing encoding schemes such as MPEG 2 or MPEG 4, but is known to implement high encoding efficiency. Further, currently, as one activity of MPEG 4, standardization of incorporating even a function that is not supported in H.26L and implementing high encoding efficiency based on H.26L has been performed as a Joint Model of Enhanced-Compression Video Coding.

As a standardization schedule, an international standard called H.264 and MPEG-4 Part 10 (Advanced Video Coding (hereinafter referred to as "AVC") was established in March, 2003.

Furthermore, as an extension of H.264/AVC, Fidelity Range Extension (FRExt) including an encoding tool necessary for professional use such as RGB or 4:2:2 or 4:4:4 or 8×8 DCT and a quantization matrix which are specified in MPEG-2 was standardized in February, 2005. As a result, H.264/AVC has become an encoding scheme capable of also expressing film noise included in movies well and is being used in a wide range of applications such as Blu-Ray Discs (trademark).

However, in recent years, there is an increasing need for high compression rate encoding capable of compressing an image of about 4000×2000 pixels (also referred to as a 4K image), which is 4 times that of a high-definition image, or delivering a high-definition image in a limited transmission capacity environment such as the Internet. To this end, improvements in encoding efficiency have been under continuous review by Video Coding Experts Group (VCEG) under ITU-T.

In this regard, currently, in order to further improve the encoding efficiency to be higher than in AVC, Joint Collaboration Team-Video Coding (JCTVC), which is a joint standardization organization of ITU-T and ISO/IEC, has been standardizing an encoding scheme called High Efficiency Video Coding (HEVC). A committee draft that is a draft specification for the HEVC standard was issued in January, 2013 (see Non-Patent Literature 1).

In the case of HEVC, generally, information transmitted from an encoding side to a decoding side includes not only a syntax for an I slice but also a syntax element for a P slice or a B slice, that is, a syntax element related to an inter-screen process.

Meanwhile, in AVC or HEVC, there is a method in which one picture is divided into a plurality of tiles, and encoding and decoding are performed in units of tiles. In this case, processes such as lossless encoding/lossless decoding, prediction, an orthogonal transform/inverse orthogonal transform, and quantization/inverse quantization are performed in units of tiles (without depending on another tile).

Thus, for example, in the decoding process, encoded data undergoes lossless decoding in units of tiles, and the prediction and transform processes are performed in units of tiles. Here, a processing period of time of the lossless decoding depends on a data amount but the prediction and transform processes are substantially constant without being significantly affected by a data amount. For this reason, in order to absorb a variation in the processing period of time of the lossless decoding, it was necessary to accumulate a decoding result in a memory.

CITATION LIST

Non-Patent Literature

Non-Patent Literature 1: Benjamin Bross, Woo-Jin Han, Gary J. Sullivan, Jens-Rainer Ohm, Gary J. Sullivan, Ye-Kui Wang, Thomas Wiegand, "High Efficiency Video Coding (HEVC) text specification draft 10 (for FDIS & Consent)," JCTVC-L1003_v4, Joint Collaborative Team on Video Coding (JCT-VC) of ITU-T SG 16 WP 3 and ISO/IEC JTC 1/SC 29/WG 11 12th Meeting: Geneva, CH, 14-23 Jan. 2013

SUMMARY OF INVENTION

Technical Problem

However, a filter process such as a deblock filter on decoded image data obtained through the prediction and transform processes is performed in a raster scan order of the entire picture for each block such as a macroblock or a coding unit in which a tile is divided into a plurality of pieces. In other words, the filter process differs in a processing order from the lossless decoding, the transform process, and the like. For this reason, it was necessary to accumulate data in a memory and perform reordering before the filter process. Thus, the number of accesses to a memory was likely to increase, leading to a load increase.

The present disclosure was made in light of the foregoing, and it is desirable to suppress an increase in an encoding or decoding load.

Solution to Problem

According to an aspect of the present technology, there is provided an image decoding device including: a decoding section configured to decode encoded data obtained by encoding image data for each of a plurality of certain areas obtained by dividing a picture using a plurality of blocks obtained by dividing the area as processing units, for each of the areas;

a reordering section configured to reorder decoding results of the encoded data of the respective blocks obtained for the respective areas by the decoding section in a raster scan order of the entire picture; and a transform section configured to transform the decoding results of the respective blocks reordered in the raster scan order of the entire picture by the reordering section and generate decoded image data.

The area may be a tile or a slice.

The reordering section may include a storage section configured to store the decoding results, and reorder the decoding results of e the respective blocks by storing the decoding results of the respective blocks obtained for the respective areas by the decoding section in the storage section, and reading the decoding results of the respective blocks from the storage section in the raster scan order of the entire picture.

The storage section may allocate a fixed length area to each of the blocks, and store the decoding result of each of the blocks at an address corresponding to a position of each of the blocks in the picture.

The storage section may sequentially store the decoding results of the respective blocks, and manage start addresses of the decoding results of the respective blocks.

The storage section may sequentially store the decoding results of the respective blocks, and manage start addresses of the decoding results of the respective blocks at left ends of the respective areas.

The image decoding device may further include a filter section configured to sequentially perform a filter process on the decoded image data of the respective blocks generated by the transform section.

The filter process may be a deblock filter process.

The encoded data may be data obtained by encoding differential image data serving as data of a differential image between an image of the image data and a prediction image. The decoding section may obtain the differential image data as the decoding result by decoding the encoded data. The transform section may transform the differential image data into the decoded image data by generating the prediction image and adding the generated prediction image to the differential image of the differential image data.

The encoded data may be data obtained by encoding coefficient data obtained by performing an orthogonal transform on the differential image data. The decoding section may obtain the coefficient data as the decoding result by decoding the encoded data. The transform section may transform the coefficient image data into the decoded image data by performing an inverse orthogonal transform on the coefficient data to generate the differential image data, generating the prediction image, and adding the generated prediction image to the differential image of the generated differential image data.

The encoded data may be data obtained by encoding quantization coefficient data obtained by quantizing the coefficient data. The decoding section may obtain the quantization coefficient data as the decoding result by decoding the encoded data. The transform section may transform the quantization coefficient image data into the decoded image data by performing inverse quantization on the quantization coefficient data to generate the coefficient data, performing an inverse orthogonal transform on the generated coefficient data to generate the differential image data, generating the prediction image, and adding the generated prediction image to the differential image of the generated differential image data.

The decoding section may perform lossless decoding on the encoded data.

The decoding section may perform variable length decoding on the encoded data.

The decoding section may perform arithmetic decoding on the encoded data.

According to an aspect of the present technology, there is provided an image decoding method including: decoding encoded data obtained by encoding image data for each of a plurality of certain areas obtained by dividing a picture using a plurality of blocks obtained by dividing the area as processing units, for each of the areas; reordering decoding results of the encoded data of the respective blocks obtained for the respective areas in a raster scan order of the entire picture; and transforming the decoding results of the respective blocks reordered in the raster scan order of the entire picture and generating decoded image data.

According to one aspect of the present technology, encoded data obtained by encoding image data for each of a plurality of areas obtained by dividing a picture using a plurality of blocks obtained by dividing the area as a processing unit is decoded for each area, a decoding result of the encoded data of each block obtained for each area is reordered in a raster scan order of the entire picture, and the decoding result of each block reordered in the raster scan order of the entire picture is converted to generate decoded image data.

Advantageous Effects of Invention

According to the present disclosure, it is possible to encode and decode an image. Particularly, it is possible to suppress an increase in an encoding or decoding load.

DESCRIPTION OF EMBODIMENTS

Hereinafter, modes (hereinafter referred to as "embodiments") for carrying out the present disclosure will be described. The description will proceed in the following order.

1. Overview
2. First embodiment (image encoding device)
3. Second embodiment (image decoding device)
4. Third embodiment (multi-view image encoding device and multi-view image decoding device)
5. Fourth embodiment (layered image encoding device and layered image decoding device)
6. Fifth embodiment (computer)
7. Application examples
8. Application examples of scalable video coding 1. Overview <Encoding Scheme>

Hereinafter, the present technology will be described in connection with an application to image encoding and decoding of a High Efficiency Video Coding (HEVC) scheme.

<Coding Unit>

In an Advanced Video Coding (AVC) scheme, a hierarchical structure based on a macroblock and a sub macroblock is defined. However, a macroblock of 16×16 pixels is not optimal for a large image frame such as a Ultra High Definition (UHD) (4000×2000 pixels) serving as a target of a next generation encoding scheme.

Figure 1:
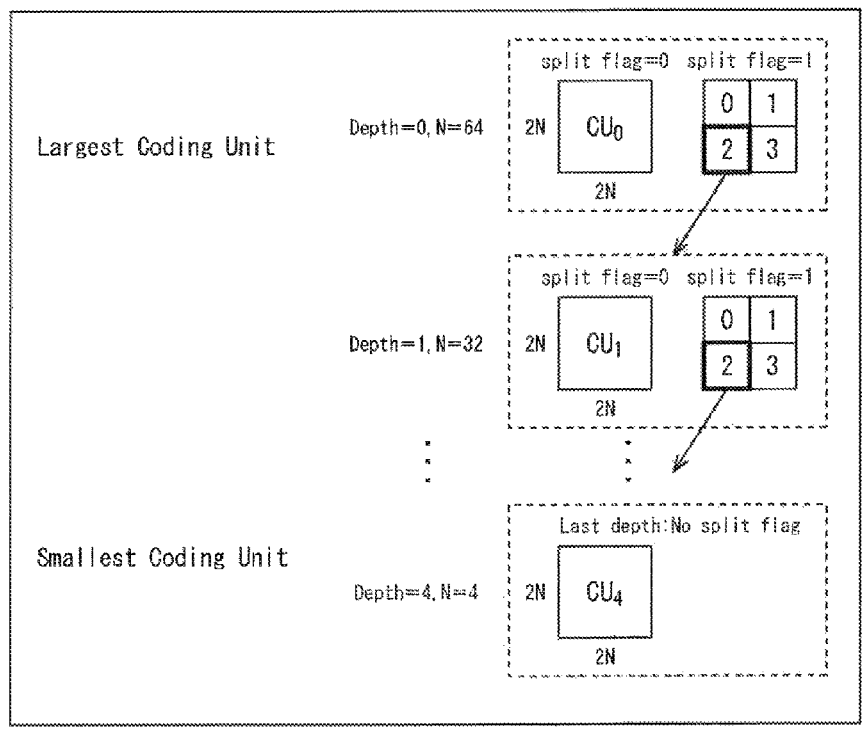
FIG. 1 is a diagram for describing an example of a configuration of a coding unit.

On the other hand, in the HEVC scheme, a coding unit (CU) is defined as illustrated in FIG. 1.

A CU is also referred to as a coding tree block (CTB), and serves as a partial area of an image of a picture unit undertaking the same role of a macroblock in the AVC scheme. The macroblock of ACU is fixed to a size of 16×16 pixels, but the CU of HEVC is not fixed to a certain size but designated in image compression information in each sequence.

For example, a largest coding unit (LCU) and a smallest coding unit (SCU) of a CU are specified in a sequence parameter set (SPS) included in encoded data to be output.

As split-flag=1 is set in a range in which each LCU is not smaller than an SCU, a coding unit can be divided into CUs having a smaller size. For example, a size of an LCU is 64×64, and a largest scalable depth is 5. For example, as shown in FIG. 1 A CU of a size of 2N×2N is divided into CUs having a size of N×N serving as a layer that is one-level lower when a value of split flag is 1.

Further, a CU is divided in prediction units (PUs) that are areas (partial areas of an image of a picture unit) serving as processing units of intra or inter prediction, and divided into transform units (TUs) that are areas (partial areas of an image of a picture unit) serving as processing units of orthogonal transform. In the HEVC, in addition to 4×4 and 8×8, orthogonal transform of 16×16 and 32×32 can be used as processing units.

As in the HEVC, in the case of an encoding scheme in which a CU is defined and various kinds of processes are performed in units of CUs, in the AVC, a macroblock can be considered to correspond to an LCU, and a block (sub block) can be considered to correspond to a CU. Further, in the AVC, a motion compensation block can be considered to correspond to a PU. Here, since a CU has a hierarchical structure, a size of an LCU of a topmost layer is commonly set to be larger than a macroblock in the AVC, for example, such as 64×64 pixels.

Thus, hereinafter, an LCU is assumed to include a macroblock in the AVC, and a CU is assumed to include a block (sub block) in the AVC. In other words, a "block" used in the following description indicates an arbitrary partial area in a picture, and, for example, a size, a shape, and characteristics thereof are not limited. In other words, a "block" includes an arbitrary area (a processing unit) such as a TU, a PU, an SCU, a CU, an LCU, a sub block, a macroblock, or a slice. Of course, a "block" includes other partial areas (processing units) as well. When it is necessary to limit a size, a processing unit, or the like, it will be appropriately described.

Here, the CTU (Coding Tree Unit) is a unit that includes a CTB (Coding Tree Block) of the LCU (maximal CU) and parameters at the time of performing the process at the LCU base (level). In addition, the CU (Coding Unit) configuring the CTU is a unit that includes a CB (Coding Block) and parameters at the time of performing the process at the CU base (level).

<Mode Selection>

Meanwhile, in the AVC and HEVC encoding schemes or the like, in order to achieve high encoding efficiency, it is important to select an appropriate prediction mode.

As an example of such a selection method, there is a method implemented in reference software (found at http://iphome.hhi.de/suehring/tml/index.htm) of H.264/MPEG-4 AVC called a joint model (JM).

In the JM, as will be described later, it is possible to select two mode determination methods, that is, a high complexity mode and a low complexity mode. In both modes, cost function values related to respective prediction modes are calculated, and a prediction mode having a smaller cost function value is selected as an optimal mode for a current block serving as a processing target.

A cost function in the high complexity mode is represented as in the following Formula (1):

[Math. 1]

$$\text{Cost(Mode} \in \Omega) = D + \lambda * R \qquad (1)$$

Here, Ω indicates a universal set of candidate modes for encoding a current block, and D indicates differential energy between a decoded image and an input image when encoding is performed in a corresponding prediction mode. λ indicates Lagrange's undetermined multiplier given as a function of a quantization parameter. R indicates a total coding amount including an orthogonal transform coefficient when encoding is performed in a prediction mode.

In other words, in order to perform encoding in the high complexity mode, it is necessary to perform a temporary encoding process once by all candidate modes in order to calculate the parameters D and R, and thus a large computation amount is required.

A cost function in the low complexity mode is represented by the following Formula (2):

[Math. 2]

$$\text{Cost(Mode} \in \Omega) = D + \text{QP2Quant(QP)} * \text{HeaderBit} \qquad (2)$$

Here, D is different from that of the high complexity mode and indicates differential energy between a prediction image and an input image. QP2Quant (QP) is given as a function of a quantization parameter QP, and HeaderBit indicates a coding amount related to information belonging to a header such as a motion vector or a mode including no orthogonal transform coefficient.

In other words, in the low complexity mode, it is necessary to perform a prediction process for respective candidate modes, but since a decoded image is not necessary, it is unnecessary to perform an encoding process. Thus, it is possible to implement a computation amount smaller than that in the high complexity mode.

<Area Division>

Meanwhile, in HEVC, it is possible to perform parallel processing based on a tile or wavefront parallel processing in addition to a slice that is also defined in AVC.

Even in the case of HEVC, similarly to AVC, a slice functions as a unit in which an encoding process is performed in a raster scan order, and is an area in which a picture is divided into a plurality of pieces. Here, in HEVC, slice division can be performed only in units of LCUs.

Figure 2:
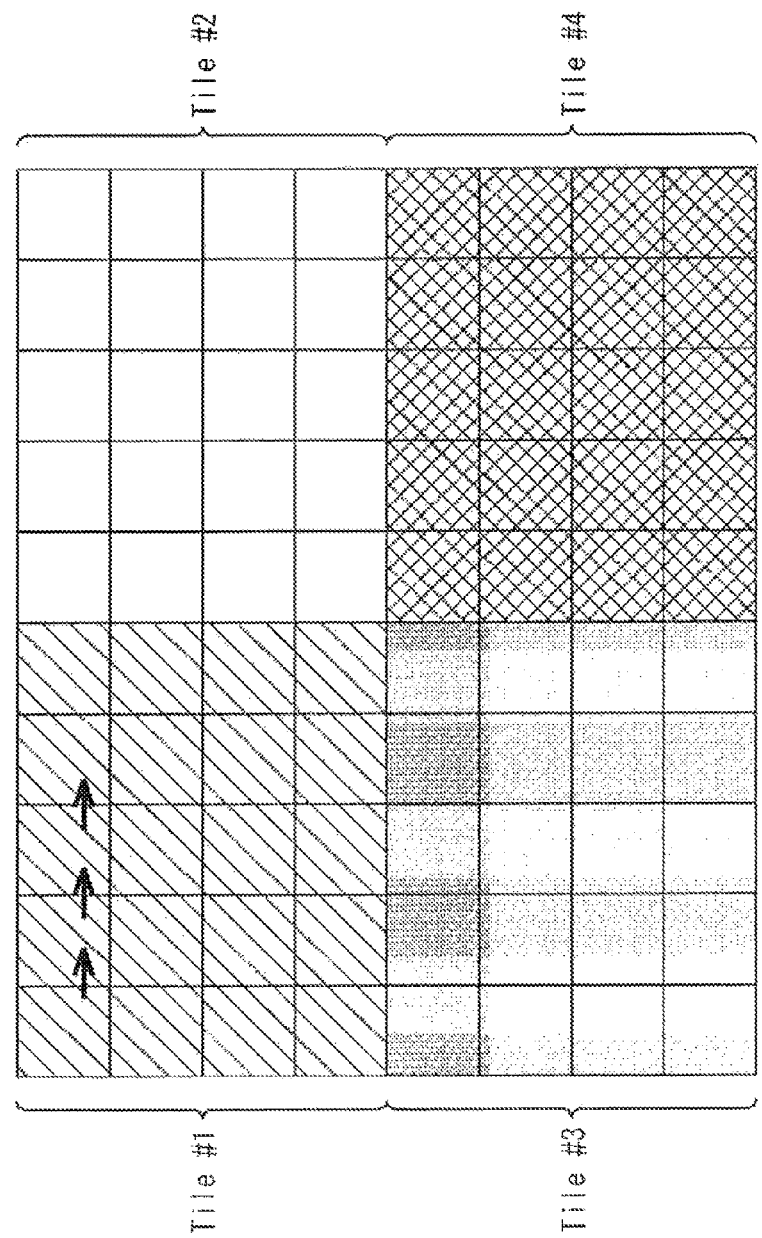
FIG. 2 is a diagram for describing an example of a tile.

FIG. 2 illustrates an example of a tile defined in HEVC. A tile is an area obtained by dividing a picture in units of LCUs, similarly to a slice. Here, a slice is an area obtained by dividing a picture so that LCUs are processed in a raster scan order, whereas a tile is an area obtained by dividing a picture into arbitrary rectangles as illustrated in FIG. 2.

In FIG. 2, the entire square indicates a picture, and a small square indicates an LCU. Further, groups of LCUs having different patterns indicate tiles. For example, a slice including 4×4 LCUs on the upper left which is indicated by a hatched pattern is a first tile (Tile#1) of the picture. A tile including 4×4 LCUs on the upper right which is indicated by a white background is a second tile (Tile#2) of the picture. A tile including 4×4 LCUs on the lower left which is indicated by a gray background is a third tile (Tile#3) of the picture. A tile including 4×4 LCUs on the lower right which is indicated by a mesh pattern is a fourth tile (Tile#4) of the picture. Of course, the number of tiles or LCUs formed in the picture and a tile division method are arbitrary and not limited to the example of FIG. 2.

In each tile formed as described above, the LCUs are processed in the raster scan order. Since the tile has a shorter boundary length than the slice, the tile has a characteristic in which a decrease in encoding efficiency by screen division is small.

The slices or tiles divided as described above can be processed independently of one another since there is no dependence relation of prediction, CABAC, or the like in encoding or decoding. In other words, for example, data of slices (or tiles) can be processed in parallel using different central processing units (CPUs) (or different cores).

<Decoding Process>

Figure 3:
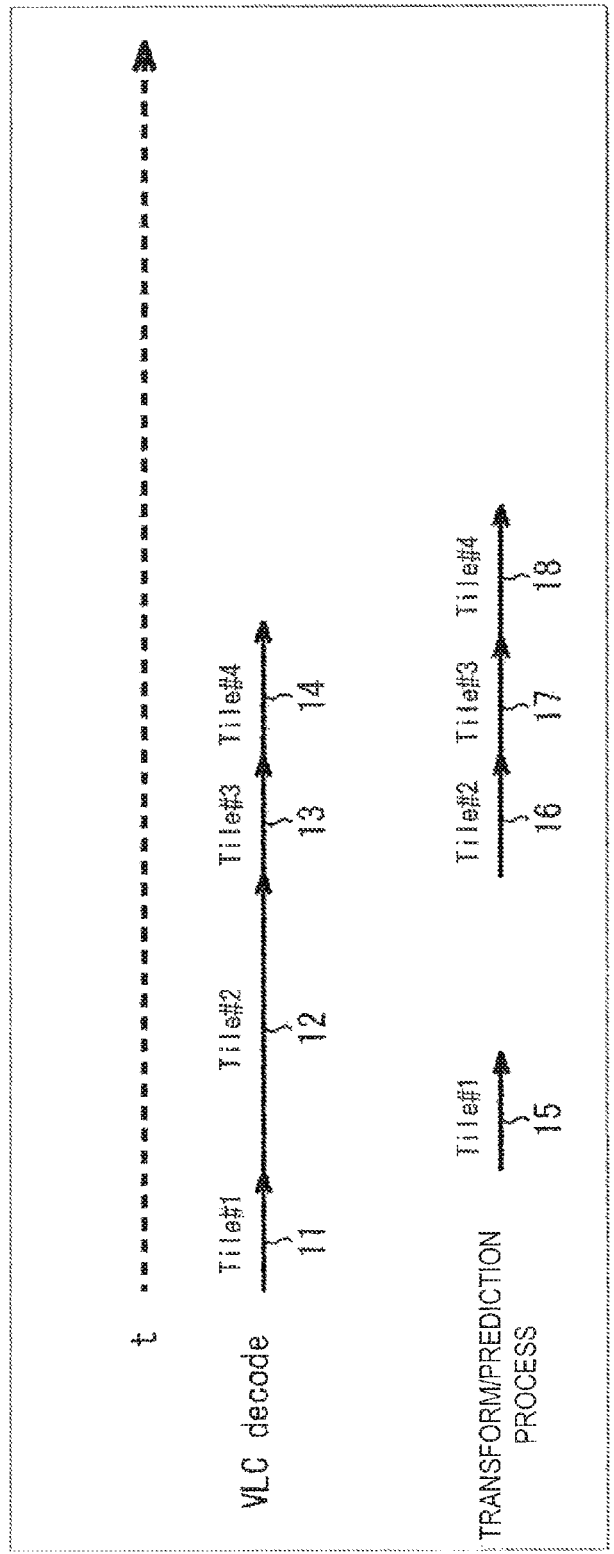
FIG. 3 is a diagram illustrating an example of an execution form of a decoding process and a transform/prediction process.

Meanwhile, in the decoder of HEVC, the processes such as the lossless decoding, the inverse quantization, the inverse orthogonal transform, and the prediction process (the intra prediction or the inter prediction) are sequentially performed. FIG. 3 illustrates an example of the flow of the process when encoded data of a picture divided into four tiles illustrated in FIG. 2 is decoded. In FIG. 3, a process of each tile is indicated by an arrow. Here, variable length decoding is used as an example of the lossless decoding.

As illustrated in FIG. 3, the variable length decoding process (VLC decoding) is performed on tiles #1 to #4 sequentially as indicated by arrows 11 to 14. Here, for example, when there are a plurality of CPUs that execute processing independently, or when a CPU includes a plurality of cores that execute processing independently, processes (hereinafter also referred to as a "transform/prediction process") executed after the variable length decoding process such as the inverse orthogonal transform process and the prediction process can be executed on the tile that has undergone the variable length decoding process in parallel to the variable length decoding process of another tile which is being executed.

For example, in the case of the example of FIG. 3, when the variable length decoding process (the arrow 11) of the tile #1 ends, the transform/prediction process (the arrow 15) of the tile #1 is executed without waiting for the end of the variable length decoding process of the other tiles (the tile #2 to the tile #4). Similarly, when the variable length decoding process (the arrow 12) of the tile #2 ends, the transform/prediction process (the arrow 16) of the tile #2 is executed without waiting for the end of the variable length decoding process of the other tiles (the tile #3 and the tile #4). Similarly, when the variable length decoding process (the arrow 13) of the tile #3 ends, the transform/prediction process (the arrow 17) of the tile #3 is executed without waiting for the end of the variable length decoding process of the other tile (the tile #4). The transform/prediction process (the arrow 18) of the tile #4 ends when the variable length decoding process (the arrow 14) of the tile #4 ends.

The processing period of time of the variable length decoding depends on a data amount, that is, a degree of image compression. Generally, since a data amount (a code amount) in each tile in a picture is not uniform, the processing period of time of the variable length decoding of each tile is not constant as illustrated in FIG. 3.

On the other hand, the processing period of time of the transform/prediction process is substantially constant without depending on a data amount. In other words, the processing period of time of the transform/prediction process of each tile is substantially constant as well as in the example of FIG. 3. Thus, a standby time is likely to occur in the transform/prediction process between the arrow 15 and the arrow 16 in the example of FIG. 3.

Figure 4:
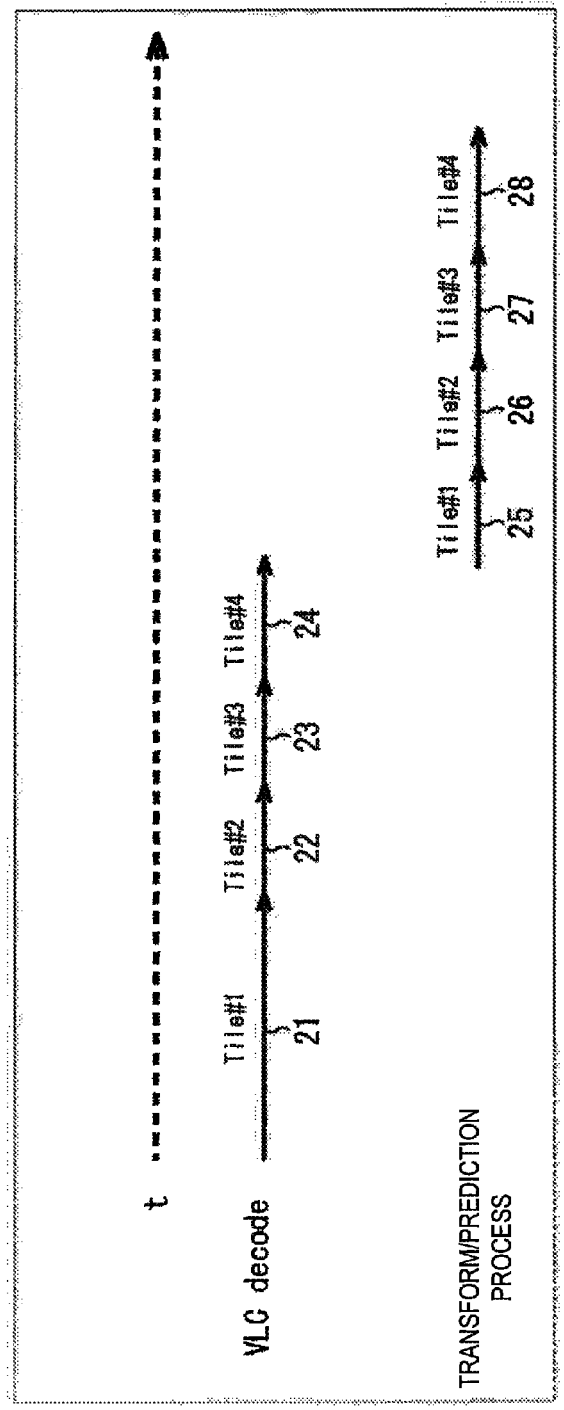
FIG. 4 is a diagram illustrating another example of an execution form of a decoding process and a transform/prediction process.

In this regard, in order to absorb a variation in the processing period of time of the variable length decoding, it was necessary to accumulate a variable length decoding result in a memory. For example, as illustrated in FIG. 4, it was necessary to start the transform/prediction process after the variable length decoding results corresponding to one screen were accumulated in the memory. In other words, as illustrated in FIG. 4, it was necessary to perform the transform/prediction process (arrows 25 to 28) of all the tiles in the picture after the variable length decoding process (arrows 21 to 24) of all the tiles (the tiles #1 to #4) in the picture was performed.

Meanwhile, the filter process such as the deblock filter is performed after the transform/prediction process. As described above, in the variable length decoding and the transform/prediction process, decoded image data of LCU units lined up in an array form in the entire picture (forming an LCU array in the entire picture) is processed in the raster scan order in units of tiles as illustrated on the left in A of FIG. 5. On the other hand, in the filter process, decoded image data of LCU units forming the LCU array in the entire picture is processed in the raster scan order of the entire LCU array (the entire picture) as illustrated on the right in A of FIG. 5. In other words, it is necessary to reorder the decoded image data of the LCU units before the filter process.

In this regard, it is desirable to accumulate the decoded image data of the LCU units obtained in units of tiles sequentially in the memory as the processing results of the variable length decoding and the transform/prediction process, read out the accumulated decoded image data in the raster scan order, and perform the filter process in the read order.

Figure 5:
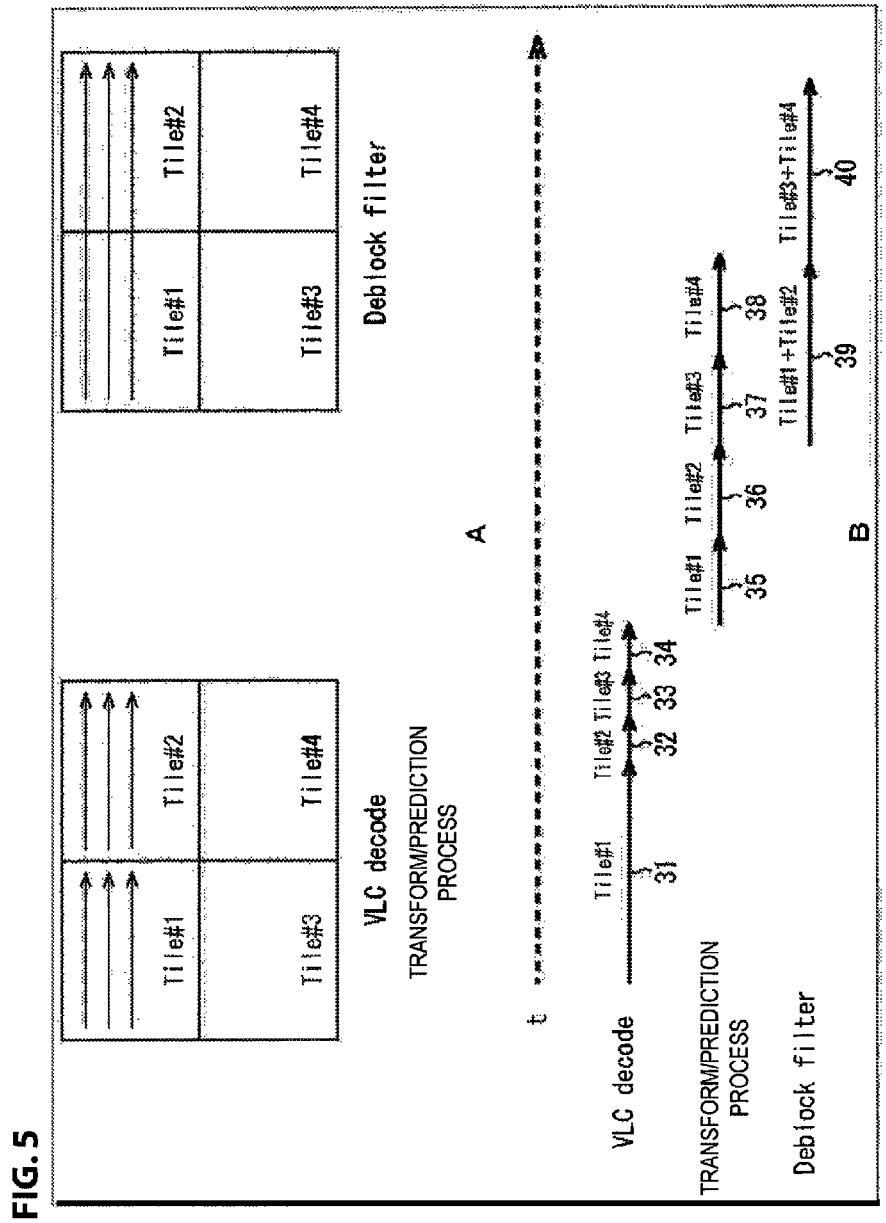
FIG. 5 is a diagram illustrating an example of an execution form of a decoding process, a transform/prediction process, and a filter process.

In the case of the example of FIG. 5, the filter process (the deblock filter) of the tile #1 and the tile #2 can start when the variable length decoding (VLC decode) and the transform/prediction process of the tile #1 and the tile #2 end as illustrated on the right in A of FIG. 5. Thus, as illustrated in B of FIG. 5, the transform/prediction process (arrows 35 to 38) of all the tiles in the picture is performed after the variable length decoding process (arrows 31 to 34) of all the tiles (the tiles #1 to #4) in the picture is performed, and when the transform/prediction process (an arrow 36) of the tile #2 ends, the filter process (an arrow 39) of the tile #1 and the tile #2 can be executed without waiting for the end of the transform/prediction process of the other tiles (the tile #3 and the tile #4). The filter process (an arrow 40) of the tile #3 and the tile #4 can be executed when the transform/prediction process (the arrow 38) of the tile #4 ends.

Thus, in the case of this example, a memory capacity corresponding to about a half screen and a delay corresponding to about a half screen are necessary for reordering.

Figure 6:
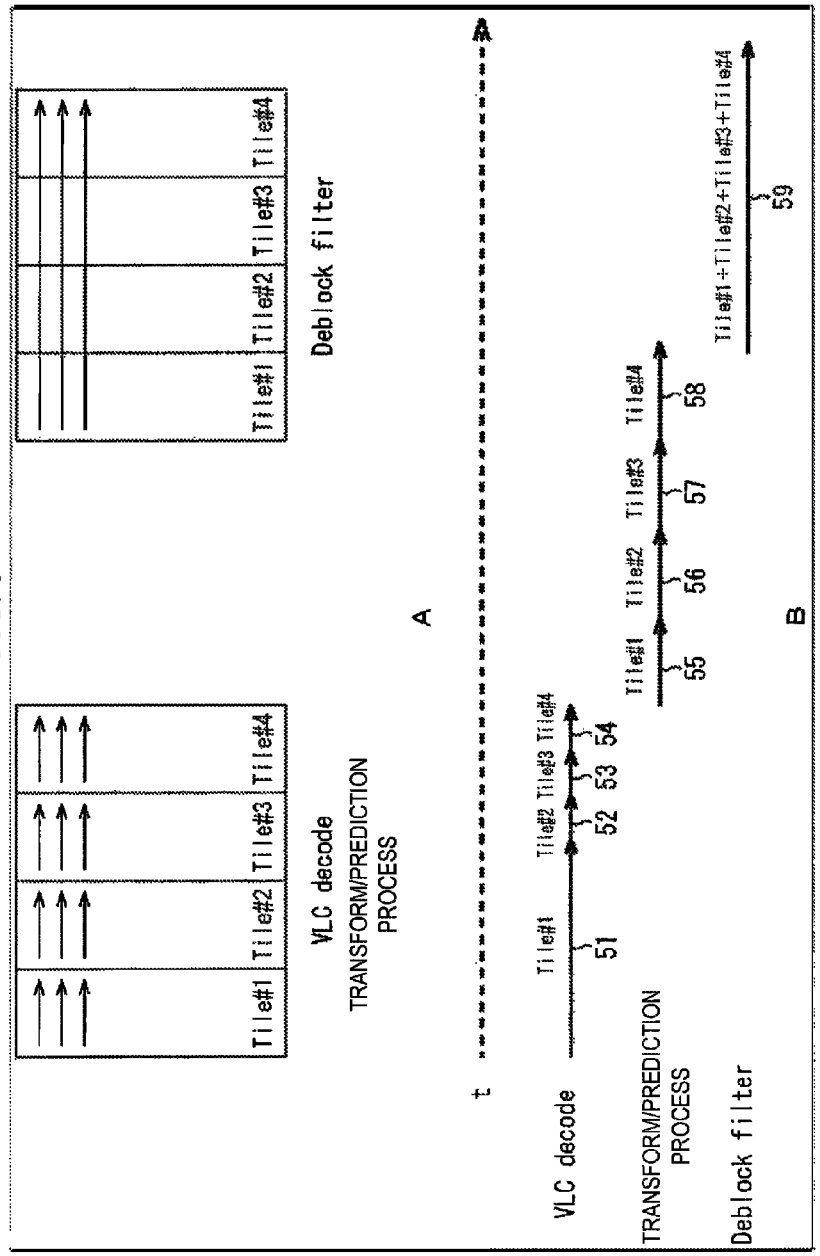
FIG. 6 is a diagram illustrating another example of an execution form of a decoding process, a transform/prediction process, and a filter process.

Further, for example, a sequence illustrated in A of FIG. 6 is also considered as a sequence of tiles. In this case, similarly to the example of FIG. 5, for data of each LCU, the variable length decoding (the VLC decoding) and the transform/prediction process are performed in units of tiles in the raster scan order, and the filter process (the deblock filter) is performed in the raster scan order in the entire picture.

Thus, in this case, as illustrated on the right in A of FIG. 6, when the variable length decoding and the transform/prediction process of all tiles have not ended, it is difficult to start the filter process. In other words, as illustrated in B of FIG. 6, the variable length decoding process (arrows 51 to 54) of all the tiles (the tiles #1 to #4) in the picture is performed, and after the process ends, the transform/prediction process (arrows 55 to 58) of all the tiles in the picture is performed, and after the process ends, the filter process (an arrow 59) of all the tiles in the picture is performed.

Thus, in the case of this example, a memory capacity corresponding to about one screen and a delay corresponding to about one screen were necessary for reordering.

As described above, the memory capacity necessary for the decoding process and the processing delay of the decoding process were likely to increase.

Figure 7:
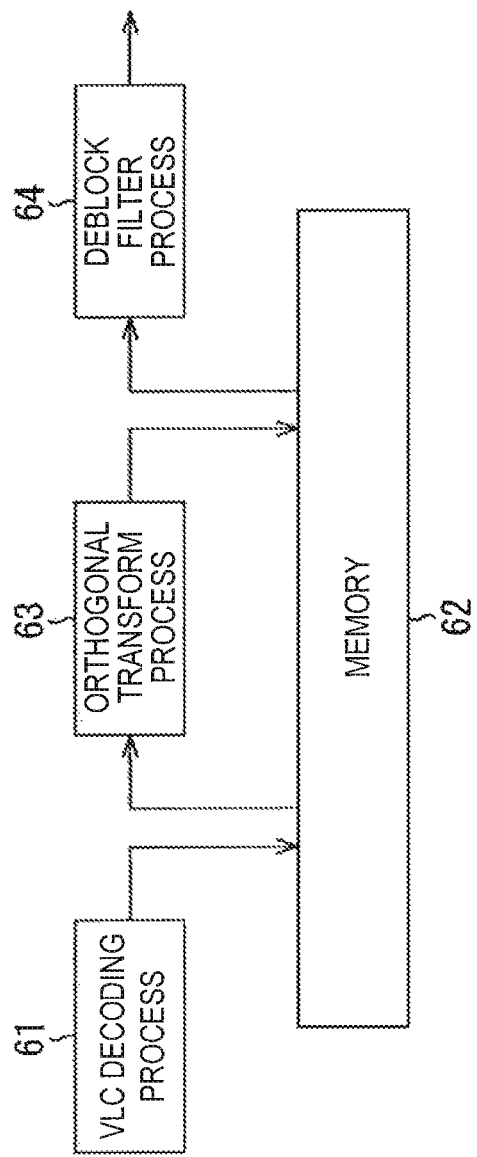
FIG. 7 is a diagram for describing a use example of a memory.

Further, in the decoding process, as illustrated in FIG. 7, data is accumulated in a memory after a variable length (VLC) decoding process 61, and after the variable length (VLC) decoding process 61 of all the tiles ends, data of the memory 62 is read and used in an orthogonal transform process 63. Then, the processing result data is accumulated in the memory 62 again, read (reordered) in the raster scan order of the entire picture, and used in a deblock filter process 64.

As described above, it was necessary to write/read data written in/from the 16 memory 62 multiple times. Accordingly, the number of memory accesses was likely to increase.

As described above, the decoding load such as the memory capacity, the processing delay or the number of memory accesses was likely to increase.

<Reordering>

In this regard, the transform/prediction process is performed in the raster scan order of the entire picture. In other words, the variable length decoding results obtained for the respective tiles are reordered in the raster scan order of the entire picture and converted in this order to generate decoded image data.

Figure 8:
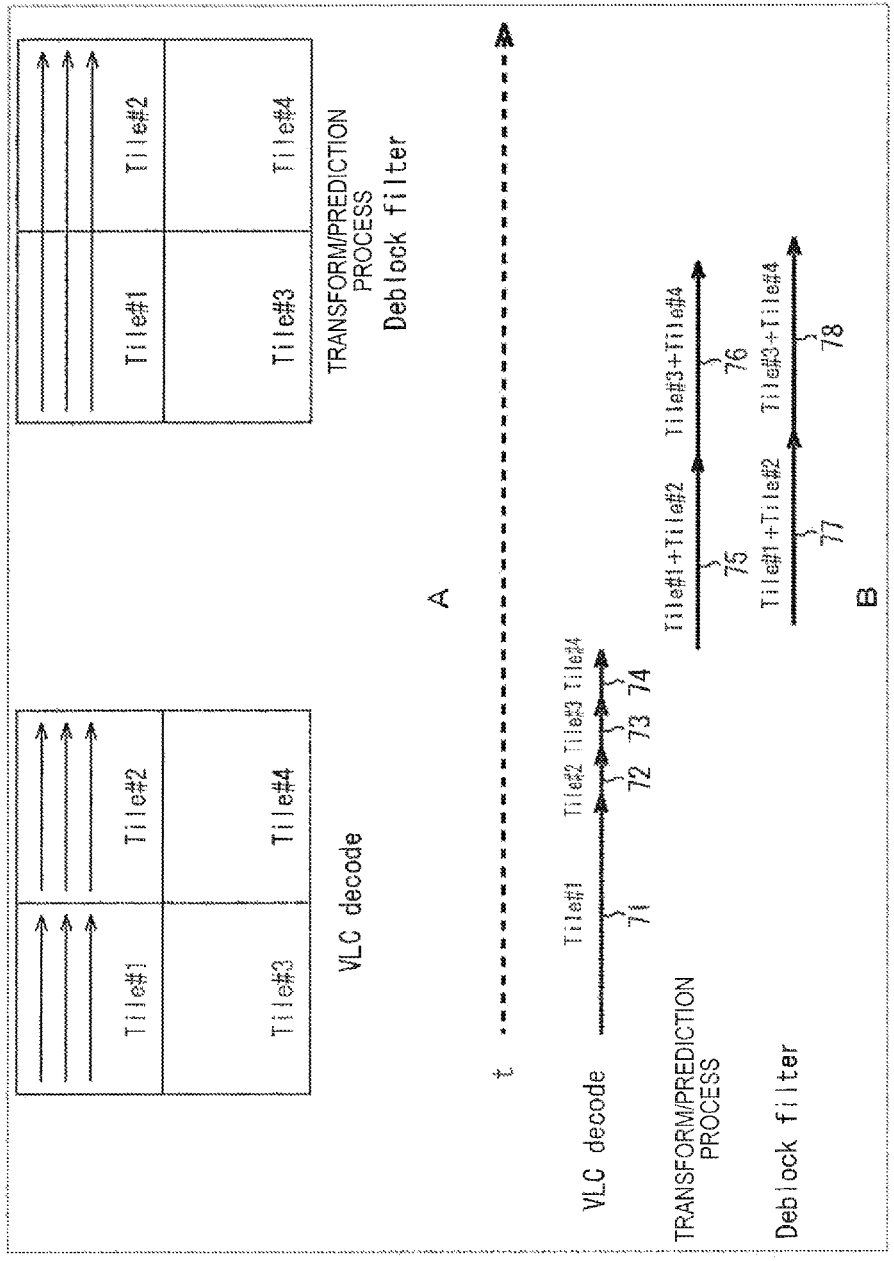
FIG. 8 is a diagram illustrating another example of an execution form of a decoding process, a transform/prediction process, and a filter process.

For example, in the case of the tile in the example of FIG. 5, as illustrated in A of FIG. 8, for data of each LCU, the variable length decoding (the VLC decoding) is performed in units of tiles, and the transform/prediction process and the filter process (the deblock filter) are performed in the raster scan order of the entire picture.

The prediction process and the inverse transform process of the transform/prediction process use a correlation with a neighboring image block in a screen, a correlation in a time axis direction, and the like, but are independent of each other regardless of the variable length decoding process. For this reason, the transform/prediction process can be performed through a different procedure from the decoding process.

Here, as described above, in order to absorb a variation in the processing period of time of the variable length decoding, the transform/prediction process starts after the variable length decoding ends for all the tiles. Thus, in the case of the example of FIG. 8, as illustrated in B of FIG. 8, the variable length decoding process (arrows 71 to 74) of all the tiles (the tiles #1 to #4) in the picture is performed, and thereafter the transform/prediction process (an arrow 75) of the tile #1 and the tile #2 and the transform/prediction process (an arrow 76) of the tile #3 and the tile #4 are performed.

Here, the filter process is performed in the same order as the transform/prediction process and thus can be performed sequentially on the obtained transform and prediction process results. In other words, the filter process can be performed substantially in parallel to the transform/prediction process as long as it does not surpass the transform/prediction process. For example, the filter process may be performed in the same order after a delay is performed by several LCUs from the transform/prediction process performed in the raster scan order.

In the case of the example of FIG. 8, the filter process (an arrow 77) of the tile #1 and the tile #2 can be performed substantially in parallel to the transform/prediction process (an arrow 75) of the tile #1 and the tile #2, and the filter process (an arrow 78) of the tile #3 and the tile #4 can be performed substantially in parallel to the transform/prediction process (an arrow 76) of the tile #3 and the tile #4.

Thus, it is possible to suppress an increase in the processing delay of the decoding process. Further, since the memory capacity for reordering is unnecessary, it is possible to suppress an increase in the memory capacity necessary for the decoding process.

Even in the case of the example of FIG. 6, the process can be similarly performed. In other words, as illustrated in A of FIG. 9, for data of each LCU, the variable length decoding (the VLC decoding) can be performed in units of tiles, and the transform/prediction process and the filter process (the deblock filter) can be performed in the raster scan order of the entire picture.

Figure 9:
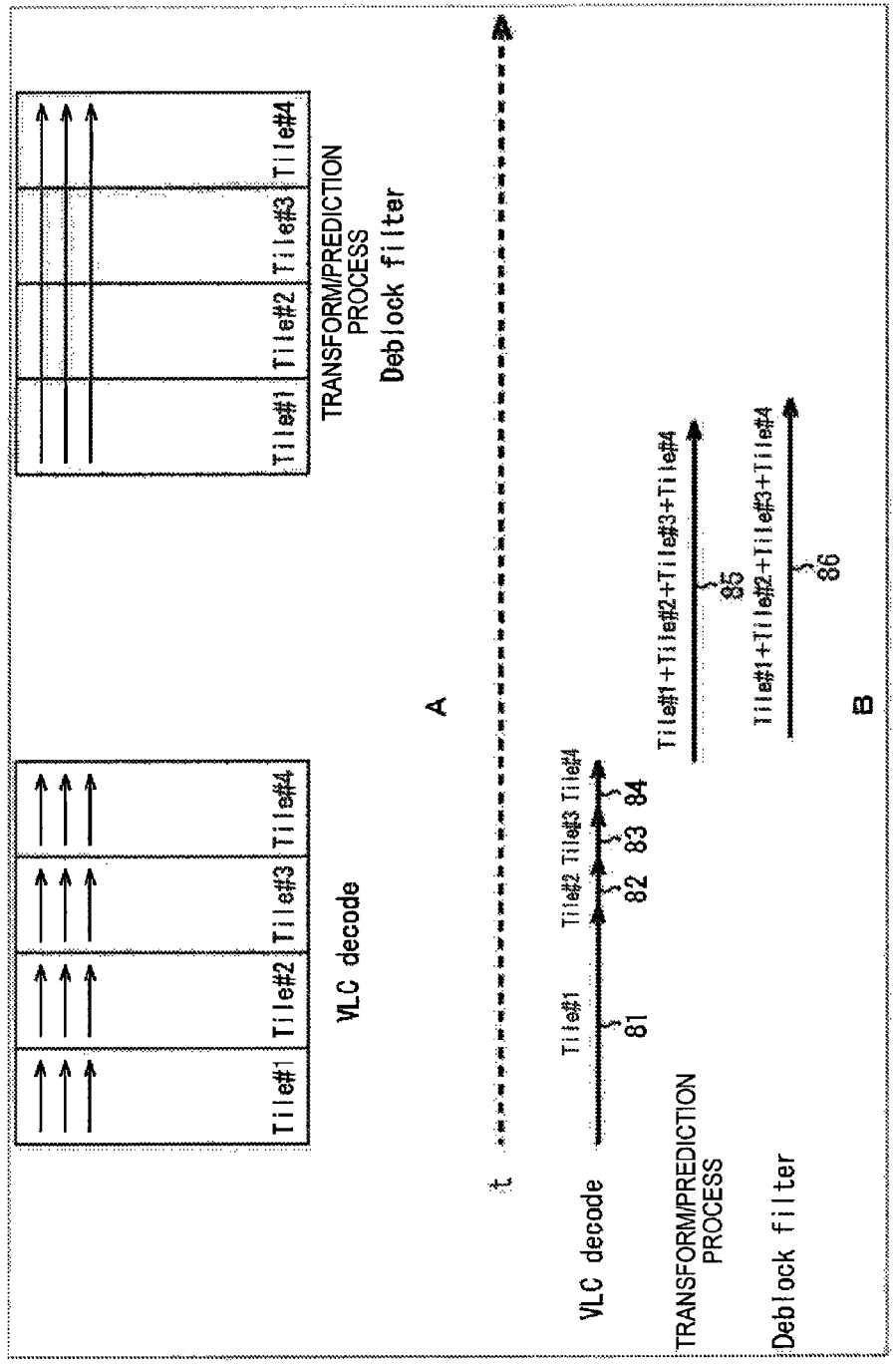
FIG. 9 is a diagram illustrating another example of an execution form of a decoding process, a transform/prediction process, and a filter process.

In the case of the example of FIG. 9, as illustrated in B of FIG. 9, the variable length decoding process (arrows 81 to 84) of all the tiles (the tiles #1 to #4) in the picture is performed, and thereafter the transform/prediction process (an arrow 85) of the tiles #1 to #4 is performed.

In this case, the filter process can be performed substantially in parallel to the transform/prediction process as long as it does not surpass the transform/prediction process. In other words, in the case of the example of FIG. 9, as illustrated in B of FIG. 9, the filter process (an arrow 86) of the tiles #1 to #4 can be performed substantially in parallel to the transform/prediction process (an arrow 85) of the tiles #1 to #4.

Thus, in this case, it is possible to suppress an increase in the processing delay of the decoding process. Further, since the memory capacity for reordering is unnecessary, it is possible to suppress an increase in the memory capacity necessary for the decoding process.

Figure 10:
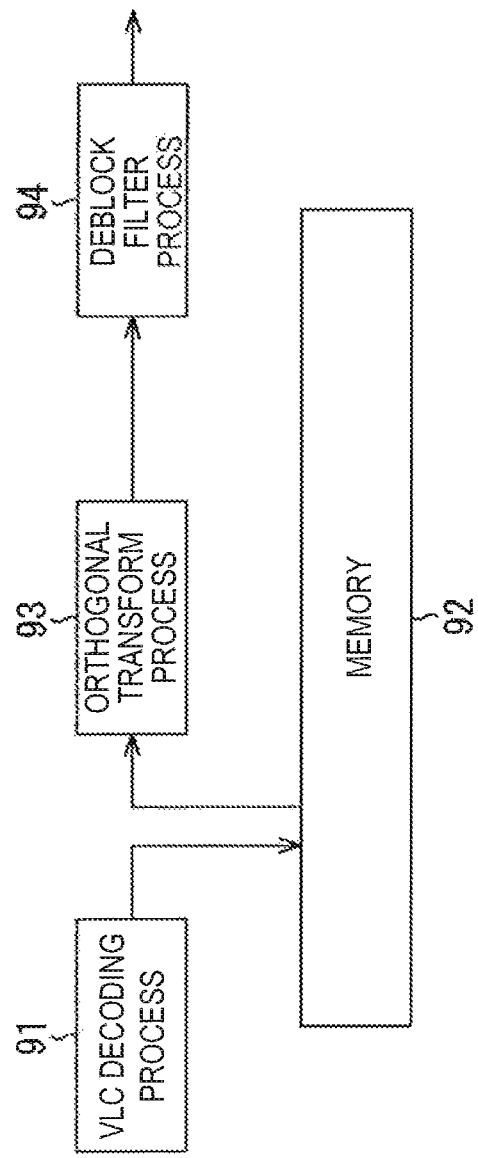
FIG. 10 is a diagram for describing another use example of a memory.

Further, as illustrated in FIG. 10, after a variable length (VLC) decoding process 91, the decoding result is accumulated in a memory 92 in order to suppress a variation in the processing period of time, but the reordering is performed using accumulation (buffering) of the decoding result in the memory. In other words, data of each LCU accumulated in the memory 92 is read in the raster scan order of the entire picture and supplied for an orthogonal transform process 93. In the orthogonal transform process 93 and a deblock filter process 94, data of each LCU is processed in the supply order (that is, the raster scan order of the entire picture). Thus, it is unnecessary to accumulate the orthogonal transform processing result in the memory 92. As described above, data reordering is performed before the orthogonal transform process, and the orthogonal transform process is performed in the raster scan order of the entire picture, and thus it is possible to suppress an increase in the number of memory accesses. Further, since the reordering is performed using the accumulation of the decoding results in the memory 92 which is performed in the related art, neither a new process nor the memory capacity for the reordering is necessary. Thus, it is possible to suppress an increase in the memory capacity necessary for the decoding process and an increase in the processing delay of the decoding process.

<Data Management of Memory>

Next, a method of managing variable length decoding result data through the memory 92 in the example of FIG. 10 will be described. The variable length decoding result is data of each LCU, and includes, for example, various kinds of parameters such as a mode used in compression, a motion vector, a coefficient level serving as a result of converting a prediction residue, and the like. Of course, other information may be included.

The variable length decoding result may be stored in the memory 92 by any method as long as it can be read in the raster scan order of the entire picture.

Figure 11:
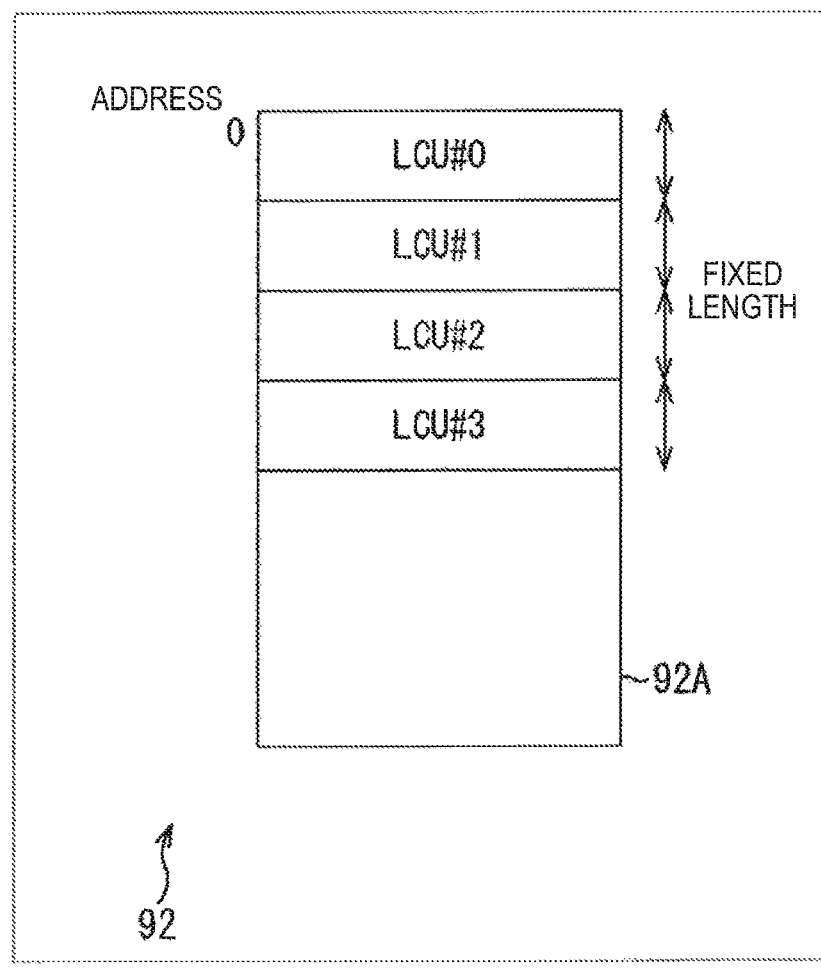
FIG. 11 is a diagram for describing a data management example of a memory.

For example, as illustrated in FIG. 11, in a storage area 92A of the memory 92, a fixed length area is allocated to each LCU, and the variable length decoding result of each LCU may be stored at an address corresponding to the LCU in the picture. In this case, it is possible to easily obtain a memory address at which the variable length decoding result of a desired LCU is stored from screen coordinates of the LCU. In other words, in this case, it is easy to manage data, and it is easy to perform a process when data is reordered and read.

Figure 12:
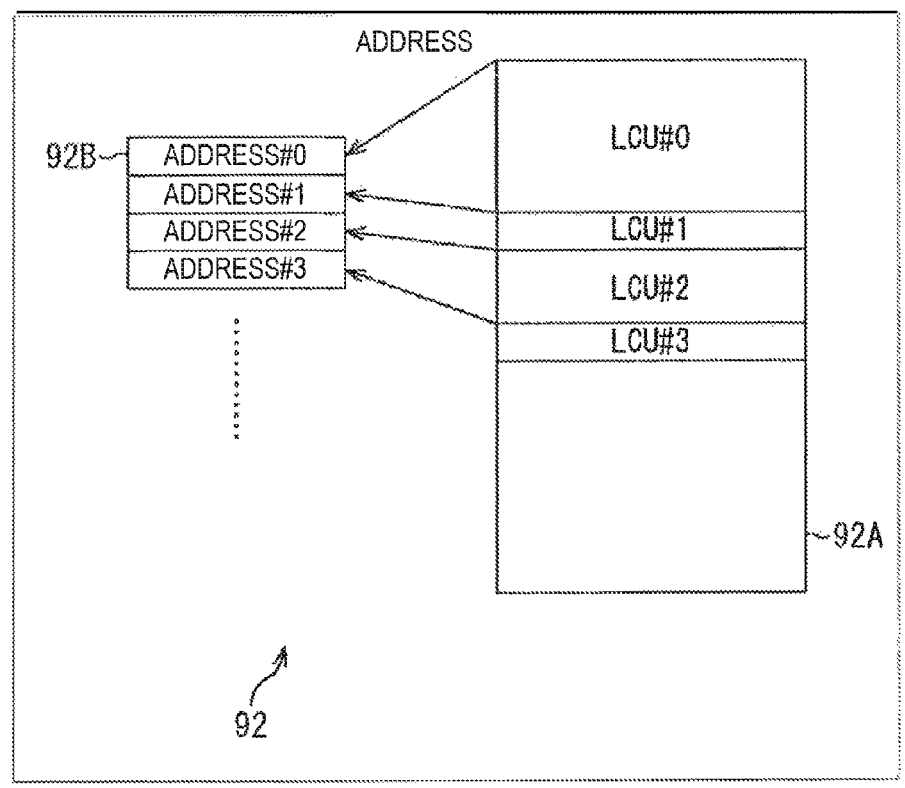
FIG. 12 is a diagram for describing another data management example of a memory.

Further, for example, as illustrated in FIG. 12, in the storage area 92A of the memory 92, the variable length decoding results of the respective LCUs may be sequentially stored, and a start address of the variable length decoding result of each LCU may be separately managed through management information 92B. In this case, it is possible to specify the memory address at which the variable length decoding result of a desired LCU is stored with reference to the management information 92B. As a result, it is possible to use the entire memory area as a data area, it is possible to suppress the occurrence of an unused area compared to the example of FIG. 1, and it is possible to improve memory use efficiency.

Figure 13:
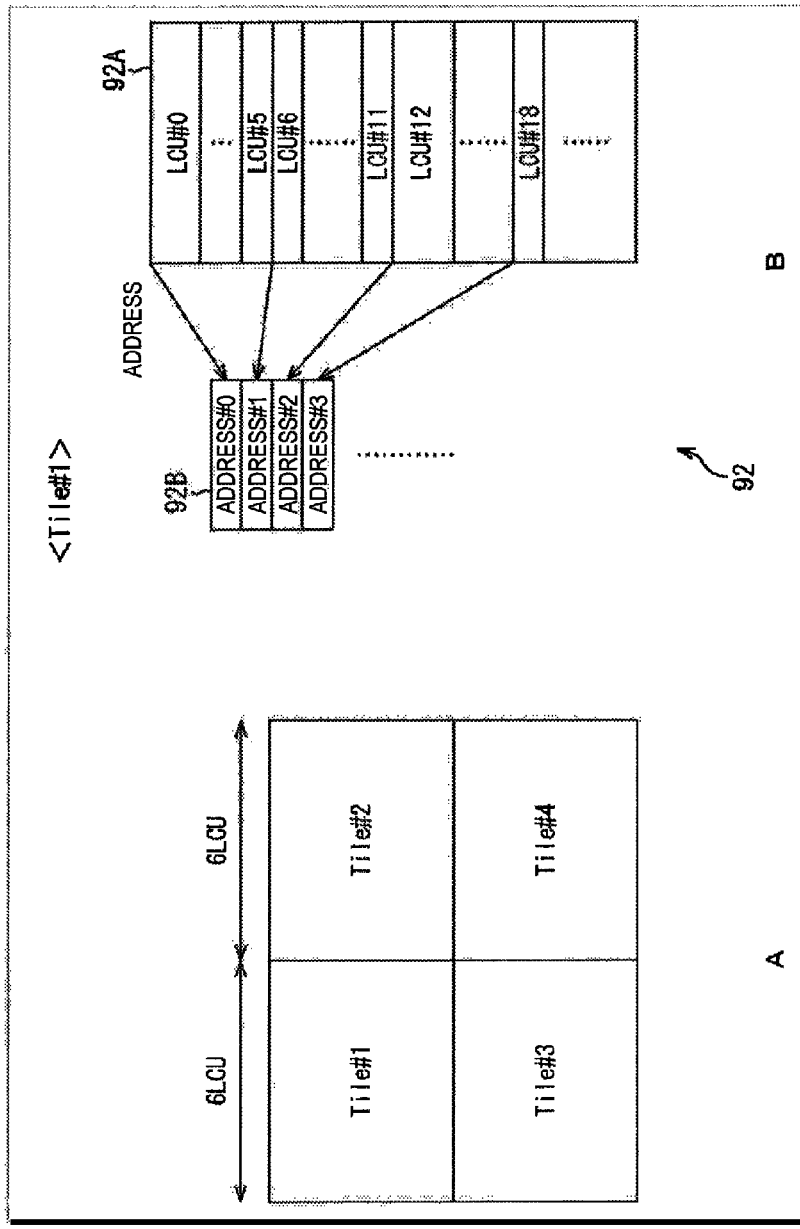
FIG. 13 is a diagram for describing another data management example of a memory.

Further, for example, as illustrated in A of FIG. 13, a picture is assumed to be divided into 2×2 tiles, and the number of LCUs of each tile in the horizontal direction is assumed to be 6. In this case, for example, as illustrated in B of FIG. 13, the variable length decoding results of the respective LCUs may be sequentially stored, and the start address of the decoding result of each LCU at the left end of each tile may be separately managed through the management information 92B. In B of FIG. 13, the description has proceeded with the tile #1, but the tile #2 to the tile #4 are similarly managed.

In this case, it is possible to specify the memory address at which the variable length decoding result of the LCU at the left end of each tile is stored with reference to the management information 92B. In other words, it is possible to read data corresponding to one LCU line of one tile (corresponding to one line of the LCU array) by reading from the memory address to the next memory address which are managed according to the management information 92B. That is, for example, it is possible to read data of one LCU line of the entire picture by reading data of one desired LCU line of the tile #1 and then reading data of one LCU line of the tile #2 at the same position. In other words, it is possible to read the variable length decoding result of each LCU for each LCU line of the entire picture (that is, in the raster scan order of the entire picture) based on the memory address managed according to the management information 92B.

As a result, it is possible to use the entire memory area as a data area, it is possible to suppress the occurrence of an unused area compared to the case of the example of FIG. 11, and it is possible to improve the memory use efficiency. Further, compared to the case of the example of FIG. 12, it is possible to reduce an information amount of the management information 92B. In other words, it is possible to improve the memory use efficiency.

Of course, the data management method of the memory 92 is not limited to this example.

<Area>

In the above example, a tile is used as an example of an area into which a picture is divided, but the area is not limited to a tile. For example, a slice may be used, and another data unit may be used. The same applies in the following description.

Next, application examples in which the present technology is applied to a specific device will be described.

2. First Embodiment

<Image Encoding Device>

Figure 14:
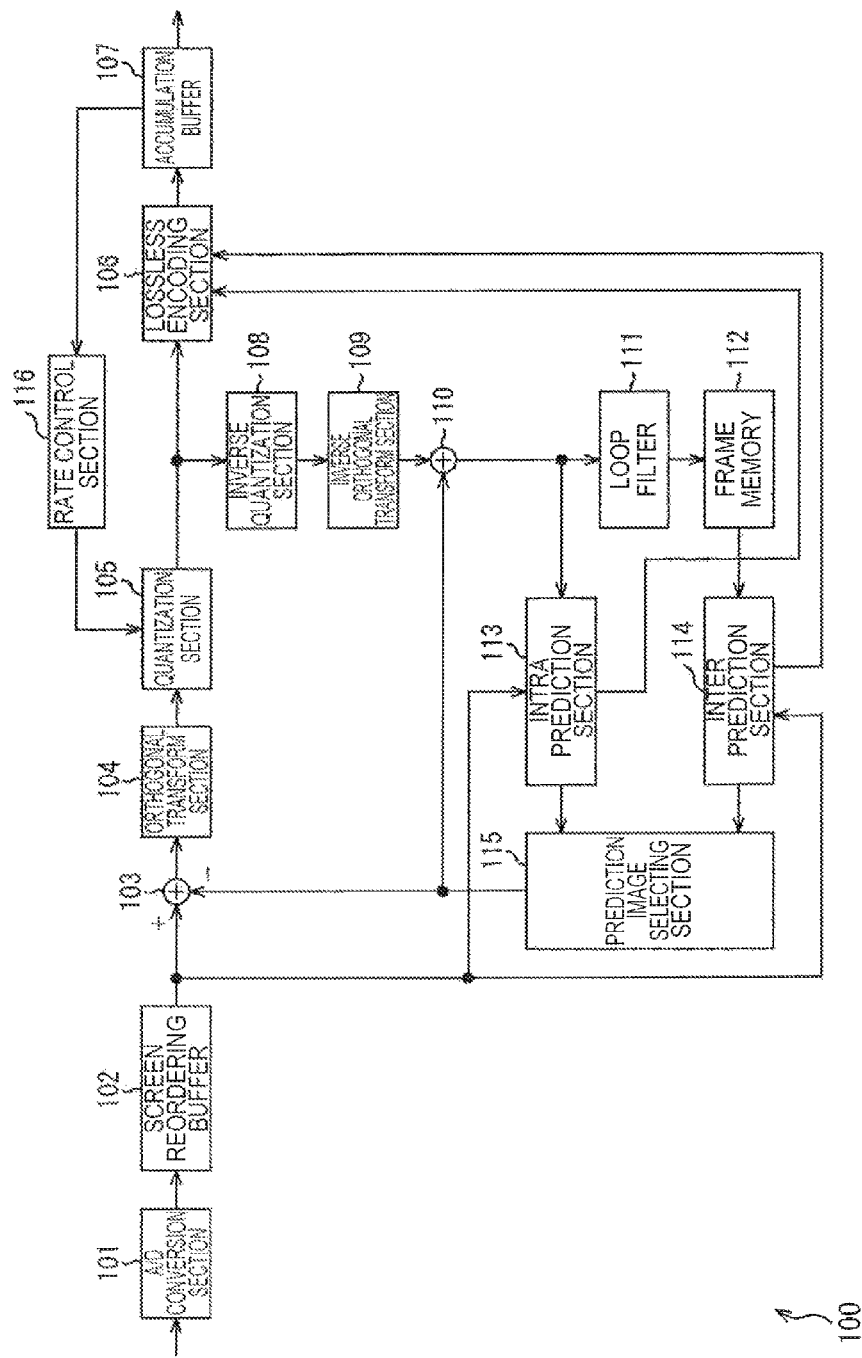
FIG. 14 is a block diagram illustrating an example of a main configuration of an image encoding device.

FIG. 14 is a block diagram illustrating an example of a configuration of an image encoding device that is an example of an image processing device. An image encoding device 100 illustrated in FIG. 14 encodes image data of a moving image, for example, using the prediction process of HEVC or the prediction process of a scheme equivalent thereto.

As illustrated in FIG. 14, the image encoding device 100 has an A/D converting section 101, a screen reordering buffer 102, an operation section 103, an orthogonal transform section 104, a quantization section 105, a lossless encoding section 106, an accumulation buffer 107, an inverse quantization section 108, and an inverse orthogonal transform section 109. In addition, the image encoding device 100 has an operation section 110, a loop filter 111, a frame memory 112, an intra prediction section 113, an inter prediction section 114, a predictive image selecting section 115, and a rate control section 116.

The A/D conversion section 101 performs A/D conversion on image data (analog data) of an input image input to the image encoding device 100. The A/D conversion section 101 supplies the converted image data (digital data) to the screen reordering buffer 102.

The screen reordering buffer 102 stores frame image data of the input image supplied in the display order in the same order. The screen reordering buffer 102 reorders the order of the frames of the input image in the encoding order according to a group of pictures (GOP). In other words, the screen reordering buffer 102 reads the image data of the respective frames stored in the display order in the encoding order. The screen reordering buffer 102 supplies the read image data to the operation section 103. Further, the screen reordering buffer 102 supplies the read image data to the intra prediction section 113 and the inter prediction section 114 as well. In other words, the operation section 103, the intra prediction section 113, and the inter prediction section 114 are supplied with the image data of the respective frames in the encoding order.

The operation section 103 generates image data of a differential image obtained by subtracting the prediction image from the input image using the image data of the input image read from the screen reordering buffer 102 and the image data of the prediction image supplied from the intra prediction section 113 or the inter prediction section 114 via the prediction image selecting section 115. For example, in the case of an image on which intra encoding is performed, the operation section 103 generates a differential image between the input image and the prediction image generated by the intra prediction section 113. Further, for example, in the case of an image on which inter encoding is performed, the operation section 103 generates a differential image between the input image and the prediction image generated by the inter prediction section 114. The operation section 103 generates image data of the generated differential image to the orthogonal transform section 104.

The orthogonal transform section 104 performs an orthogonal transform such as a discrete cosine transform or a Karhunen-Loève Transform on image data of the differential image supplied from the operation section 103. The orthogonal transform section 104 supplies acquired transform coefficients to the quantization section 105.

The quantization section 105 quantizes the transform coefficients supplied from the orthogonal transform section 104. The quantization section 105 sets a quantization parameter based on information related to a target value of a coding amount supplied from the rate control section 116, and performs the quantizing. The quantization section 105 supplies the transform coefficients quantized in such way to the lossless encoding section 106.

The lossless encoding section 106 encodes the transform coefficients quantized in the quantization section 105 according to an arbitrary encoding scheme, and generates encoded data. Since coefficient data is quantized under control of the rate control section 116, the data amount (coding amount) of the encoded data becomes a target value (or approaches a target value) set by the rate control section 116.

Further, the lossless encoding section 106 acquires, for example, information indicating an intra prediction mode from the intra prediction section 113, and acquires, for example, information indicating an inter prediction mode or differential motion vector information from the inter prediction section 114. The lossless encoding section 106 encodes various kinds of information according to an arbitrary encoding scheme, and sets (multiplexes) the encoded information as a part of header information of the encoded data. The lossless encoding section 106 supplies the obtained encoded data to be accumulated in the accumulation buffer 107.

Examples of the encoding scheme of encoding performed by the lossless encoding section 106 include variable length coding and arithmetic coding. As the variable length coding, for example, there is Context-Adaptive Variable Length Coding (CAVLC) defined in the H.264/AVC scheme. As the arithmetic coding, for example, there is Context-Adaptive Binary Arithmetic Coding (CABAC).

The accumulation buffer 107 temporarily holds the encoded data supplied from the lossless encoding section 106. The accumulation buffer 107 outputs the held base layer encoded data to an outside of the image encoding device 100 at a subsequent stage at a certain timing. In other words, the accumulation buffer 107 serves as a transmitting section that transmits the encoded data as well.

The transform coefficients quantized by the quantization section 105 are also supplied to the inverse quantization section 108. The inverse quantization section 108 inversely quantizes the quantized transform coefficients according to a method corresponding to the quantization performed by the quantization section 105. The inverse quantization section 108 supplies the obtained transform coefficients to the inverse orthogonal transform section 109.

The inverse orthogonal transform section 109 performs the inverse orthogonal transform on the conversion coefficients supplied from the inverse quantization section 108 according to a method corresponding to the orthogonal transform process by the orthogonal transform section 104. The image data of the differential image by the inverse orthogonal transform is restored. The inverse orthogonal transform section 109 supplies image data of the restored differential image to the operation section 110 as the inverse orthogonal transform result.

The operation section 110 generates image data of an image obtained by adding the restored differential image to the prediction image using the inverse orthogonal transform result supplied from the inverse orthogonal transform section 109 and the image data of the prediction image supplied from the intra prediction section 113 or the inter prediction section 114 via the prediction image selecting section 115. In other words, a locally reconstructed image (hereinafter referred to as a "reconstructed image") is obtained through this addition process. The operation section 110 supplies image data of the reconstructed image to the loop filter 111 or the intra prediction section 113.

The loop filter 111 includes a deblock filter, an adaptive loop filter, or the like, and appropriately performs a filter process on image data of the reconstructed image supplied from the operation section 110. For example, the loop filter 111 performs the deblock filter process on the image data of the reconstructed image, and removes block distortion of the reconstructed image. Further, for example, the loop filter 111 improves the image quality of the reconstructed image by performing the loop filter process on the deblock filter process result (the image data of the reconstructed image from which the block distortion has been removed) using a Wiener filter.

The loop filter 111 may further perform any other arbitrary filter process on the reconstructed image. The loop filter 111 may supply information used in the filter process such as a filter coefficient to the lossless encoding section 106 as necessary so that the information can be encoded.

The loop filter 111 supplies the image data of the reconstructed image (hereinafter referred to as a "decoded image") that has undergone the filter process as described above to the frame memory 112.

The frame memory 112 stores image data of the supplied decoded image. Further, the frame memory 112 supplies the image data of the stored decoded image to the inter prediction section 114 as the reference image at a certain timing.

The intra prediction section 113 performs the prediction process on the current picture that is an image of a processing target frame, and generates a prediction image. The intra prediction section 113 performs the prediction process in units of certain blocks (using a block as a processing unit). In other words, the intra prediction section 113 generates a prediction image of a current block serving as the processing target in the current picture. At this time, the intra prediction section 113 performs the prediction process (intra-screen prediction (which is also referred to as "intra prediction")) using a reconstructed image supplied as the reference image from the operation section 110. In other words, the intra prediction section 113 generates the prediction image using pixel values neighboring the current block which are included in the reconstructed image. The neighboring pixel value used for the intra prediction is a pixel value of a pixel which has been previously processed in the current picture. As the intra prediction (that is, a method of generating the prediction image), a plurality of methods (which are also referred to as "intra prediction modes") are prepared as candidates in advance. The intra prediction section 113 performs the intra prediction in the plurality of intra prediction modes prepared in advance.

The intra prediction section 113 generates predictive images in all the intra prediction modes serving as the candidates, evaluates cost function values of the predictive images using the input image supplied from the screen reordering buffer 102, and selects an optimal mode. When the optimal intra prediction mode is selected, the intra prediction section 113 supplies the predictive image generated in the optimal mode to the predictive image selecting section 115.

As described above, the intra prediction section 113 appropriately supplies, for example, the intra prediction mode information indicating the employed intra prediction mode to the lossless encoding section 106 so that the information is encoded.

The inter prediction section 114 performs the prediction process on the current picture, and generates a prediction image. The inter prediction section 114 performs the prediction process in units of certain blocks (using a block as a processing unit). In other words, the inter prediction section 114 generates a prediction image of a current block serving as the processing target in the current picture. At this time, the inter prediction section 114 performs the prediction process using image data of the input image supplied from the screen reordering buffer 102 and image data of a decoded image supplied as the reference image from the frame memory 112. The decoded image is an image (another picture that is not the current picture) of a frame which has been processed before the current picture. In other words, the inter prediction section 114 performs the prediction process (inter-screen prediction (which is also referred to as "inter prediction") of generating the prediction image using an image of another picture.

The inter prediction includes motion prediction and motion compensation. More specifically, the inter prediction section 114 performs the motion prediction on the current block using the input image and the reference image, and detects a motion vector. Then, the inter prediction section 114 performs motion compensation process using the reference image according to the detected motion vector, and generates the prediction image (inter prediction image information) of the current block. As the inter prediction (that is, a method of generating the prediction image), a plurality of methods (which are also referred to as "inter prediction modes") are prepared as candidates in advance. The inter prediction section 114 performs the inter prediction in the plurality of inter prediction modes prepared in advance.

The inter prediction section 114 generates predictive images in all the inter prediction modes serving as a candidate. The inter prediction section 114 evaluates cost function values of the predictive images using the input image supplied from the screen reordering buffer 102, information of the generated differential motion vector, and the like, and selects an optimal mode. When the optimal inter prediction mode is selected, the inter prediction section 114 supplies the predictive image generated in the optimal mode to the predictive image selecting section 115.

The inter prediction section 114 supplies information indicating the employed inter prediction mode, information necessary for performing processing in the inter prediction mode when the encoded data is decoded, and the like to the lossless encoding section 106 so that the information is encoded. For example, as the necessary information, there is information of a generated differential motion vector, and as prediction motion vector information, there is a flag indicating an index of a prediction motion vector.

The predictive image selecting section 115 selects a supply source of the prediction image to be supplied to the operation section 103 and the operation section 110. For example, in the case of the intra coding, the predictive image selecting section 115 selects the intra prediction section 113 as the supply source of the predictive image, and supplies the predictive image supplied from the intra prediction section 113 to the operation section 103 and the operation section 110. For example, in the case of the inter coding, the predictive image selecting section 115 selects the inter prediction section 114 as the supply source of the predictive image, and supplies the predictive image supplied from the inter prediction section 114 to the operation section 103 and the operation section 110.

The rate control section 127 controls a rate of a quantization operation of the quantization section 115 based on the coding amount of the encoded data accumulated in the accumulation buffer 117 such that no overflow or underflow occurs.

<Flow of Encoding Process>

Next, an example of the flow of the encoding process performed by the image encoding device 100 illustrated in FIG. 14 will be described with reference to a flowchart of FIG. 15.

Figure 15:
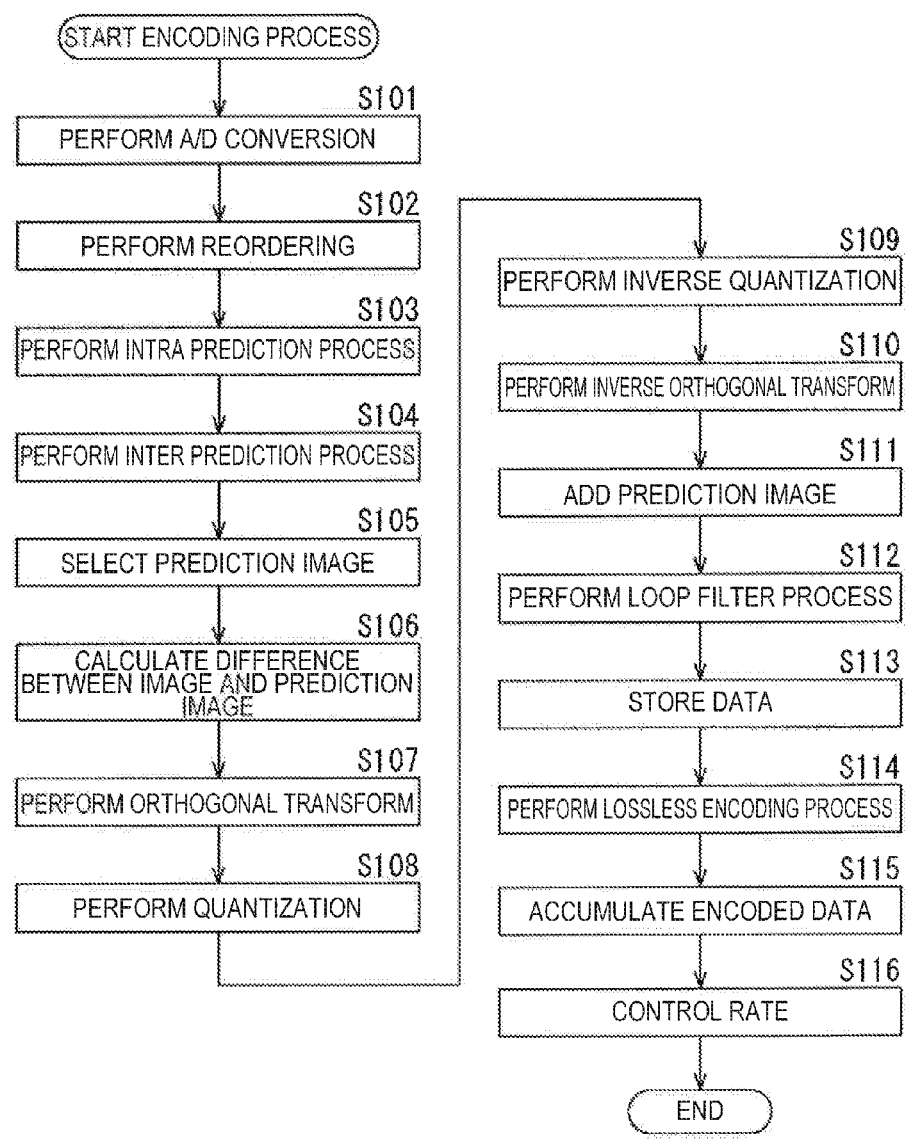
FIG. 15 is a flowchart for describing an example of the flow of an encoding process.

When the encoding process starts, in step S101 of FIG. 15, the A/D conversion section 101 performs the A/D conversion on the input image.

In step S102, the screen reordering buffer 122 stores the image that has undergone the A/D conversion in step S101, and performs reordering from a display order to an encoding order on each picture.

In step S103, the intra prediction section 113 performs the intra prediction process of the intra prediction mode.

In step S104, the inter prediction section 114 performs the inter prediction process in which the motion prediction, the motion compensation, and the like are performed in the inter prediction mode.

In step S105, the prediction image selecting section 115 selects a prediction image based on a cost function value or the like. In other words, the prediction image selecting section 115 selects any one of the prediction image generated by the intra prediction of step S103 and the prediction image generated by the inter prediction of step S104.

In step S106, the operation section 103 calculates a difference between the input image in which the frame order is reordered in the process of step S102 and the prediction image selected in the process of step S105. In other words, the operation section 103 generates image data of a differential image between the input image and the prediction image. An amount of the obtained image data of the differential image is reduced to be smaller than the original image data. Therefore, an amount of data can be compressed to be smaller than when an image is encoded without change.

In step S107, the orthogonal transform section 104 performs the orthogonal transform on the image data of the differential image generated in the process of step S106.

In step S108, the quantization section 105 quantizes the orthogonal transform coefficient obtained in the process of step S107 using the quantization parameter calculated by the rate control section 116.

In step S109, the inverse quantization section 108 inversely quantizes the quantized coefficient (which is also referred to as a "quantization coefficient") generated in the process of step S108 according to characteristics corresponding to characteristics of the quantization section 105.

In step S110, the inverse orthogonal transform section 109 performs the inverse orthogonal transform on the orthogonal transform coefficient obtained in the process of step S109.

In step S111, the operation section 110 generates image data of a reconstructed image by adding the prediction image selected in the process of step S105 to the differential image restored in the process of step S110.

In step S112, the loop filter 111 performs the loop filter process on the image data of the reconstructed image generated in the process of step S113. As a result, for example, block distortion of the reconstructed image is removed.

In step S113, the frame memory 112 stores the decoded image obtained in the process of step S112.

In step S114, the lossless encoding section 106 encodes the quantized coefficients obtained in the process of step S108. In other words, lossless coding such as variable length coding or arithmetic coding is performed on data corresponding to the differential image.

At this time, the lossless encoding section 106 encodes information related to the prediction mode of the predictive image selected in the process of step S105, and adds the encoded information to the encoded data obtained by encoding the differential image. In other words, the lossless encoding section 106 also encodes, for example, information according to the optimal intra prediction mode information supplied from the intra prediction section 113 or the optimal inter prediction mode supplied from the inter prediction section 114, and adds the encoded information to the encoded data.

Further, the lossless encoding section 106 sets and encodes syntax elements such as various null units, and adds the encoded syntax elements to the encoded data.

In step S115, the accumulation buffer 107 accumulates the encoded data obtained in the process of step S113. The encoded data accumulated in the accumulation buffer 107 is appropriately read and transmitted to the decoding side via a transmission path or a recording medium.

In step S116, the rate control section 116 controls the quantization operation of the quantization section 105 based on the coding amount (the generated coding amount) of the encoded data accumulated in the accumulation buffer 107 in the process of step S115 so that no overflow or underflow occurs. Further, the rate control section 116 supplies information related to the quantization parameter to the quantization section 106 When the process of step S116 ends, the encoding process ends.

Further, when a picture is divided into tiles as described above, the process of step S103 to step S111 and the process of step S114 to step S116 are performed independently for each tile.

3. Second Embodiment

<Image Decoding Device>

Figure 16:
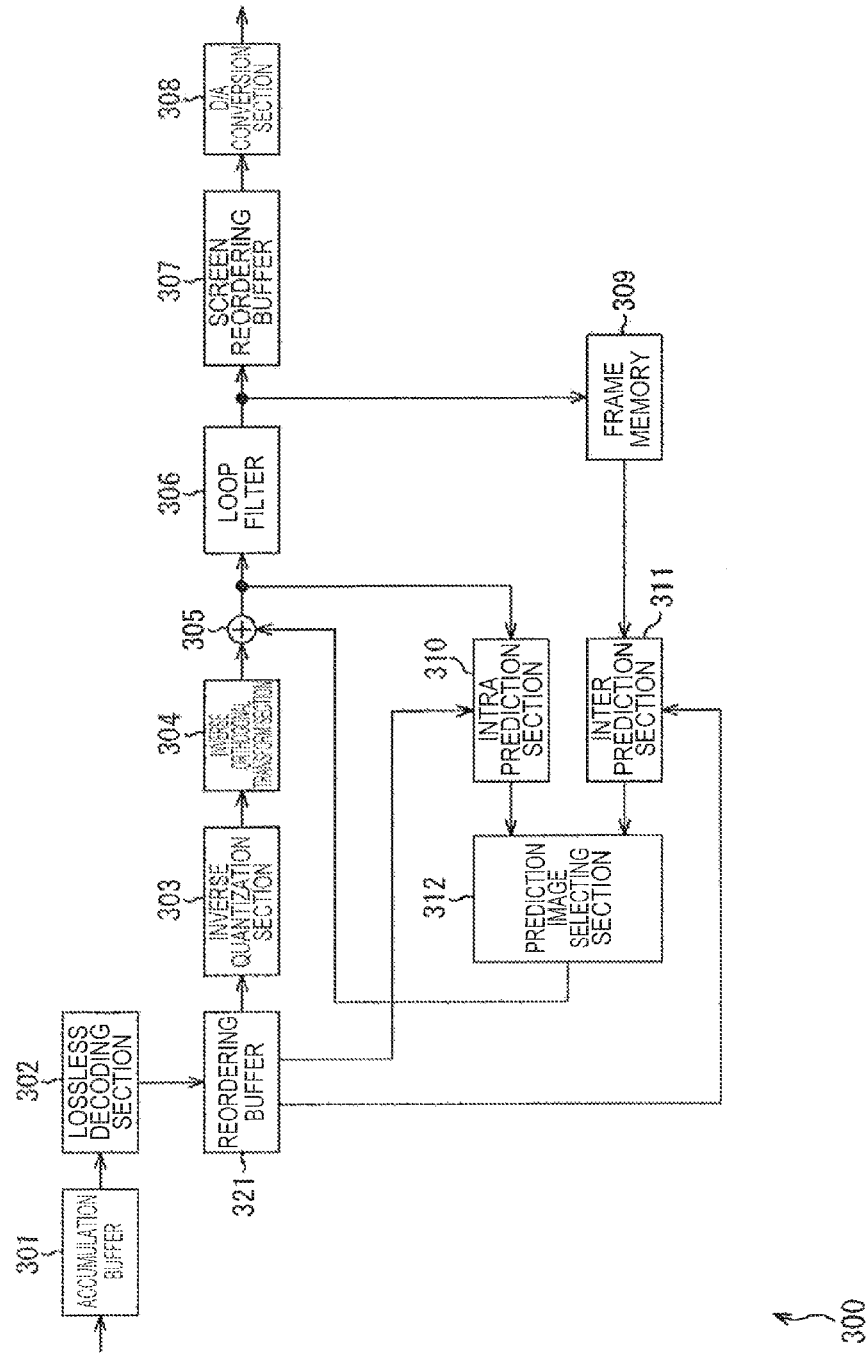
FIG. 16 is a block diagram illustrating an example of a main configuration of an image decoding device.

Next, decoding of encoded data encoded as described above will be described. FIG. 16 is a block diagram illustrating an example of a main configuration of an image decoding device that corresponds to the image encoding device 100 of FIG. 14 as an example of an image processing device to which the present technology is applied.

An image decoding device 300 illustrated in FIG. 16 decodes the encoded data generated by the image encoding device 100 by a decoding method corresponding to an encoding method thereof.

As illustrated in FIG. 16, the image decoding device 300 includes an accumulation buffer 301, a lossless decoding section 302, an inverse quantization section 303, an inverse orthogonal transform section 304, an operation section 305, a loop filter 306, a screen reordering buffer 307, and a D/A conversion section 308. The image decoding device 300 further includes a frame memory 309, an intra prediction section 310, an inter prediction section 311, and a prediction image selecting section 312. The image decoding device 300 further includes a reordering buffer 321.

The accumulation buffer 301 is a reception section that receives the transmitted encoded data. The accumulation buffer 301 receives and accumulates the transmitted encoded data, and supplies the encoded data to the lossless decoding section 302 at a certain timing. Information necessary for decoding such as the prediction mode information is added to the encoded data. The lossless decoding section 302 decodes the information that is supplied from the accumulation buffer 301 and encoded by the lossless encoding section 116 according to the decoding scheme (for example, variable length decoding, arithmetic decoding, or the like) corresponding to the encoding scheme. The lossless decoding section 302 supplies quantized coefficient data of a differential image obtained by the decoding to the inverse quantization section 303 through the reordering buffer 321.

Further, the lossless decoding section 302 determines whether the intra prediction mode or the inter prediction mode is selected as an optimum prediction mode, and supplies, through the reordering buffer 321, information related to the optimum prediction mode to the mode determined to be selected, that is, the intra prediction section 310 or the inter prediction section 311. In other words, for example, when the intra prediction mode is selected as the optimum prediction mode at the encoding side, the information related to the optimum prediction mode is supplied to the intra prediction section 310. Further, for example, when the inter prediction mode is selected as the optimum prediction mode at the encoding side, the information related to the optimum prediction mode is supplied to the inter prediction section 311.

Further, the lossless decoding section 302 supplies information necessary for inverse quantization such as a quantization matrix or a quantization parameter to the inverse quantization section 303 through the reordering buffer 321.

The reordering buffer 321 is supplied with various kinds of decoded data from the lossless decoding section 302 as described above. As described above, the encoding side encodes the image data in units of tiles when the picture is divided into tiles. When the encoded data input to the image decoding device 300 is encoded data of image data divided into tiles, data of respective LCUs is supplied to the reordering buffer 321 in units of tiles.

The reordering buffer 321 reorders data of the respective LCUs supplied in units of tiles in the raster scan order of the entire picture, and supplies the reordered data to the inverse quantization section 303, the intra prediction section 310, the inter prediction section 311, and the like.

For example, the reordering buffer 321 has a storage area as in (the storage area 92A of) the memory 92 of FIG. 10, and stores the data supplied from the lossless decoding section 302 in the storage area. Then, the reordering buffer 321 reads the stored data of each LCU in the raster scan order of the entire picture, and supplies the read data to the inverse quantization section 303, the intra prediction section 310, the inter prediction section 311, and the like in the same order.

Further, the configuration of the reordering buffer 321 and the implementation method of the reordering of data of the LCUs are arbitrary, and the reordering buffer 321 may have any other configuration and implement the reordering by reordering data of the LCUs of the tiles in the raster scan order of the entire picture by any other method.

The inverse quantization section 303 performs the inverse quantization on the coefficient data that has been reordered by the reordering buffer 321 and quantized according to a scheme corresponding to the quantization scheme of the quantization section 105. The inverse quantization section 303 is the same processing section as the inverse quantization section 108.

The inverse quantization section 303 supplies the obtained coefficient data to the inverse orthogonal transform section 304.

If necessary, the inverse orthogonal transform section 304 performs the inverse orthogonal transform on the orthogonal transform coefficient supplied from the inverse quantization section 230 according to a scheme corresponding to the orthogonal transform scheme of the orthogonal transform section 104. The inverse orthogonal transform section 304 is the same processing section as the inverse orthogonal transform section 109.

The image data of the differential image is restored through the inverse orthogonal transform process. The restored image data of the differential image corresponds to the image data of the differential image before the orthogonal transform is performed in the image encoding device. Hereinafter, the restored image data of the differential image obtained by the inverse orthogonal transform process of the inverse orthogonal transform section 304 is referred to as "decoded residual data." The inverse orthogonal transform section 304 supplies the decoded residual data to the operation section 305. Further, the operation section 305 is supplied with the image data of the prediction image from the intra prediction section 310 or the inter prediction section 311 via the prediction image selecting section 312.

The operation section 305 obtains the image data of the reconstructed image in which the differential image and the prediction image are added using the decoded residual data and the image data of the prediction image. The reconstructed image corresponds to the input image before the prediction image is subtracted by the operation section 103. The operation section 305 supplies the reconstructed image to the loop filter 306 and the intra prediction section 310.

The loop filter 306 generates a decoded image by appropriately performing a loop filter process including a deblock filter process, an adaptive loop filter process, or the like on the supplied reconstructed image. For example, the loop filter 306 removes block distortion by performing the deblock filter process on the reconstructed image. Further, for example, the loop filter 306 improves the image quality by performing the loop filter process on the deblock filter process result (the reconstructed image from which the block distortion has been removed) using a Wiener Filter.

A type of the filter process performed by the loop filter 306 is arbitrary, and a process other than the above-described filter process may be performed. Further, the loop filter 306 may perform the filter process using the filter coefficient supplied from the image encoding device.

The loop filter 306 supplies the decoded image (or the reconstructed image) serving as the filter process result to the screen reordering buffer 307 and the frame memory 309.

The screen reordering buffer 307 performs reordering of the frame order on the decoded image. In other words, the screen reordering buffer 307 reorders an image of respective frames reordered in the encoding order by the screen reordering buffer 102 in an original display order. In other words, the screen reordering buffer 307 stores the image data of the decoded image of the respective frames supplied in the encoding order in the order, reads the image data of the decoded image of the respective frames stored in the encoding order in the display order, and supplies the image data of the decoded image of the respective frames to the D/A conversion section 308. The D/A conversion section 308 performs the D/A conversion on the decoded image (digital data) of the respective frames supplied from the screen reordering buffer 307, and outputs analog data to be displayed on a display (not illustrated).

The frame memory 309 stores the supplied decoded image, and supplies the stored decoded image to the inter prediction section 344 as the reference image via the selecting section 220 at a certain timing or based on an external request from the inter prediction section 311, or the like.

The intra prediction section 310 acquires, for example, the information indicating the intra prediction mode obtained by decoding the header information in the lossless decoding section 302 via the reordering buffer 321. In other words, the intra prediction section 310 acquires, for example, the information indicating the intra prediction mode that has undergone the reordering performed by the reordering buffer 321.

The intra prediction section 310 performs the intra prediction in the intra prediction mode (the optimum intra prediction mode) used in the intra prediction section 113, and generates the prediction image. At this time, the intra prediction section 310 performs the intra prediction using the image data of the reconstructed image supplied from the operation section 305. In other words, the intra prediction section 310 uses the reconstructed image as the reference image (the neighboring pixel). The intra prediction section 310 supplies the generated prediction image to the prediction image selecting section 312.

The inter prediction section 311 acquires the information (the optimum prediction mode information, the reference image information, and the like) obtained by decoding the header information in the lossless decoding section 302 via the reordering buffer 321. In other words, the inter prediction section 311 acquires the optimum prediction mode information, the reference image information, and the like which have undergone the reordering by the reordering buffer 321.

The inter prediction section 311 performs the inter prediction using the reference image acquired from the frame memory 309 in the inter prediction mode (the optimum inter prediction mode) that is indicated by the optimum prediction mode information and used in the inter prediction section 114, and generates the prediction image.

The prediction image selecting section 312 supplies the prediction image from the intra prediction section 310 or the prediction image from the inter prediction section 311 to the operation section 305. Then, the operation section 305 obtains the reconstructed image in which the prediction image is added to the decoded residual data (the differential image information) from the inverse orthogonal transform section 304.

As described above, the reordering buffer 321 reorders the data of the respective LCUs in the raster scan order of the entire picture, and thus the respective processing sections such as the inverse quantization section 303, the inverse orthogonal transform section 304, the operation section 305, the loop filter 306, the intra prediction section 310, and the inter prediction section 311 can execute the respective processes on the data of the respective LCUs in the raster scan order of the entire picture.

Thus, the image decoding device 300 can suppress an increase in the memory capacity necessary in the decoding process, an increase in the processing delay of the decoding process, an increase in the number of memory accesses, and the like as in the example of FIGS. 8 to 10. In other words, the image decoding device 300 can suppress an increase in the decoding load.

<Flow of Decoding Process>

Figure 17:
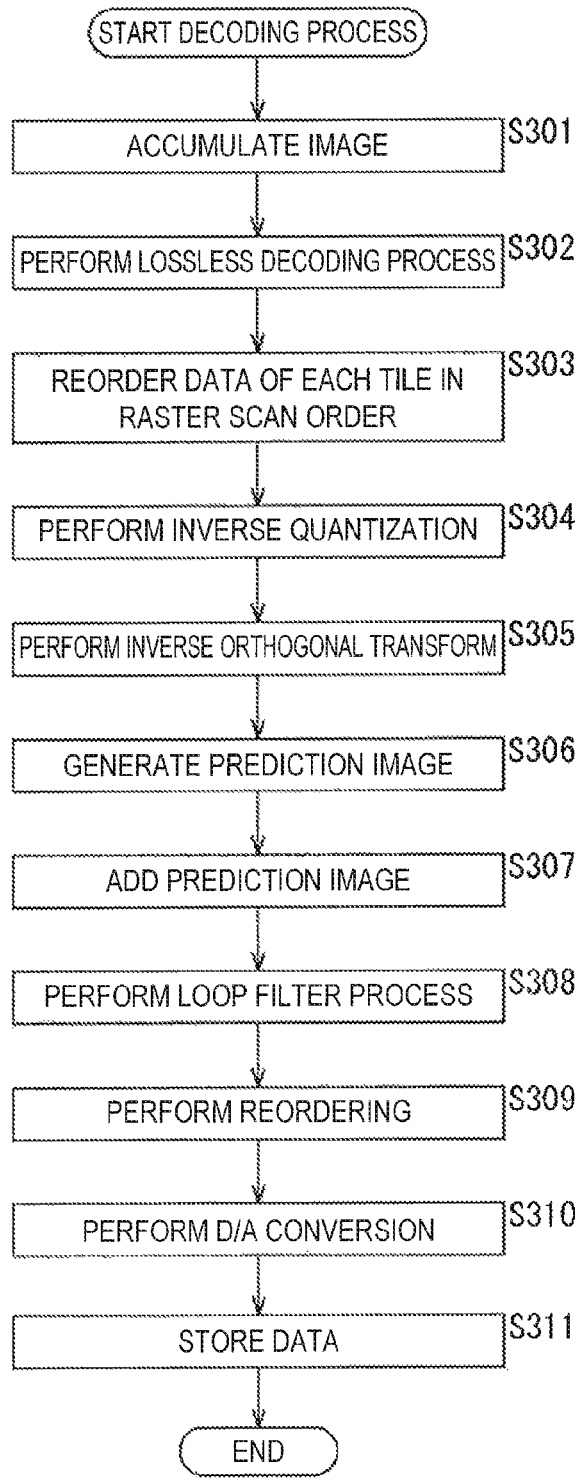
FIG. 17 is a flowchart for describing an example of the flow of a decoding process.

Next, an example of the flow of the decoding process performed by the image decoding device will be described with reference to a flowchart of FIG. 17.

After the decoding process starts, in step S301, the accumulation buffer 301 accumulates the transmitted bitstream (encoded data). In step S302, the lossless decoding section 302 decodes the bitstream (encoded data) supplied from the accumulation buffer 301. In other words, image data such as an I picture, a P picture, and a B picture encoded by the lossless encoding section 106 is decoded. At this time, various kinds of information are decoded in addition to the image data included in the bitstream such as the header information.

In step S303, the reordering buffer 321 reorders data of the LCUs obtained in units of tiles in the process of step S302 in the raster scan order of the entire picture. For example, the reordering buffer 321 performs the reordering by storing data of the LCUs obtained in units of tiles in the process of step S302 in an internal storage area and reading of the stored data in the raster scan order of the entire picture.

In step S304, the inverse quantization section 303 inversely quantizes the quantized coefficients reordered in the process of step S303.

In step S305, the inverse orthogonal transform section 304 performs the inverse orthogonal transform on the coefficients that have undergone the inverse quantization in step S304.

In step S306, the intra prediction section 310 or the inter prediction section 311 performs the prediction process, and generates the prediction image. In other words, the prediction process is performed in the prediction mode that is determined to be used at the time of encoding in the lossless decoding section 302. More specifically, for example, when the intra prediction is applied at the time of encoding, the intra prediction section 310 generates the prediction image in the intra prediction mode determined to be optimum at the time of encoding. Further, for example, when the inter prediction is applied at the time of encoding, the inter prediction section 311 generates the prediction image in the inter prediction mode determined to be optimum at the time of encoding.

In step S307, the operation section 305 adds the prediction image generated in step S306 to the differential image obtained by performing the inverse orthogonal transform in step S305. As a result, the image data of the reconstructed image is obtained.

In step S308, the loop filter 306 appropriately performs the loop filter process including the deblock filter process, the adaptive loop filter process, or the like on the image data of the reconstructed image obtained in the process of step S307.

In step S309, the screen reordering buffer 307 reorders the respective frames of the reconstructed image that has undergone the filter process in step S308. In other words, the order of the frames reordered at the time of encoding is changed to the original display order.

In step S310, the D/A conversion section 308 performs the D/A conversion on the image in which the order of the frames is reordered in step S309. The image is output to a display (not illustrated), and the image is displayed.

In Step S311, the frame memory 309 stores the image that has undergone the filter process in Step S308.

When the process of step S311 ends, the decoding process ends.

As the processes are performed as described above, the image decoding device 300 can suppress an increase in the decoding load.

4. Third Embodiment

<Application to Multi-View Image Coding/Multi-View Image Decoding>

Figure 18:
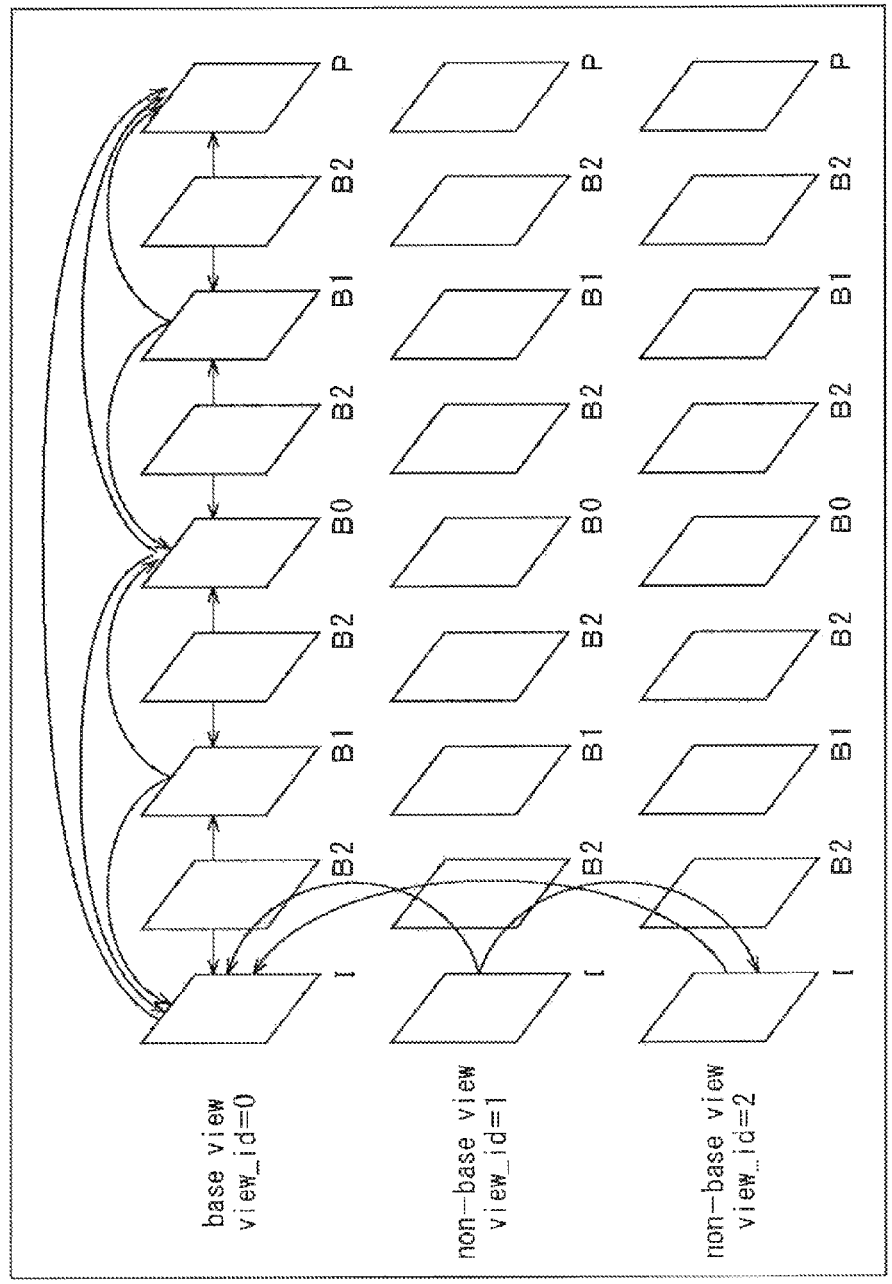
FIG. 18 is a diagram illustrating an example of a multi-view image encoding scheme.

The series of processes described above can be applied to multi-view image coding and multi-view image decoding. FIG. 18 illustrates an exemplary multi-view image coding scheme.

Figure 34:
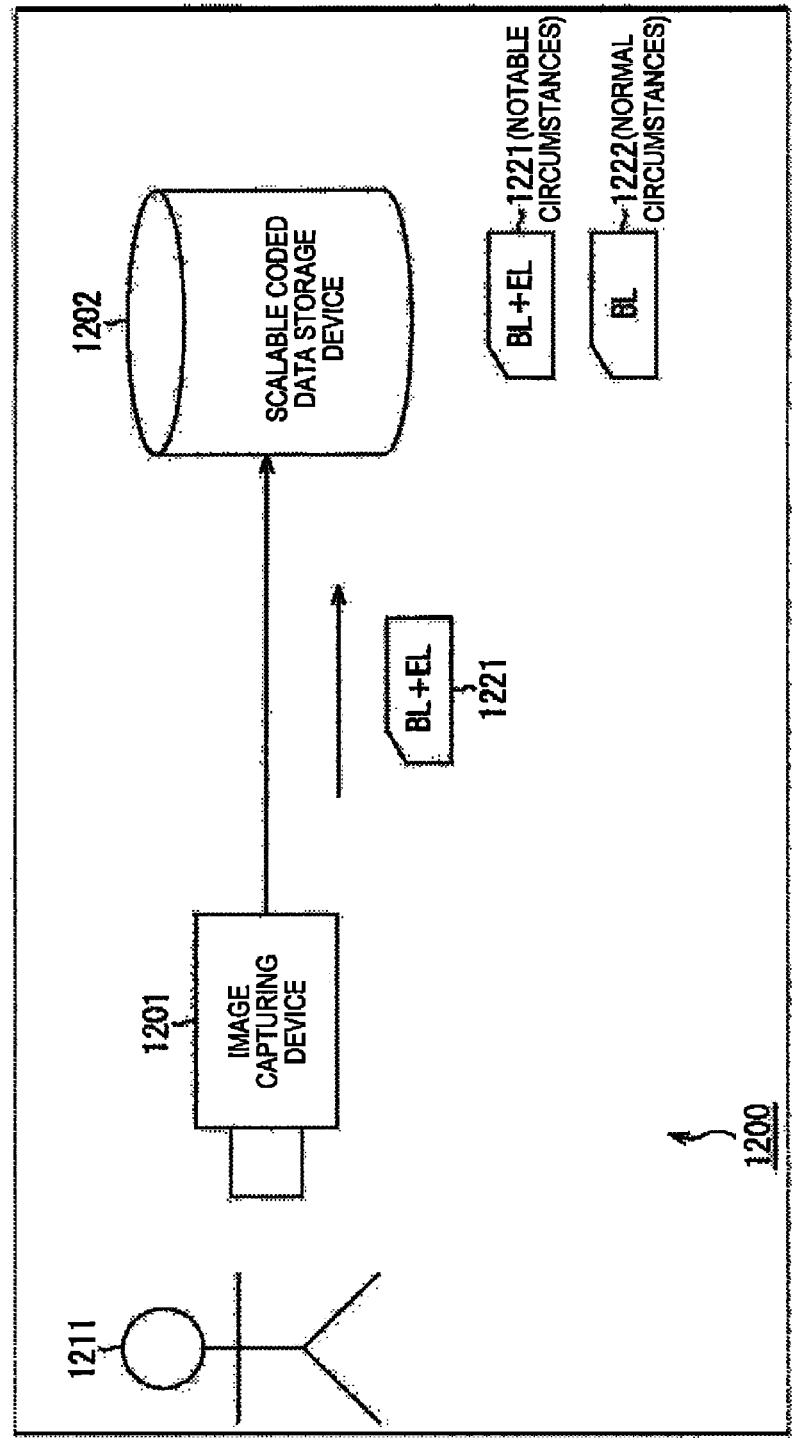
FIG. 34 is a block diagram illustrating another example of using scalable video coding.

As illustrated in FIG. 34, a multi-view image includes images of a plurality of views. A plurality of views of the multi-view image include a base view in which encoding and decoding are performed using only an image of its own view without using an image of another view and a non-base view in which encoding and decoding are performed using an image of another view. The non-base view may use the image of the base view or an image of another non-base view.

When the multi-view image illustrated in FIG. 18 is encoded or decoded, an image of each view is encoded or decoded, but the above-described method of the second embodiment may be applied to decoding of each view. As a result, it is possible to suppress an increase in the decoding load of each view.

Furthermore, in the coding and decoding of each view, the flags or parameters used in the method in the first embodiment and the second embodiment described above may be shared. In this way, transmission of redundant information is suppressed, and transmitted information (coding amount) can be reduced (in other words, the deterioration of the coding efficiency can be suppressed).

More specifically, for example, the syntax elements such as the sequence parameter set, the picture parameter set, and the slice header may be shared in encoding and decoding of each view.

In addition, necessary information other than that can be shared in the coding and decoding of each view.

<Multi-View Image Encoding Device>

Figure 19:
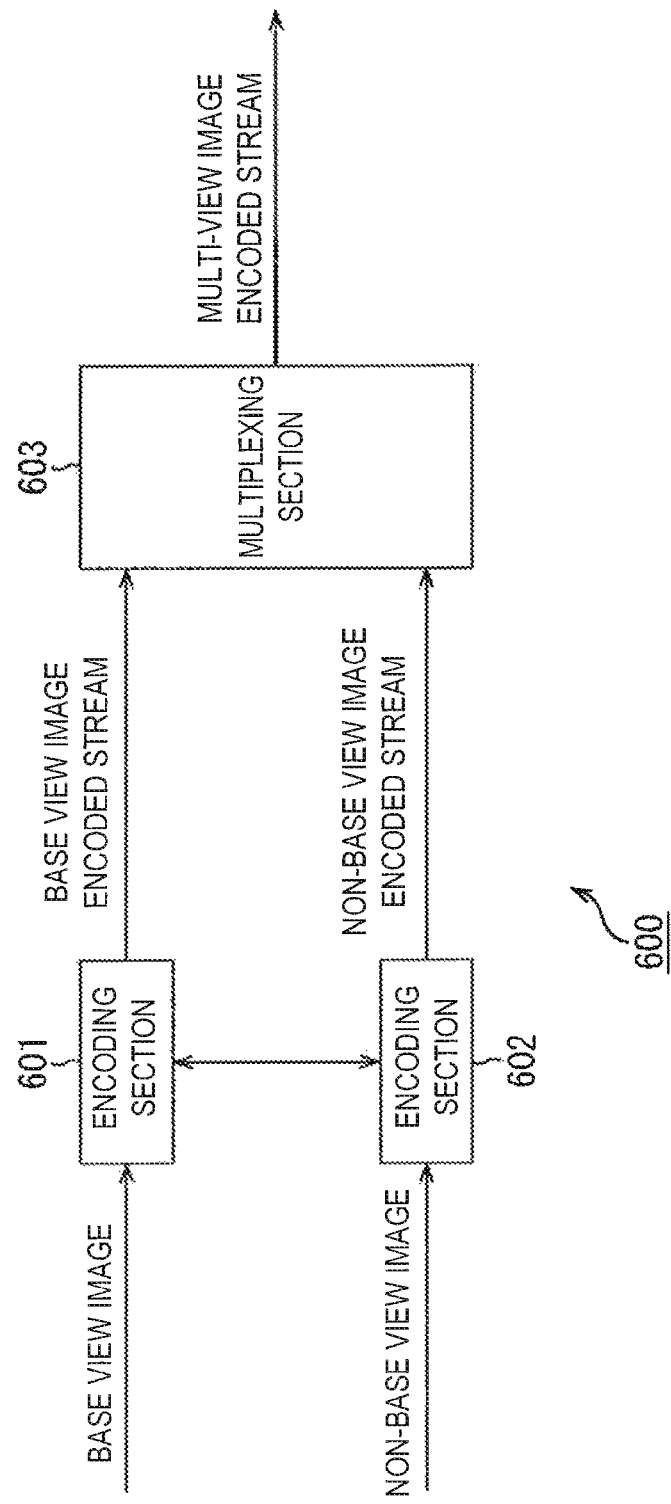
FIG. 19 is a diagram illustrating an example of a main configuration of a multi-view image encoding device to which the present disclosure is applied.

FIG. 19 is a diagram illustrating a multi-view image coding device that performs the multi-view image encoding. As illustrated in FIG. 19, a multi-view image encoding device 600 includes an encoding section 601, an encoding section 602, and a multiplexing unit 603.

The encoding section 601 encodes a base view image and generates a base view image encoded stream. The encoding section 602 encodes a non-base view image and generates a non-base view image encoded stream. The multiplexing section 603 multiplexes the base view image encoded stream generated in the encoding section 601 and the non-base view image encoded stream generated in the encoding section 602, and generates a multi-view image encoded stream.

The image encoding device 100 (FIG. 14) may be applied to the encoding section 601 and the encoding section 602 of the multi-view image encoding device 600. Further, the encoding section 601 and the encoding section 602 can perform encoding using the same flag or parameter (that is, can share the flag or parameter), and thus it is possible to suppress a reduction in encoding efficiency.

<Multi-View Image Decoding Device>

Figure 20:
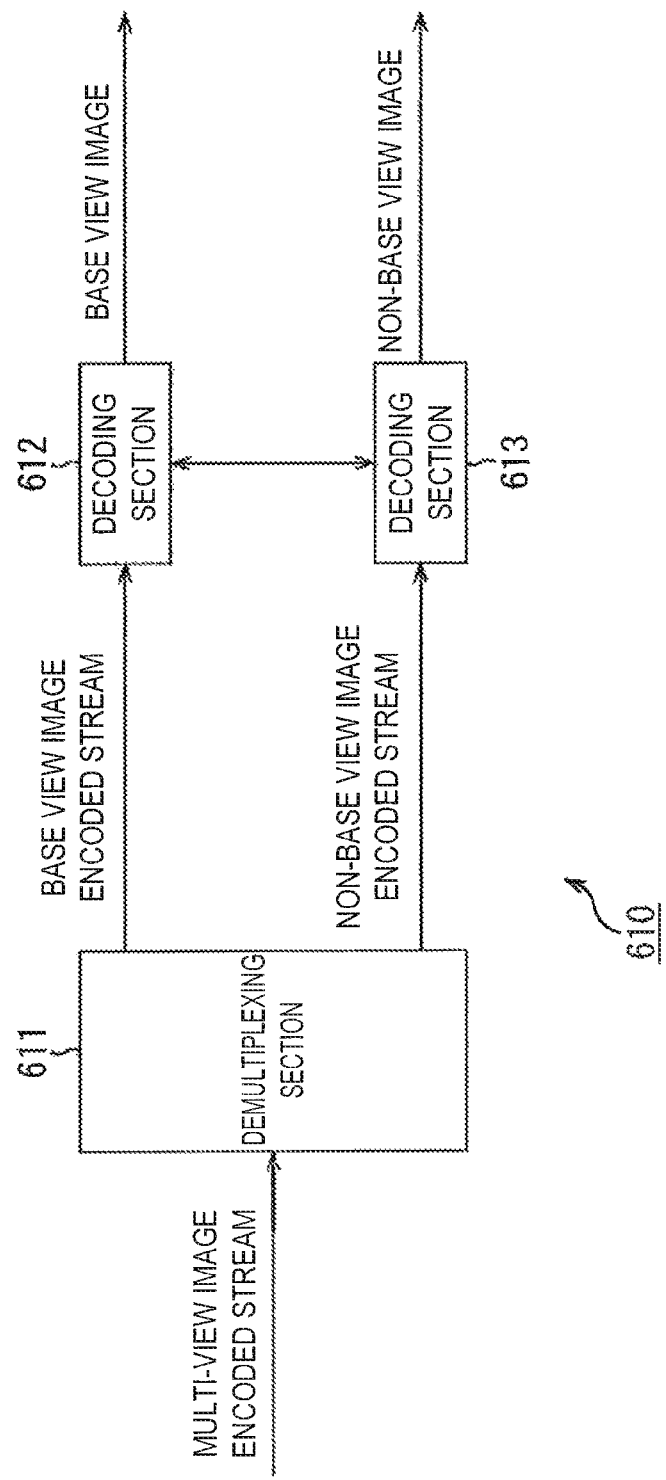
FIG. 20 is a diagram illustrating an example of a main configuration of a multi-view image decoding device to which the present disclosure is applied.

FIG. 20 is a diagram illustrating a multi-view image decoding device that performs the multi-view image decoding. As illustrated in FIG. 20, a multi-view image decoding device 610 includes an inverse multiplexing unit 611, a decoding section 612, and a decoding section 613.

The inverse multiplexing section 611 inversely multiplexes a multi-view image encoded stream in which a base view image encoded stream and a non-base view image encoded stream are multiplexed, and extracts the base view image encoded stream and the non-base view image encoded stream. The decoding section 612 decodes the base view image encoded stream extracted by the inverse multiplexing section 611 and obtains a base view image. The decoding section 613 decodes the non-base view image encoded stream extracted by the inverse multiplexing section 611 and obtains a non-base view image.

The image decoding device 300 (FIG. 16) may be applied to the decoding section 612 and the decoding section 613 of the multi-view image decoding device 610. In other words, in the decoding of each view, the lossless decoding may be performed on the encoded data in units of tiles, the obtained block data of each tile may be reordered in the raster scan order of the entire picture, and the subsequent process such as the transform process and the prediction process may be performed on the block data in the same order. Further, the decoding section 612 and the decoding section 613 can perform decoding using the same flag or parameter (that is, can share the flag or parameter), and thus it is possible to suppress a reduction in encoding efficiency.

5. Fourth Embodiment

<Application to Layered Image Encoding and Layered Image Decoding>

Figure 21:
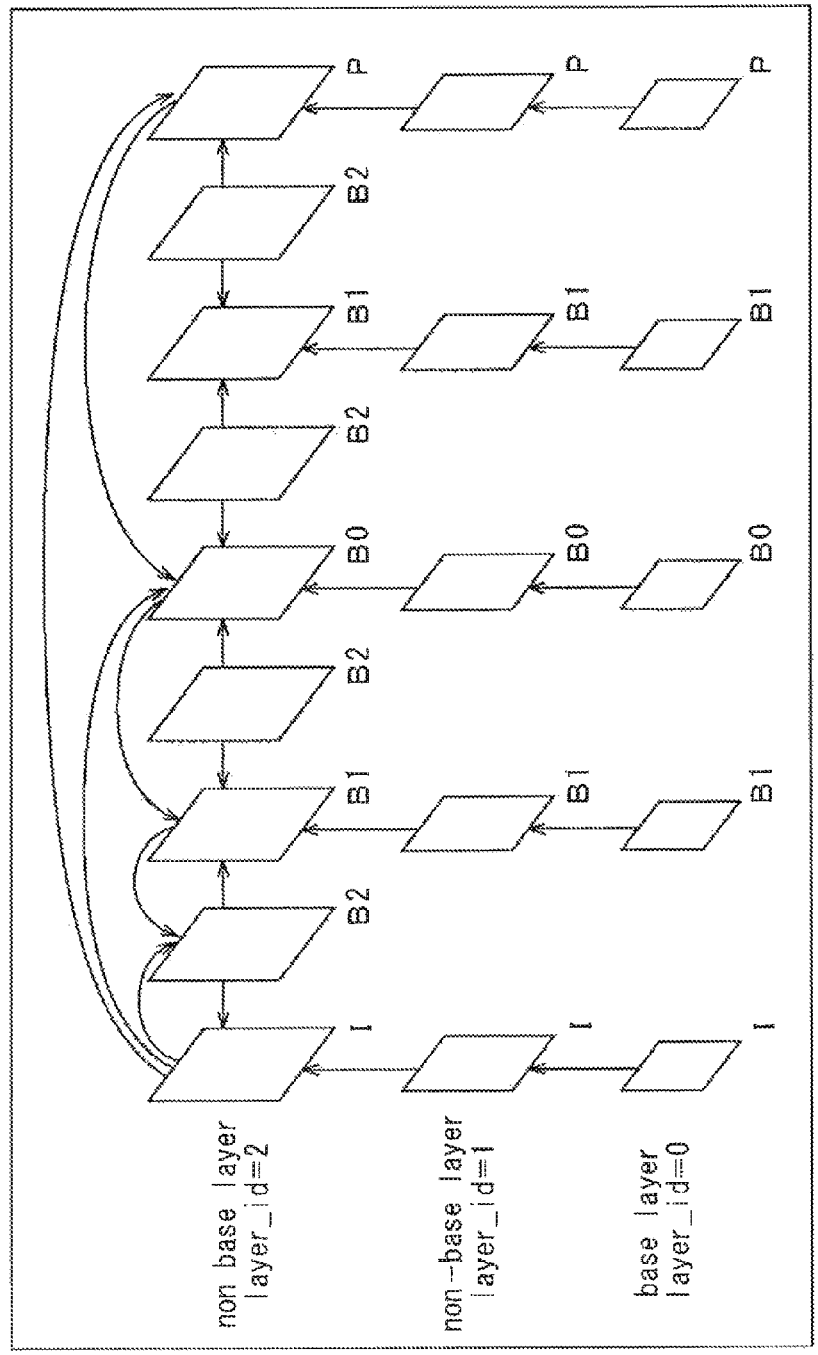
FIG. 21 is a diagram illustrating an example of a layered image encoding scheme.

The above-described series of processes can be applied to layered image encoding and layered image decoding (scalable video coding and scalable video decoding). FIG. 21 illustrates an example of a layered image encoding scheme.

In the layered image encoding (the scalable video coding), an image is divided (hierarchized) into a plurality of layers so that image data has a scalability function for a certain parameter, and encoding is performed for each layer. The layered image decoding, the layered image encoding (the scalable video decoding), is decoding corresponding to the layered image encoding.

As illustrated in FIG. 21, in hierarchization of an image, one image is divided into a plurality of images (layers) based on a certain parameter with a scalability function. In other words, a hierarchized image (a layered image) includes a plurality of layers that differ in a value of a certain parameter. The plurality of layers of the layered image are configured with a base layer on which encoding and decoding are performed using only an image of its own layer without using an image of another layer and a non-base layer (which is also referred to as an "enhancement layer") on which encoding and decoding are performed using an image of another layer. For the non-base layer, an image of the base layer may be used, and an image of another non-base layer may be used.

Generally, in order to reduce the redundancy, the non-base layer is configured with data (differential data) of a differential image between an image of its own and an image of another layer. For example, when one image is hierarchized into two layers, that is, the base layer and the non-base layer (also referred to as an "enhancement layer"), an image of a lower quality than an original image is obtained using only data of the base layer, and an original image (that is, a high-quality image) is obtained by combining data of the base layer with data of the enhancement layer.

As an image is hierarchized as described above, it is possible to obtain images of various qualities according to the situation. For example, for a terminal having a low processing capability such as a mobile phone, image compression information of only a base layer is transmitted, and a moving image of low spatial and temporal resolutions or a low quality is reproduced, and for a terminal having a high processing capability such as a television or a personal computer, image compression information of an enhancement layer as well as a base layer is transmitted, and a moving image of high spatial and temporal resolutions or a high quality is reproduced. In other words, image compression information according to a capability of a terminal or a network can be transmitted from a server without performing the transcoding process.

When the layered image illustrated in FIG. 21 is encoded or decoded, an image of each layer is encoded or decoded, but the above-described method of the second embodiment may be applied to decoding of each layer. As a result, it is possible to suppress an increase in the decoding load of each layer.

In addition, in the coding and decoding of each layer, the flags or parameters used in the method in the first embodiment and the second embodiment described above may be shared. In this way, transmission of redundant information is suppressed, and transmitted information (coding amount) can be reduced (in other words, the deterioration of the coding efficiency can be suppressed).

More specifically, for example, the syntax elements such as the sequence parameter set, the picture parameter set, and the slice header may be shared in encoding and decoding of each layer.

In addition, necessary information other than that can be shared in the coding and decoding of each layer.

<Scalable Parameter>

Figure 22:
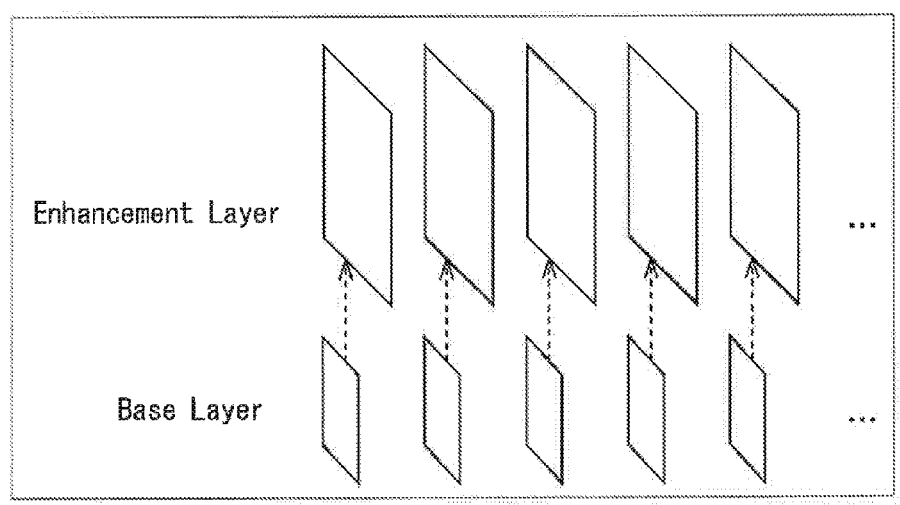
FIG. 22 is a diagram for describing an example of spatial scalable video coding.

In such layered image encoding and layered image decoding (scalable video encoding and scalable video decoding), a parameter with a scalability function is arbitrary. For example, spatial resolution as illustrated in FIG. 22 may be its parameter (spatial scalability). When the spatial scalability differs, respective layers have different resolutions of an image. In other words, each picture is hierarchized into two layers, that is, a base layer of a resolution spatially lower than that of an original image and an enhancement layer that is combined with an image of the base layer to obtain an original image (an original spatial resolution) as illustrated in FIG. 22. Of course, the number of layers is an example, and each picture can be hierarchized into an arbitrary number of layers.

Figure 23:
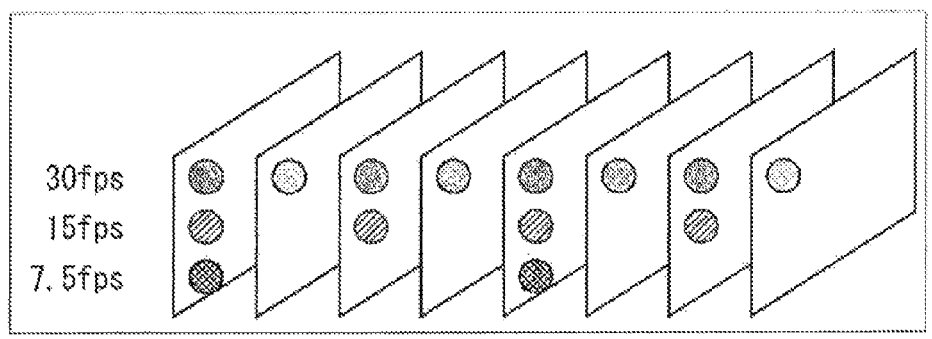
FIG. 23 is a diagram for describing an example of temporal scalable video coding.

As another parameter having such scalability, for example, a temporal resolution (temporal scalability) as illustrated in FIG. 23 may be applied. In the case of the temporal scalability, respective layers have different frame rates. In other words, in this case, each picture is hierarchized into layers having different frame rates, a moving image of a high frame rate can be obtained by combining a layer of a high frame rate with a layer of a low frame rate, and an original moving image (an original frame rate) can be obtained by combining all the layers as illustrated in FIG. 23. The number of layers is an example, and each picture can be hierarchized into an arbitrary number of layers.

Figure 24:
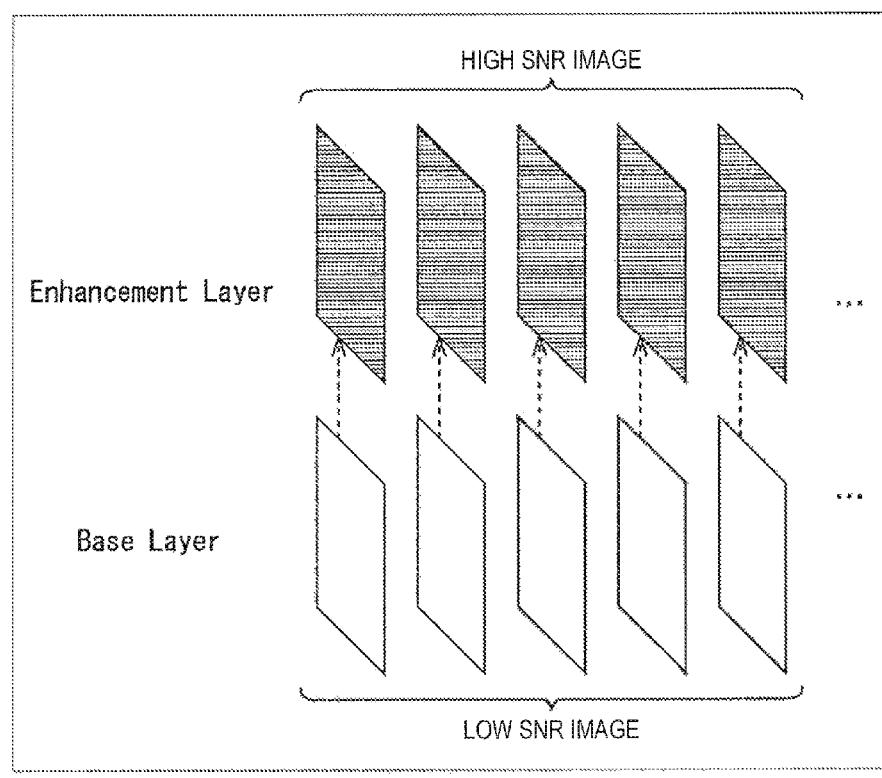
FIG. 24 is a diagram for describing an example of scalable video coding of a signal to noise ratio.

Further, as another parameter having such scalability, for example, there is a signal-to-noise ratio (SNR) (SNR scalability). In the case of the SNR scalability, respective layers having different SNRs. In other words, in this case, each picture is hierarchized into two layers, that is, a base layer of an SNR lower than that of an original image and an enhancement layer that is combined with an image of the base layer to obtain an original SNR as illustrated in FIG. 24. In other words, for base layer image compression information, information related to an image of a low PSNR is transmitted, and a high PSNR image can be reconstructed by combining the information with the enhancement layer image compression information. Of course, the number of layers is an example, and each picture can be hierarchized into an arbitrary number of layers.

A parameter other than the above-described examples may be applied as a parameter having scalability. For example, there is bit-depth scalability in which the base layer includes an 8-bit image, and a 10-bit image can be obtained by adding the enhancement layer to the base layer.

Further, there is chroma scalability in which the base layer includes a component image of a 4:2:0 format, and a component image of a 4:2:2 format can be obtained by adding the enhancement layer to the base layer.

<Layered Image Encoding Device>

Figure 25:
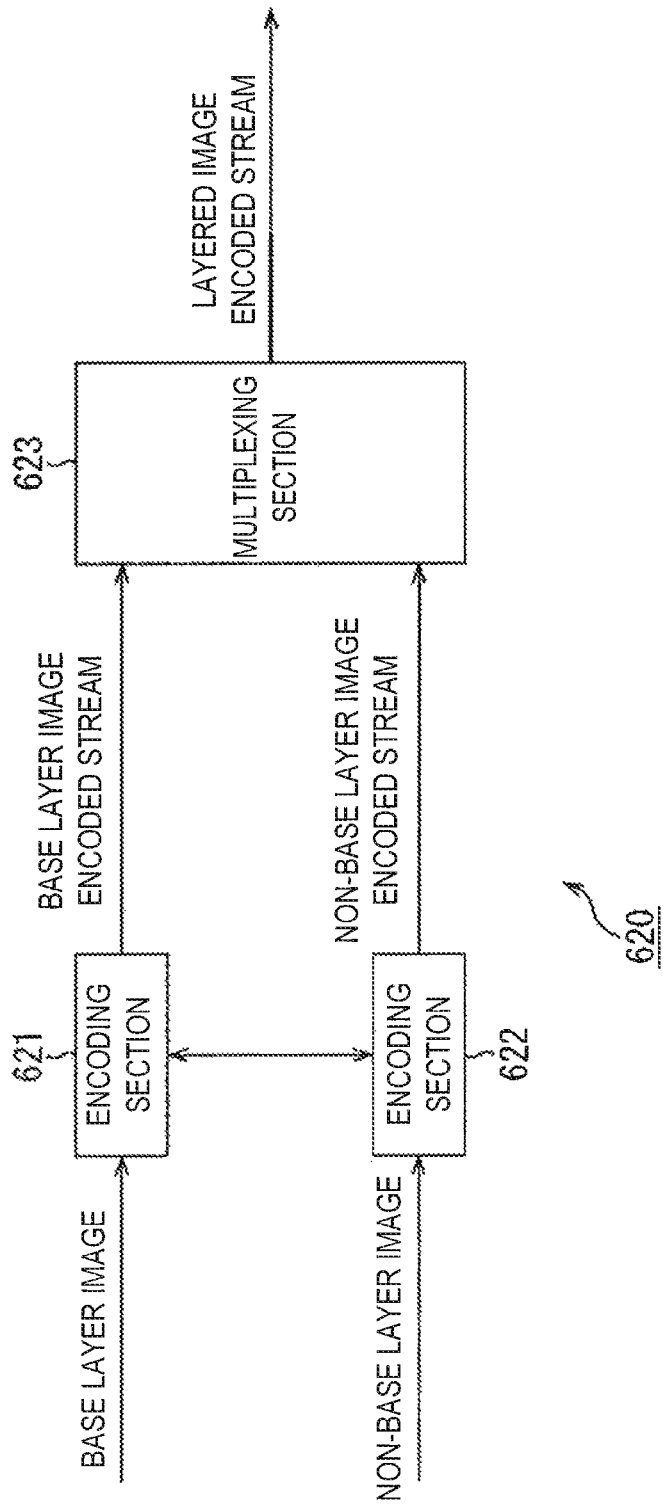
FIG. 25 is a diagram illustrating a main configuration example of a layered image encoding device to which the present technology is applied.

FIG. 25 is a diagram illustrating a layered image encoding device that performs the layered image encoding. As illustrated in FIG. 25, a layered image encoding device 620 includes an encoding section 621, an encoding section 622 and a multiplexing unit 623.

The encoding section 621 encodes a base layer image and generates a base layered image encoding device image encoded stream. The encoding section 602 encodes a non-base layered image encoding device image and generates a non-base layered image encoding device image encoded stream. The multiplexing section 603 multiplexes the base layered image encoding device image encoded stream generated in the encoding section 601 and the non-base layered image encoding device image encoded stream generated in the encoding section 602, and generates a layered image encoded stream.

The image encoding device 100 (FIG. 14) may be applied to the encoding section 621 and the encoding section 622 of the layered image encoding device 620. Further, the encoding section 621 and the encoding section 622 can perform, for example, control of the filter process of the intra prediction using the same flag or parameter (that is, can share the flag or parameter), and thus it is possible to suppress a reduction in encoding efficiency.

<Layered Image Decoding Device>

Figure 26:
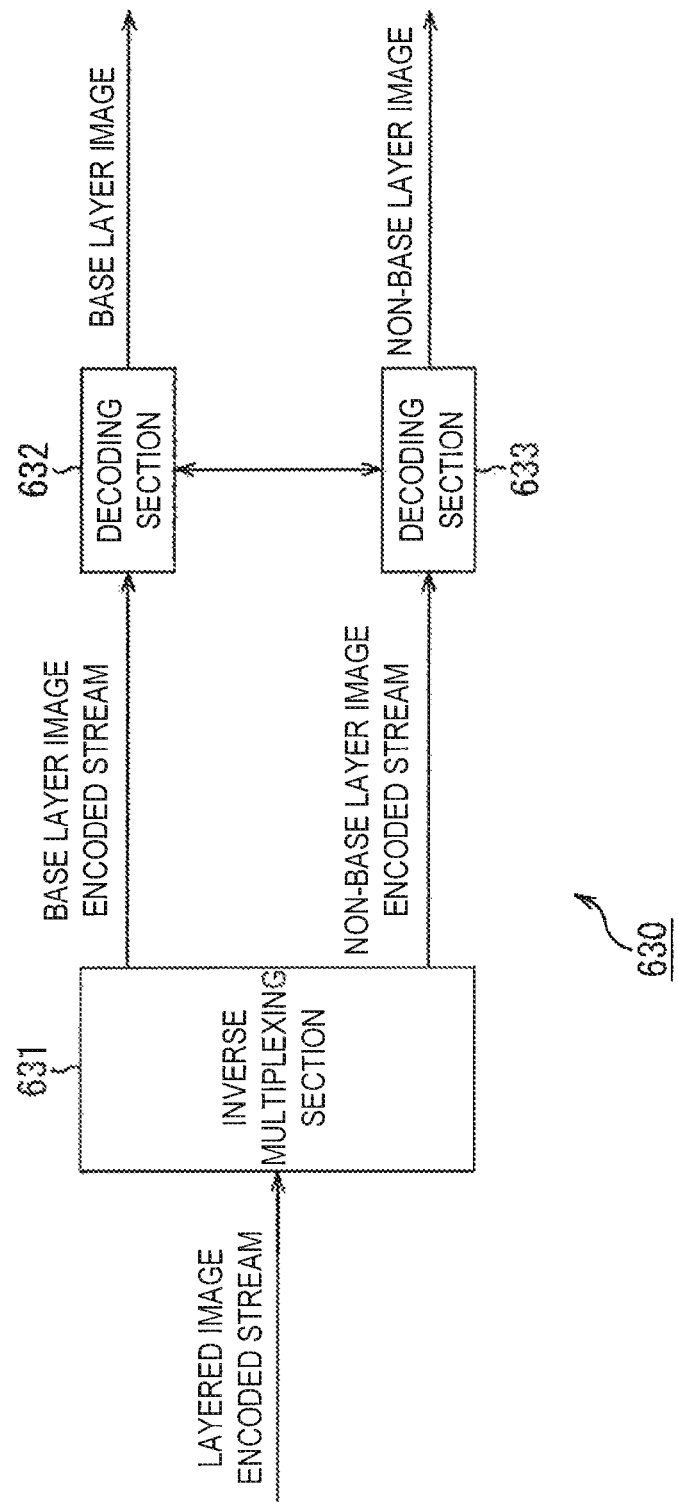
FIG. 26 is a diagram illustrating a main configuration example of a layered image decoding device to which the present technology is applied.

FIG. 26 is a diagram illustrating the layered image decoding device that performs the layered image decoding. As illustrated in FIG. 26, the layered image decoding device 630 includes an inverse multiplexing section 631, a decoding section 632, and a decoding section 633.

The inverse multiplexing section 631 inversely multiplexes the layered image encoded stream in which the base layer image encoded stream and the non-base layer image encoded stream are multiplexed, and extracts the base layer image encoded stream and the non-base layer image encoded stream. The decoding section 632 decodes the base layer image encoded stream extracted by the inverse multiplexing section 631, and obtains the base layer image. The decoding section 633 decodes the non-base layer image encoded stream extracted by the inverse multiplexing section 631, and obtains the non-base layer image.

The image decoding device 300 (FIG. 16) may be applied to the decoding section 632 and the decoding section 633 of the layered image decoding device 630. In other words, in decoding of each layer, the lossless decoding may be performed on the encoded data in units of tiles, the obtained block data of each tile may be reordered in the raster scan order of the entire picture, and the subsequent process such as the transform process and the prediction process may be performed on the block data in the same order. Further, the decoding section 612 and the decoding section 613 can perform decoding using the same flag or parameter (that is, can share the flag or parameter), and thus it is possible to suppress a reduction in encoding efficiency.

As described above, the present technology can be applied to all image decoding devices that decode encoded data of image data.

For example, the present technology can be applied to an image encoding device and an image decoding device used when image information (bitstream) compressed by an orthogonal transform such as a discrete cosine transform and motion compensation as in MPEG and H.26x is received via a network medium such as satellite broadcasting, cable television, the Internet, or a mobile telephone. Further, the present technology can be applied to an image encoding device and an image decoding device used when processing is performed on a storage medium such as an optical disc, a magnetic disk, or a flash memory.

4. Fourth Embodiment

<Computer>

The above described series of processes can be executed by hardware or can be executed by software. When the series of processes are to be performed by software, the programs forming the software are installed into a computer. Here, a computer includes a computer which is incorporated in dedicated hardware or a general-purpose personal computer (PC) which can execute various functions by installing various programs into the computer, for example.

Figure 27:
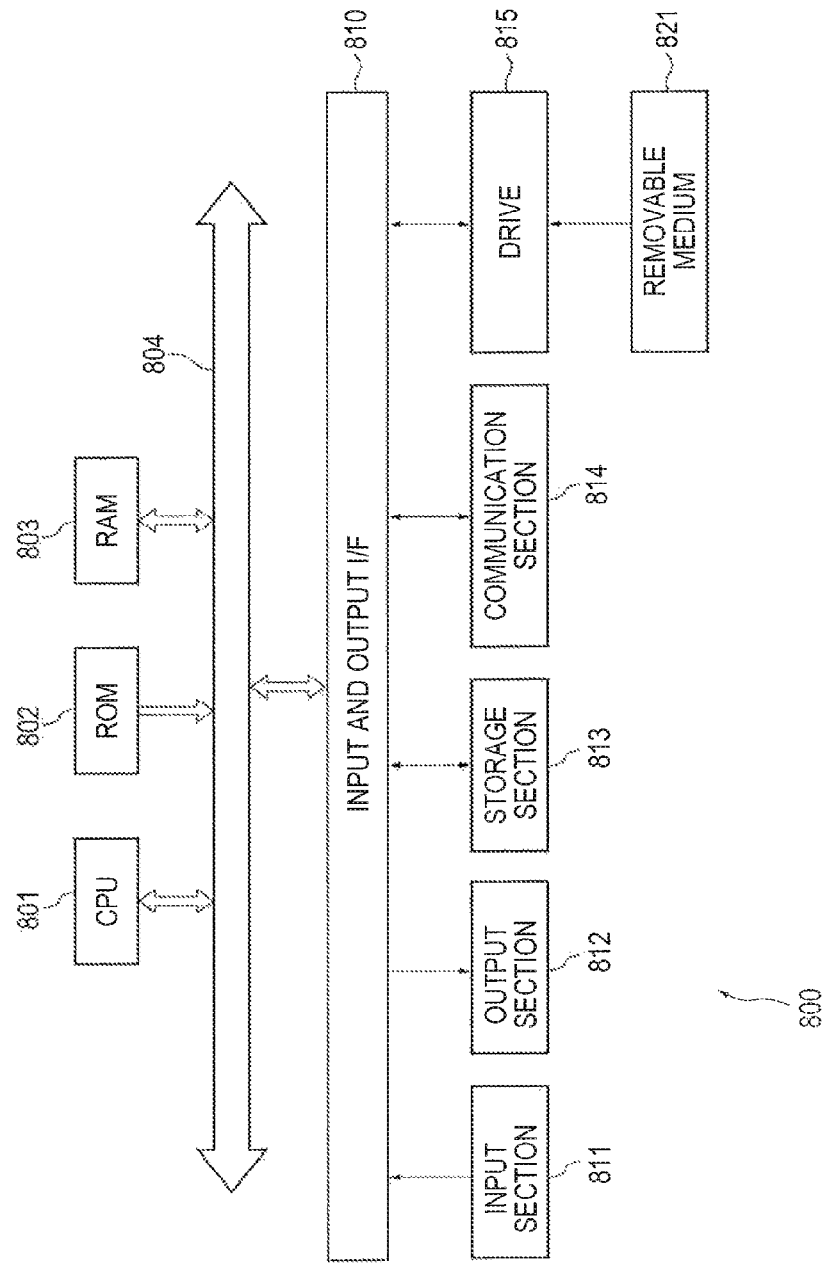
FIG. 27 is a block diagram illustrating an example of a main configuration of a computer.

FIG. 27 is a block diagram illustrating a configuration example of hardware of a computer for executing the above-described series of processes through a program.

In a computer 800 shown in FIG. 37, a central processing unit (CPU) 801, a read only memory (ROM) 802, and a random access memory (RAM) 803 are connected to one another by a bus 804.

An input and output interface 810 is further connected to the bus 804. An input section 811, an output section 812, a storage section 813, a communication section 814, and a drive 815 are connected to the input and output interface 810.

The input section 811 is formed with a keyboard, a mouse, a microphone, a touch panel, an input terminal, and the like. The output section 812 is formed with a display, a speaker, an output terminal, and the like. The storage section 813 is formed with a hard disk, a RAM disk, a nonvolatile memory, or the like. The communication section 814 is formed with a network interface or the like. The drive 815 drives a removable medium 821 such as a magnetic disk, an optical disk, a magneto-optical disk, or a semiconductor memory.

In the computer configured as described above, the CPU 801 loads the programs stored in the storage section 813 into the RAM 803 via the input and output interface 810 and the bus 804, and executes the programs, so that the above described series of processes are performed. The RAM 803 also stores data necessary for the CPU 801 to execute the various processes.

The program executed by the computer (the CPU 801) may be provided by being recorded on the removable medium 821 as a packaged medium or the like. Further, the program may be provided through a wired or wireless transmission medium such as a local area network, the Internet, or digital broadcasting.

In the computer, the program can be installed into the storage section via 813 the input and output interface 810 by mounting the removable medium 821 on the drive 815. Alternatively, the program can be received by the communication section 814 via a wired or wireless transmission medium and can be installed in the storage section 813. As another alternative, the program can also be installed in advance into the ROM 802 or the storage section 813.

It should be noted that the program executed by a computer may be a program that is processed in time series according to the sequence described in this specification or a program that is processed in parallel or at necessary timing such as upon calling.

In the present disclosure, steps of describing the program to be recorded on the recording medium may include processing performed in time-series according to the description order and processing not processed in time-series but performed in parallel or individually.

In addition, in this disclosure, a system means a set of a plurality of elements (devices, modules (parts), or the like) regardless of whether or not all elements are arranged in a single housing. Thus, both a plurality of devices that are accommodated in separate housings and connected via a network and a single device in which a plurality of modules are accommodated in a single housing are systems.

Further, an element described as a single device (or processing unit) above may be divided and configured as a plurality of devices (or processing units). On the contrary, elements described as a plurality of devices (or processing units) above may be configured collectively as a single device (or processing unit). Further, an element other than those described above may be added to each device (or processing unit). Furthermore, a part of an element of a given device (or processing unit) may be included in an element of another device (or another processing unit) as long as the configuration or operation of the system as a whole is substantially the same.

The preferred embodiments of the present disclosure have been described above with reference to the accompanying drawings, whilst the present invention is not limited to the above examples, of course. A person skilled in the art may find various alterations and modifications within the scope of the appended claims, and it should be understood that they will naturally come under the technical scope of the present disclosure.

For example, the present disclosure can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

The image encoding device and the image decoding device according to the embodiment may be applied to various electronic devices such as transmitters and receivers for satellite broadcasting, cable broadcasting such as cable TV, distribution on the Internet, distribution to terminals via cellular communication and the like, recording devices that record images in a medium such as optical discs, magnetic disks and flash memory, and reproduction devices that reproduce images from such storage medium. Four applications will be described below.

7. Applications

<First Application: Television Receiver>

Figure 28:
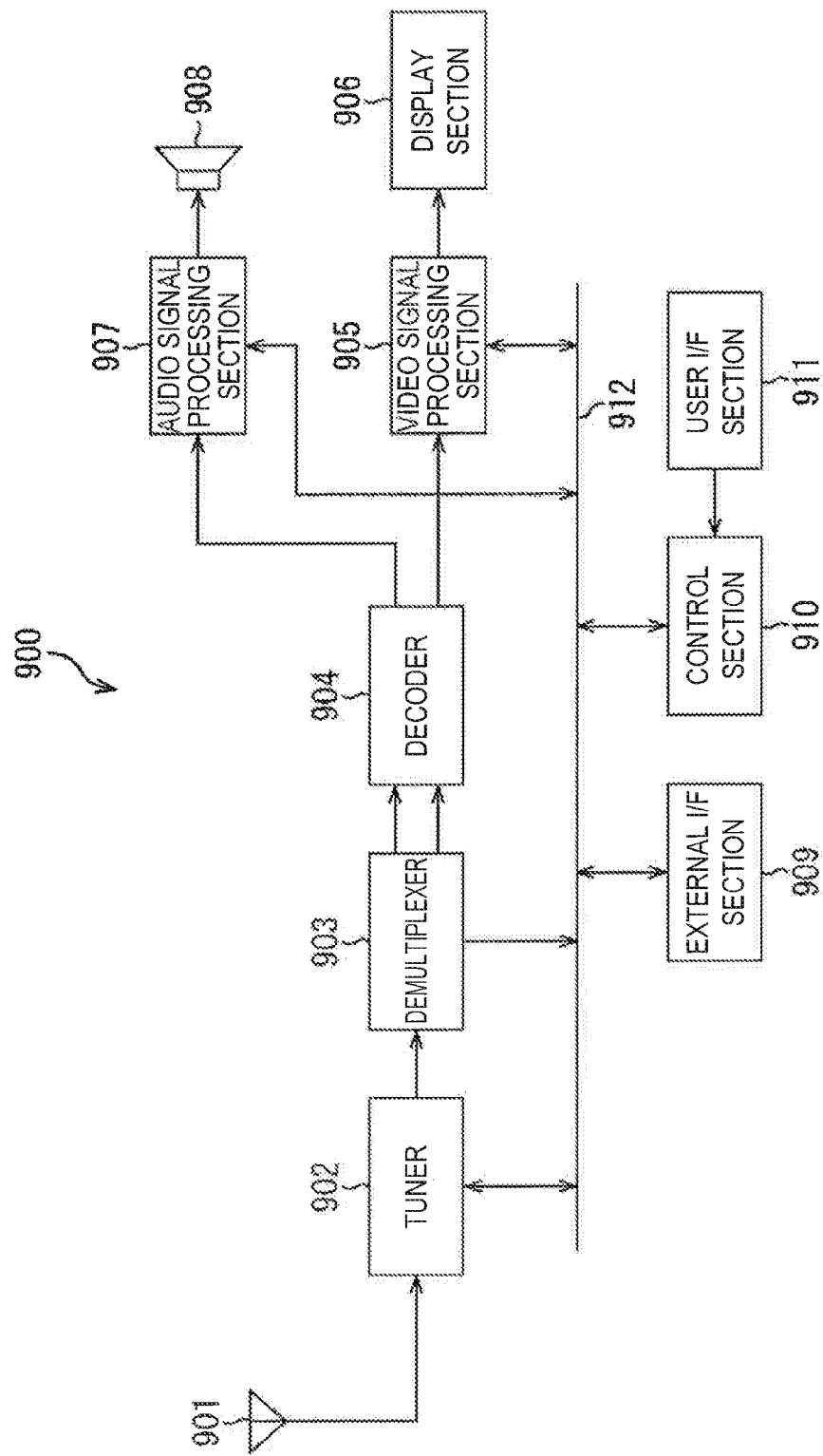
FIG. 28 is a block diagram illustrating an example of a schematic configuration of a television device.

FIG. 28 illustrates an example of a schematic configuration of a television device to which the embodiment is applied. A television device 900 includes an antenna 901, a tuner 902, a demultiplexer 903, a decoder 904, an video signal processing section 905, a display section 906, an audio signal processing section 907, a speaker 908, an external interface (I/F) section 909, a control section 910, a user interface (I/F) 911, and a bus 912.

The tuner 902 extracts a signal of a desired channel from broadcast signals received via the antenna 901, and demodulates the extracted signal. The tuner 902 then outputs an encoded bitstream obtained through the demodulation to the demultiplexer 903. That is, the tuner 902 serves as a transmission unit of the television device 900 for receiving an encoded stream in which an image is encoded.

The demultiplexer 903 demultiplexes the encoded bitstream to obtain a video stream and an audio stream of a program to be viewed, and outputs each stream obtained through the demultiplexing to the decoder 904. The demultiplexer 903 also extracts auxiliary data such as electronic program guides (EPGs) from the encoded bitstream, and supplies the extracted data to the control section 910. Additionally, the demultiplexer 903 may perform descrambling when the encoded bitstream has been scrambled.

The decoder 904 decodes the video stream and the audio stream input from the demultiplexer 903. The decoder 904 then outputs video data generated in the decoding process to the video signal processing section 905. The decoder 904 also outputs the audio data generated in the decoding process to the audio signal processing section 907.

The video signal processing section 905 reproduces the video data input from the decoder 904, and causes the display section 906 to display the video. The video signal processing section 905 may also cause the display section 906 to display an application screen supplied via a network. Further, the video signal processing section 905 may perform an additional process such as noise removal, for example, on the video data in accordance with the setting. Furthermore, the video signal processing section 905 may generate an image of a graphical user interface (GUI) such as a menu, a button and a cursor, and superimpose the generated image on an output image.

The display section 906 is driven by a drive signal supplied from the video signal processing section 905, and displays a video or an image on a video screen of a display device (e.g. liquid crystal display, plasma display, organic electroluminescence display (OLED), etc.).

The audio signal processing section 907 performs a reproduction process such as D/A conversion and amplification on the audio data input from the decoder 904, and outputs a sound from the speaker 908. The audio signal processing section 907 may also perform an additional process such as noise removal on the audio data.

The external interface section 909 is an interface for connecting the television device 900 to an external device or a network. For example, a video stream or an audio stream received via the external interface section 909 may be decoded by the decoder 904. That is, the external interface section 909 also serves as a transmission unit of the television device 900 for receiving an encoded stream in which an image is encoded.

The control section 910 includes a processor such as a central processing unit (CPU), and a memory such as random access memory (RAM) and read only memory (ROM). The memory stores a program to be executed by the CPU, program data, EPG data, data acquired via a network, and the like. The program stored in the memory is read out and executed by the CPU at the time of activation of the television device 900, for example. The CPU controls the operation of the television device 900, for example, in accordance with an operation signal input from the user interface section 911 by executing the program.

The user interface section 911 is connected to the control section 910. The user interface section 911 includes, for example, a button and a switch used for a user to operate the television device 900, and a receiving section for a remote control signal. The user interface section 911 detects an operation of a user via these structural elements, generates an operation signal, and outputs the generated operation signal to the control section 910.

The bus 912 connects the tuner 902, the demultiplexer 903, the decoder 904, the video signal processing section 905, the audio signal processing section 907, the external interface section 909, and the control section 910 to each other.

The decoder 904 has a function of the image decoding device 300 (FIG. 16) according to the embodiment in the television device 900 configured in this manner. Accordingly, it is possible to suppress an increase in the decoding load when an image is decoded in the television device 900.

<Second Application: Mobile Phone>

Figure 29:
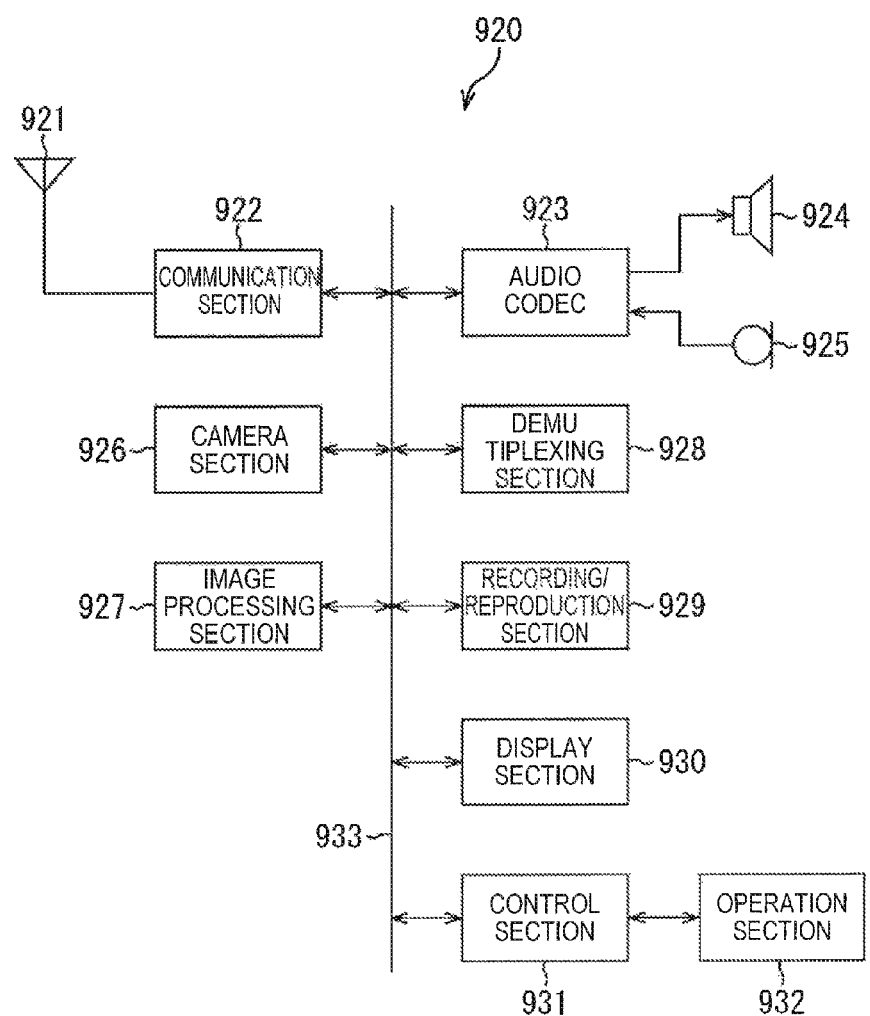
FIG. 29 is a block diagram illustrating an example of a schematic configuration of a mobile phone.

FIG. 29 illustrates an example of a schematic configuration of a mobile phone to which the embodiment is applied.

A mobile phone 920 includes an antenna 921, a communication section 922, an audio codec 923, a speaker 924, a microphone 925, a camera section 926, an image processing section 927, a demultiplexing section 928, a recording/reproduction section 929, a display section 930, a control section 931, an operation section 932, and a bus 933.

The antenna 921 is connected to the communication section 922. The speaker 924 and the microphone 925 are connected to the audio codec 923. The operation section 932 is connected to the control section 931. The bus 933 connects the communication section 922, the audio codec 923, the camera section 926, the image processing section 927, the demultiplexing section 928, the recording/reproduction section 929, the display section 930, and the control section 931 to each other.

The mobile phone 920 performs an operation such as transmission and reception of an audio signal, transmission and reception of email or image data, image capturing, and recording of data in various operation modes including an audio call mode, a data communication mode, an image capturing mode, and a videophone mode.

An analogue audio signal generated by the microphone 925 is supplied to the audio codec 923 in the audio call mode. The audio codec 923 converts the analogue audio signal into audio data, has the converted audio data subjected to the A/D conversion, and compresses the converted data. The audio codec 923 then outputs the compressed audio data to the communication section 922. The communication section 922 encodes and modulates the audio data, and generates a transmission signal. The communication section 922 then transmits the generated transmission signal to a base station (not illustrated) via the antenna 921. The communication section 922 also amplifies a wireless signal received via the antenna 921 and converts the frequency of the wireless signal to acquire a received signal. The communication section 922 then demodulates and decodes the received signal, generates audio data, and outputs the generated audio data to the audio codec 923. The audio codec 923 extends the audio data, has the audio data subjected to the D/A conversion, and generates an analogue audio signal. The audio codec 923 then supplies the generated audio signal to the speaker 924 to output a sound.

The control section 931 also generates text data in accordance with an operation made by a user via the operation section 932, the text data, for example, composing email. Moreover, the control section 931 causes the display section 930 to display the text. Furthermore, the control section 931 generates email data in accordance with a transmission instruction from a user via the operation section 932, and outputs the generated email data to the communication section 922. The communication section 922 encodes and modulates the email data, and generates a transmission signal. The communication section 922 then transmits the generated transmission signal to a base station (not illustrated) via the antenna 921. The communication section 922 also amplifies a wireless signal received via the antenna 921 and converts the frequency of the wireless signal to acquire a received signal. The communication section 922 then demodulates and decodes the received signal to restore the email data, and outputs the restored email data to the control section 931. The control section 931 causes the display section 930 to display the content of the email, and also causes the storage medium of the recording/reproduction section 929 to store the email data.

The recording/reproduction section 929 includes a readable and writable storage medium. For example, the storage medium may be a built-in storage medium such as RAM and flash memory, or an externally mounted storage medium such as hard disks, magnetic disks, magneto-optical disks, optical discs, universal serial bus (USB) memory, and memory cards.

Furthermore, the camera section 926, for example, captures an image of a subject to generate image data, and outputs the generated image data to the image processing section 927 in the image capturing mode. The image processing section 927 encodes the image data input from the camera section 926, and causes the storage medium of the recording/reproduction section 929 to store the encoded stream.

Furthermore, the demultiplexing section 928, for example, multiplexes a video stream encoded by the image processing section 927 and an audio stream input from the audio codec 923, and outputs the multiplexed stream to the communication section 922 in the videophone mode. The communication section 922 encodes and modulates the stream, and generates a transmission signal. The communication section 922 then transmits the generated transmission signal to a base station (not illustrated) via the antenna 921. The communication section 922 also amplifies a wireless signal received via the antenna 921 and converts the frequency of the wireless signal to acquire a received signal. These transmission signal and received signal may include an encoded bitstream. The communication section 922 then demodulates and decodes the received signal to restore the stream, and outputs the restored stream to the demultiplexing section 928. The demultiplexing section 928 demultiplexes the input stream to obtain a video stream and an audio stream, and outputs the video stream to the image processing section 927 and the audio stream to the audio codec 923. The image processing section 927 decodes the video stream, and generates video data. The video data is supplied to the display section 930, and a series of images is displayed by the display section 930. The audio codec 923 extends the audio stream, has the audio stream subjected to the D/A conversion, and generates an analogue audio signal. The audio codec 923 then supplies the generated audio signal to the speaker 924, and causes a sound to be output.

In the mobile telephone 920 having the above configuration, the image processing section 927 has the functions of the image decoding device 300 (FIG. 16) according to the above embodiment. Thus, when the mobile telephone 920 encodes and decodes an image, it is possible to suppress a load increase.

<Third Application: Recording/Reproduction Device>

Figure 30:
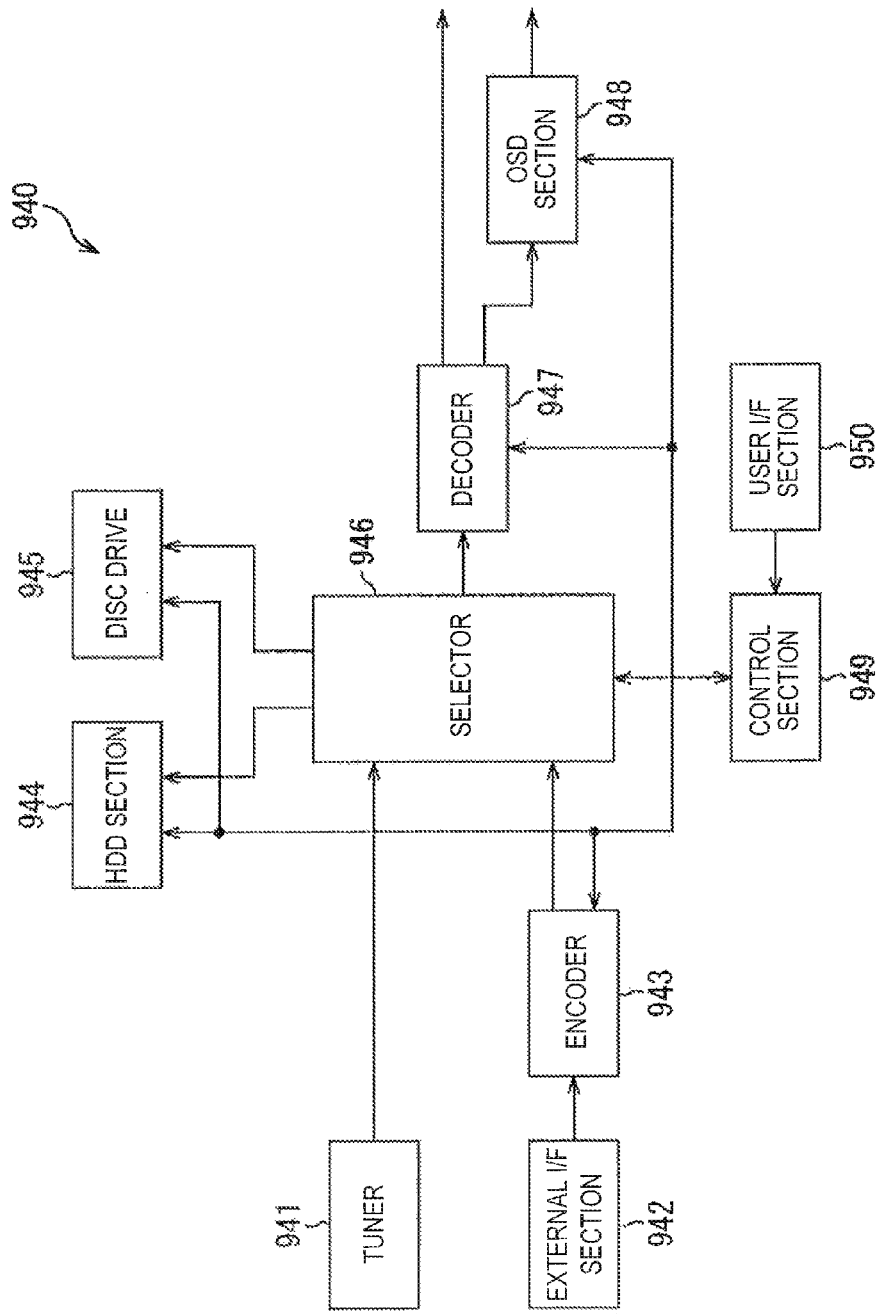
FIG. 30 is a block diagram illustrating an example of a schematic configuration of a recording/reproduction device.

FIG. 30 illustrates an example of a schematic configuration of a recording/reproduction device to which the embodiment is applied. A recording/reproduction device 940, for example, encodes audio data and video data of a received broadcast program and records the encoded audio data and the encoded video data in a recording medium. For example, the recording/reproduction device 940 may also encode audio data and video data acquired from another device and record the encoded audio data and the encoded video data in a recording medium. Furthermore, the recording/reproduction device 940, for example, uses a monitor or a speaker to reproduce the data recorded in the recording medium in accordance with an instruction of a user. At this time, the recording/reproduction device 940 decodes the audio data and the video data.

The recording/reproduction device 940 includes a tuner 941, an external interface (I/F) section 942, an encoder 943, a hard disk drive (HDD) 944, a disc drive 945, a selector 946, a decoder 947, an on-screen display (OSD) 948, a control section 949, and a user interface (I/F) section 950.

The tuner 941 extracts a signal of a desired channel from broadcast signals received via an antenna (not shown), and demodulates the extracted signal. The tuner 941 then outputs an encoded bitstream obtained through the demodulation to the selector 946. That is, the tuner 941 serves as a transmission unit of the recording/reproduction device 940.

The external interface section 942 is an interface for connecting the recording/reproduction device 940 to an external device or a network. For example, the external interface section 942 may be an IEEE 1394 interface, a network interface, an USB interface, a flash memory interface, or the like. For example, video data and audio data received via the external interface section 942 are input to the encoder 943. That is, the external interface section 942 serves as a transmission unit of the recording/reproduction device 940.

When the video data and the audio data input from the external interface section 942 have not been encoded, the encoder 943 encodes the video data and the audio data. The encoder 943 then outputs an encoded bitstream to the selector 946.

The HDD 944 records, in an internal hard disk, the encoded bitstream in which content data of a video and a sound is compressed, various programs, and other pieces of data. The HDD 944 also reads out these pieces of data from the hard disk at the time of reproducing a video or a sound.

The disc drive 945 records and reads out data in a recording medium that is mounted. The recording medium that is mounted on the disc drive 945 may be, for example, a DVD disc (DVD-Video, DVD-RAM, DVD-R, DVD-RW, a DVD+R, DVD+RW, etc.), a Blu-ray (registered trademark) disc, or the like.

The selector 946 selects, at the time of recording a video or a sound, an encoded bitstream input from the tuner 941 or the encoder 943, and outputs the selected encoded bitstream to the HDD 944 or the disc drive 945. The selector 946 also outputs, at the time of reproducing a video or a sound, an encoded bitstream input from the HDD 944 or the disc drive 945 to the decoder 947.

The decoder 947 decodes the encoded bitstream, and generates video data and audio data. The decoder 947 then outputs the generated video data to the OSD 948. The decoder 947 also outputs the generated audio data to an external speaker.

The OSD 948 reproduces the video data input from the decoder 947, and displays a video. The OSD 948 may also superimpose an image of a GUI such as a menu, a button, and a cursor on a displayed video.

The control section 949 includes a processor such as a CPU, and a memory such as RAM and ROM. The memory stores a program to be executed by the CPU, program data, and the like. For example, a program stored in the memory is read out and executed by the CPU at the time of activation of the recording/reproduction device 940. The CPU controls the operation of the recording/reproduction device 940, for example, in accordance with an operation signal input from the user interface section 950 by executing the program.

The user interface section 950 is connected to the control section 949. The user interface section 950 includes, for example, a button and a switch used for a user to operate the recording/reproduction device 940, and a receiving section for a remote control signal. The user interface section 950 detects an operation made by a user via these structural elements, generates an operation signal, and outputs the generated operation signal to the control section 949.

In the recording/reproducing device 940 having the above configuration, the decoder 947 has the function of the image decoding device 300 (FIG. 16) according to the above embodiment. Thus, when the recording/reproducing device 940 encodes and decodes an image, it is possible to suppress a load increase.

<Fourth Application: Image Capturing Device>

Figure 31:
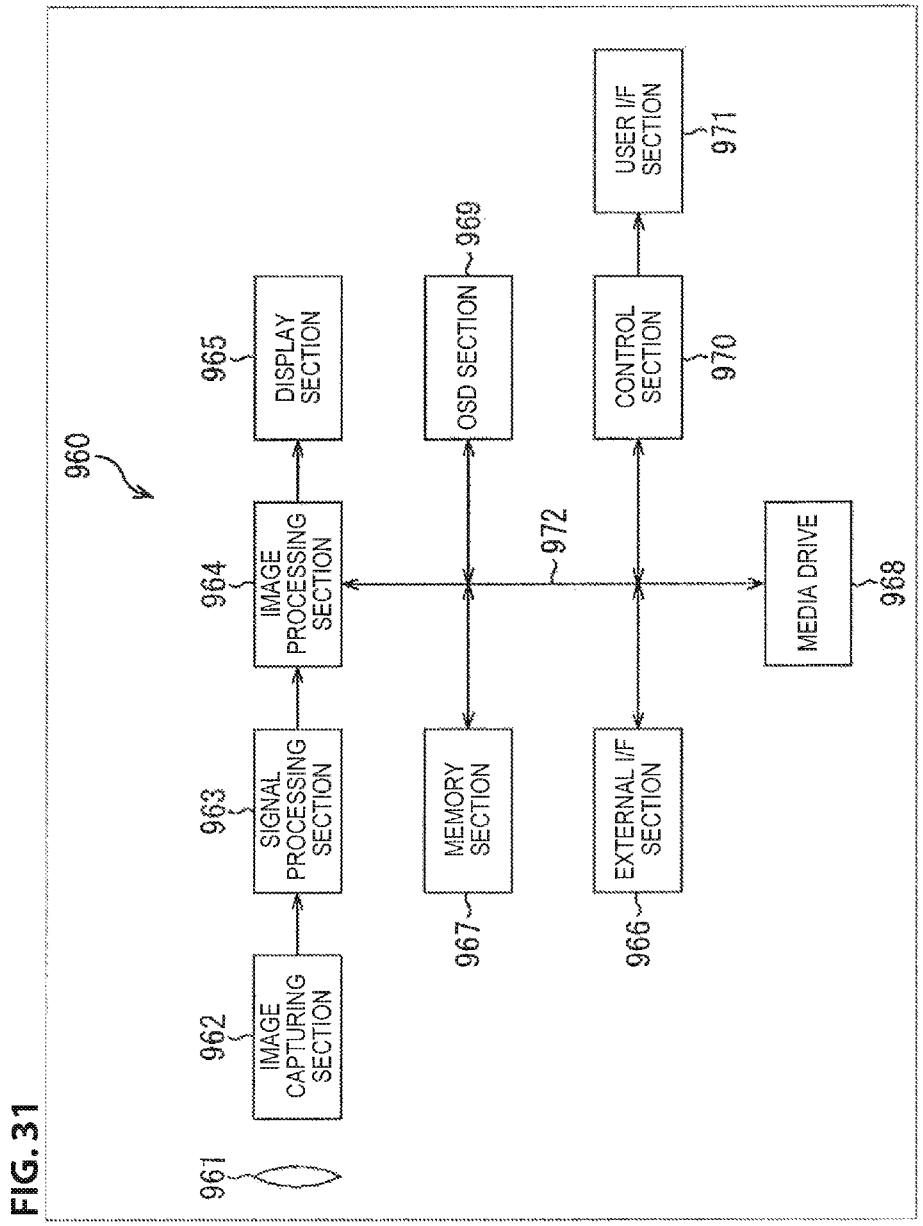
FIG. 31 is a block diagram illustrating an example of a schematic configuration of an image capturing device.

FIG. 31 illustrates an example of a schematic configuration of an image capturing device to which the embodiment is applied. An image capturing device 960 captures an image of a subject to generate an image, encodes the image data, and records the image data in a recording medium.

The image capturing device 960 includes an optical block 961, an image capturing section 962, a signal processing section 963, an image processing section 964, a display section 965, an external interface (I/F) section 966, a memory 967, a media drive 968, an OSD 969, a control section 970, a user interface (I/F) section 971, and a bus 972.

The optical block 961 is connected to the image capturing section 962. The image capturing section 962 is connected to the signal processing section 963. The display section 965 is connected to the image processing section 964. The user interface section 971 is connected to the control section 970. The bus 972 connects the image processing section 964, the external interface section 966, the memory 967, the media drive 968, the OSD 969, and the control section 970 to each other.

The optical block 961 includes a focus lens, an aperture stop mechanism, and the like. The optical block 961 forms an optical image of a subject on an image capturing surface of the image capturing section 962. The image capturing section 962 includes an image sensor such as a charge coupled device (CCD) and a complementary metal oxide semiconductor (CMOS), and converts the optical image formed on the image capturing surface into an image signal which is an electrical signal through photoelectric conversion. The image capturing section 962 then outputs the image signal to the signal processing section 963.

The signal processing section 963 performs various camera signal processes such as knee correction, gamma correction, and color correction on the image signal input from the image capturing section 962. The signal processing section 963 outputs the image data subjected to the camera signal process to the image processing section 964.

The image processing section 964 encodes the image data input from the signal processing section 963, and generates encoded data. The image processing section 964 then outputs the generated encoded data to the external interface section 966 or the media drive 968. The image processing section 964 also decodes encoded data input from the external interface section 966 or the media drive 968, and generates image data. The image processing section 964 then outputs the generated image data to the display section 965. The image processing section 964 may also output the image data input from the signal processing section 963 to the display section 965, and cause the image to be displayed. Furthermore, the image processing section 964 may superimpose data for display acquired from the OSD 969 on an image to be output to the display section 965.

The OSD 969 generates an image of a GUI such as a menu, a button, and a cursor, and outputs the generated image to the image processing section 964.

The external interface section 966 is configured, for example, as an USB input and output terminal. The external interface section 966 connects the image capturing device 960 and a printer, for example, at the time of printing an image. A drive is further connected to the external interface section 966 as needed. A removable medium such as magnetic disks and optical discs is mounted on the drive, and a program read out from the removable medium may be installed in the image capturing device 960. Furthermore, the external interface section 966 may be configured as a network interface to be connected to a network such as a LAN and the Internet. That is, the external interface section 966 serves as a transmission unit of the image capturing device 960.

A recording medium to be mounted on the media drive 968 may be a readable and writable removable medium such as magnetic disks, magneto-optical disks, optical discs, and semiconductor memory. The recording medium may also be fixedly mounted on the media drive 968, configuring a non-transportable storage section such as built-in hard disk drives or solid state drives (SSDs).

The control section 970 includes a processor such as a CPU, and a memory such as a RAM and a ROM. The memory stores a program to be executed by the CPU, program data, and the like. A program stored in the memory is read out and executed by the CPU, for example, at the time of activation of the image capturing device 960. The CPU controls the operation of the image capturing device 960, for example, in accordance with an operation signal input from the user interface section 971 by executing the program.

The user interface section 971 is connected to the control section 970. The user interface section 971 includes, for example, a button, a switch, and the like used for a user to operate the image capturing device 960. The user interface section 971 detects an operation made by a user via these structural elements, generates an operation signal, and outputs the generated operation signal to the control section 970.

In the imaging device 960 having the above configuration, the image processing section 964 has the functions of the image decoding device 300 (FIG. 16) according to the above embodiment. Thus, when the imaging device 960 encodes and decodes an image, it is possible to suppress a load increase.

8. Application Example of Scalable Video Coding

<First System>

Next, a specific example of using scalable encoded data, in which a scalable video coding (layered image encoding) is performed, will be described. The scalable video coding, for example, is used for selection of data to be transmitted as examples illustrated in FIG. 32.

Figure 32:
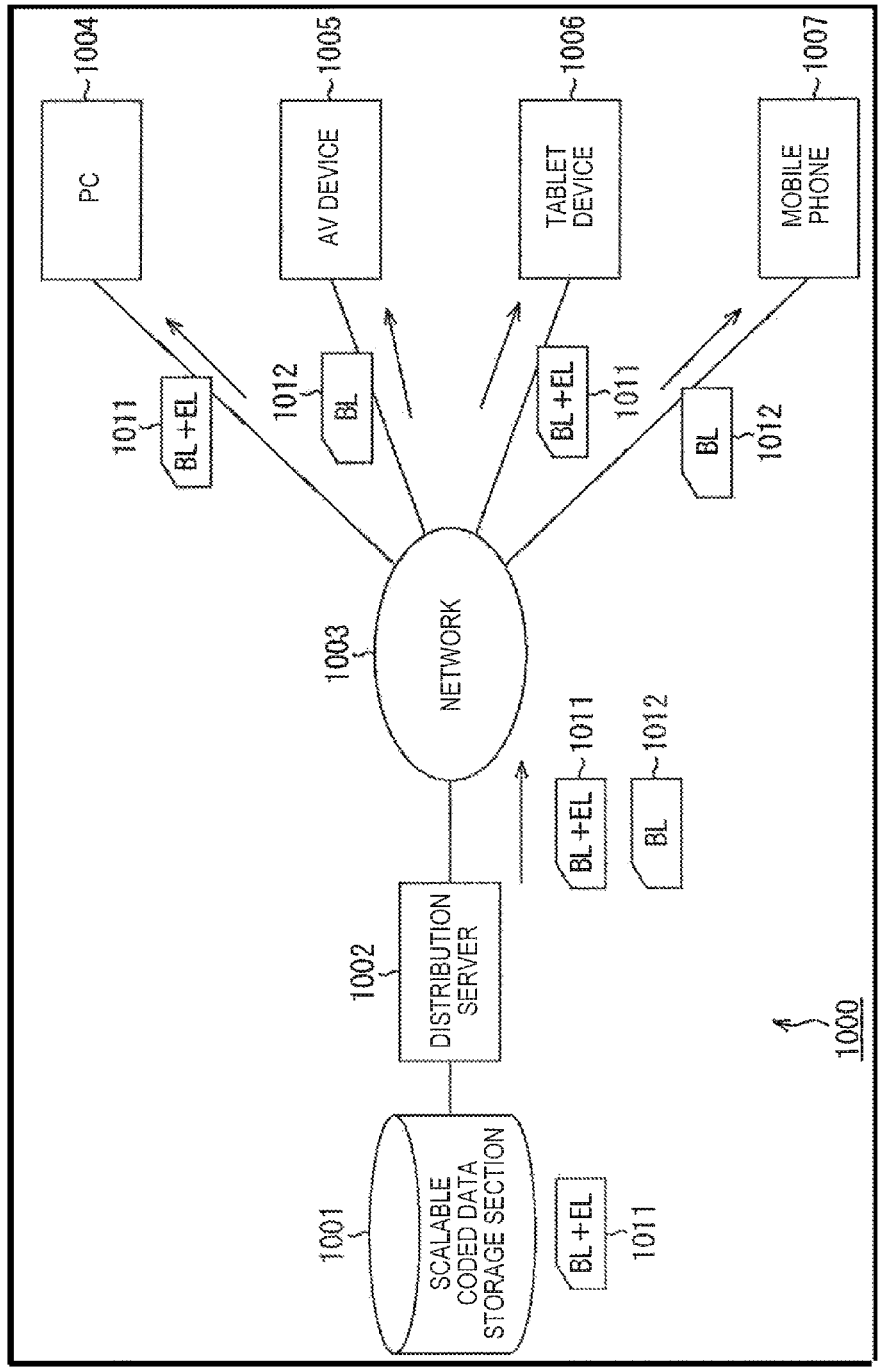
FIG. 32 is a block diagram illustrating an example of using scalable video coding.

In a data transmission system 1000 illustrated in FIG. 32, a distribution server 1002 reads scalable encoded data stored in a scalable encoded data storage section 1001, and distributes the scalable encoded data to a terminal device such as a personal computer 1004, an AV device 1005, a tablet device 1006, or a mobile phone 1007 via a network 1003.

At this time, the distribution server 1002 selects and transmits encoded data having proper quality according to capability of the terminal device, communication environment, or the like. Even when the distribution server 1002 transmits unnecessarily high-quality data, a high-quality image is not necessarily obtainable in the terminal device and it may be a cause of occurrence of a delay or an overflow. In addition, a communication band may be unnecessarily occupied or a load of the terminal device may be unnecessarily increased. In contrast, even when the distribution server 1002 transmits unnecessarily low quality data, an image with a sufficient quality may not be obtained. Thus, the distribution server 1002 appropriately reads and transmits the scalable encoded data stored in the scalable encoded data storage section 1001 as the encoded data having a proper quality according to the capability of the terminal device, the communication environment, or the like.

For example, the scalable encoded data storage section 1001 is configured to store scalable encoded data (BL+EL) 1011 in which the scalable video coding is performed. The scalable encoded data (BL+EL) 1011 is encoded data including both a base layer and an enhancement layer, and is data from which a base layer image and an enhancement layer image can be obtained by performing decoding.

The distribution server 1002 selects an appropriate layer according to the capability of the terminal device for transmitting data, the communication environment, or the like, and reads the data of the selected layer. For example, with respect to the personal computer 1004 or the tablet device 1006 having high processing capability, the distribution server 1002 reads the scalable encoded data (BL+EL) 1011 from the scalable encoded data storage section 1001, and transmits the scalable encoded data (BL+EL) 1011 without change. On the other hand, for example, with respect to the AV device 1005 or the mobile phone 1007 having low processing capability, the distribution server 1002 extracts the data of the base layer from the scalable encoded data (BL+EL) 1011, and transmits the extracted data of the base layer as low quality scalable encoded data (BL) 1012 that is data having the same content as the scalable encoded data (BL+EL) 1011 but has lower quality than the scalable encoded data (BL+EL) 1011.

Because an amount of data can easily be adjusted by employing the scalable encoded data, the occurrence of the delay or the overflow can be suppressed or the unnecessary increase of the load of the terminal device or the communication media can be suppressed. In addition, because a redundancy between the layers is reduced in the scalable encoded data (BL+EL) 1011, it is possible to further reduce the amount of data than when the encoded data of each layer is treated as the individual data. Therefore, it is possible to more efficiently use the storage region of the scalable encoded data storage section 1001.

Because various devices such as the personal computer 1004 to the mobile phone 1007 are applicable as the terminal device, the hardware performance of the terminal devices differs according to the device. In addition, because there are various applications which are executed by the terminal device, the software performance thereof also varies. Further, because all the communication networks including a wired, wireless, or both such as the Internet and the local area network (LAN) are applicable as the network 1003 serving as a communication medium, the data transmission performance thereof varies. Further, the data transmission performance may vary by other communications, or the like.

Therefore, the distribution server 1002 may perform communication with the terminal device which is the data transmission destination before starting the data transmission, and then obtain information related to the terminal device performance such as hardware performance of the terminal device, or the application (software) performance which is executed by the terminal device, and information related to the communication environment such as an available bandwidth of the network 1003. Then, distribution server 1002 may select an appropriate layer based on the obtained information.

Also, the extraction of the layer may be performed in the terminal device. For example, the personal computer 1004 may decode the transmitted scalable encoded data (BL+EL) 1011 and display the image of the base layer or display the image of the enhancement layer. In addition, for example, the personal computer 1004 may be configured to extract the scalable encoded data (BL) 1012 of the base layer from the transmitted scalable encoded data (BL+EL) 1011, store the extracted scalable encoded data (BL) 1012 of the base layer, transmit to another device, or decode and display the image of the base layer.

Of course, the number of the scalable encoded data storage sections 1001, the distribution servers 1002, the networks 1003, and the terminal devices are optional. In addition, although the example of the distribution server 1002 transmitting the data to the terminal device is described above, the example of use is not limited thereto. The data transmission system 1000 is applicable to any system which selects and transmits an appropriate layer according to the capability of the terminal device, the communication environment, or the like when the scalable encoded data is transmitted to the terminal device.

In addition, by applying the present technology to the data transmission system 1000 such as FIG. 32 described above in the same way as the application to the scalable video coding and scalable video decoding as explained with reference to FIGS. 21 to 26, the same effect as that described with reference to FIGS. 21 to 26 can be obtained.

<Second System>

Figure 33:
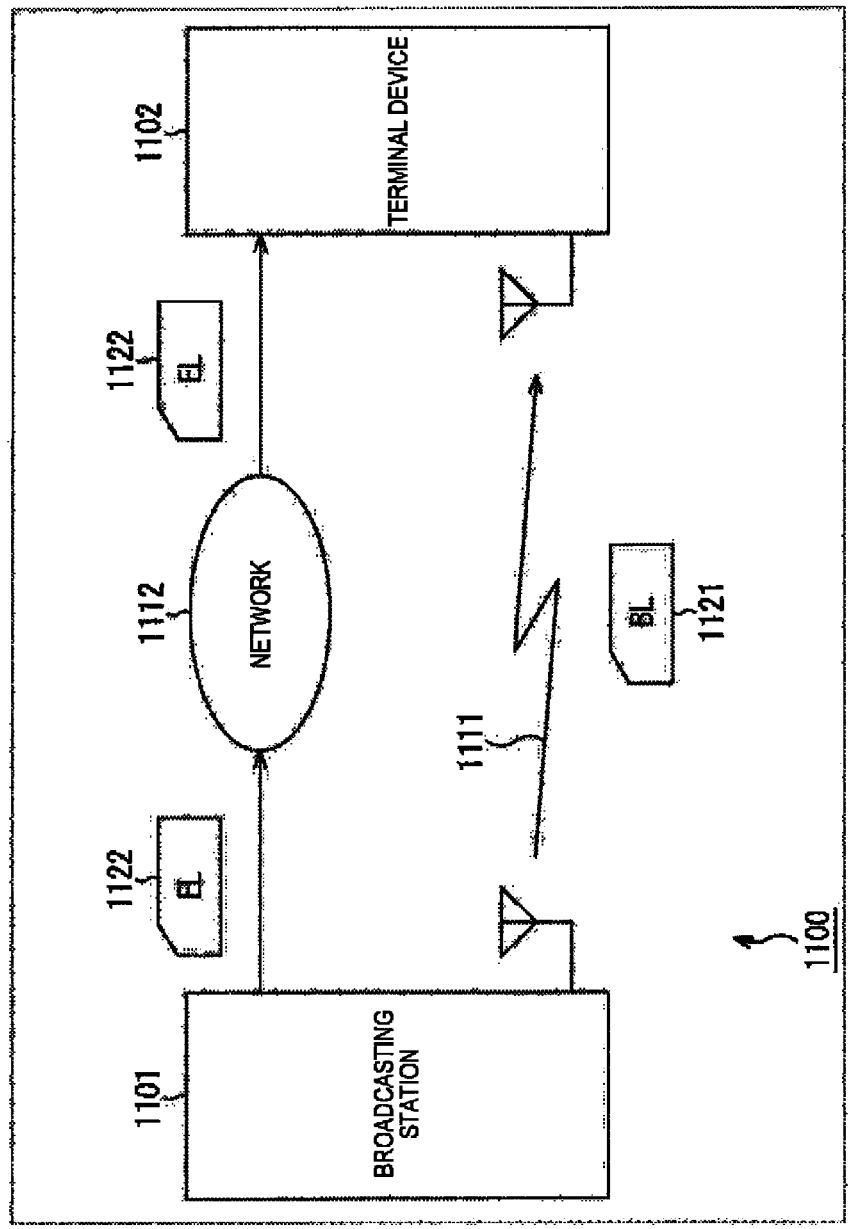
FIG. 33 is a block diagram illustrating another example of using scalable video coding.

In addition, the scalable video coding, for example, is used for transmission via a plurality of communication media as in an example illustrated in FIG. 33.

In a data transmission system 1100 illustrated in FIG. 43, a broadcasting station 1101 transmits scalable encoded data (BL) 1121 of the base layer by terrestrial broadcasting 1111. In addition, the broadcasting station 1101 transmits scalable encoded data (EL) 1122 of the enhancement layer via any arbitrary network 1112 made of a communication network that is wired, wireless, or both (for example, the data is packetized and transmitted).

A terminal device 1102 has a function of receiving the terrestrial broadcasting 111 that is broadcast by the broadcasting station 1101 and receives the scalable encoded data (BL) 1121 of the base layer transmitted via the terrestrial broadcasting 1111. In addition, the terminal device 1102 further has a communication function by which the communication is performed via the network 1112, and receives the scalable encoded data (EL) 1122 of the enhancement layer transmitted via the network 1112.

For example, according to a user's instruction or the like, the terminal device 1102 decodes the scalable encoded data (BL) 1121 of the base layer acquired via the terrestrial broadcasting 1111, thereby obtaining or storing the image of the base layer or transmitting the image of the base layer to other devices.

In addition, for example, according to the user's instruction, the terminal device 1102 combines the scalable encoded data (BL) 1121 of the base layer acquired via the terrestrial broadcasting 1111 and the scalable encoded data (EL) 1122 of the enhancement layer acquired via the network 1112, thereby obtaining the scalable encoded data (BL+EL), obtaining or storing the image of the enhancement layer by decoding the scalable encoded data (BL+EL), or transmitting the image of the enhancement layer to other devices.

As described above, the scalable encoded data, for example, can be transmitted via the different communication medium for each layer. Therefore, it is possible to disperse the load and suppress the occurrence of the delay or the overflow.

In addition, according to the situation, the communication medium used for the transmission for each layer may be configured to be selected. For example, the scalable encoded data (BL) 1121 of the base layer in which the amount of data is comparatively large may be transmitted via the communication medium having a wide bandwidth, and the scalable encoded data (EL) 1122 of the enhancement layer in which the amount of data is comparatively small may be transmitted via the communication media having a narrow bandwidth. In addition, for example, whether the communication medium that transmits the scalable encoded data (EL) 1122 of the enhancement layer is the network 1112 or the terrestrial broadcasting 1111 may be switched according to the available bandwidth of the network 1112. Of course, the same is true for data of an arbitrary layer.

By controlling in this way, it is possible to further suppress the increase of the load in the data transmission.

Of course, the number of the layers is optional, and the number of communication media used in the transmission is also optional. In addition, the number of terminal devices 1102 which are the destination of the data distribution is also optional. Further, although the example of the broadcasting from the broadcasting station 1101 has been described above, the use example is not limited thereto. The data transmission system 1100 can be applied to any system which divides the scalable encoded data using a layer as a unit and transmits the scalable encoded data via a plurality of links.

In addition, by applying the present technology to the data transmission system 1100 such as FIG. 33 described above in the same way as the application to the scalable video coding and scalable video decoding as described with reference to FIGS. 21 to 26, the same effect as that described with reference to FIGS. 21 to 26 can be obtained.

<Third System>

In addition, the scalable video coding is used in the storage of the encoded data as an example illustrated in FIG. 34.

In an image capturing system 1200 illustrated in FIG. 34, an image capturing device 1201 performs scalable video coding on image data obtained by capturing an image of a subject 1211, and supplies a scalable video result as the scalable encoded data (BL+EL) 1221 to a scalable encoded data storage device 1202.

The scalable encoded data storage device 1202 stores the scalable encoded data (BL+EL) 1221 supplied from the image capturing device 1201 in quality according to the situation. For example, in the case of normal circumstances, the scalable encoded data storage device 1202 extracts data of the base layer from the scalable encoded data (BL+EL) 1221, and stores the extracted data as scalable encoded data (BL) 1222 of the base layer having a small amount of data at low quality. On the other hand, for example, in the case of notable circumstances, the scalable encoded data storage device 1202 stores the scalable encoded data (BL+EL) 1221 having a large amount of data at high quality without change.

In this way, because the scalable encoded data storage device 1202 can save the image at high quality only in a necessary case, it is possible to suppress the decrease of the value of the image due to the deterioration of the image quality and suppress the increase of the amount of data, and it is possible to improve the use efficiency of the storage region.

For example, the image capturing device 1201 is assumed to be a motoring camera. Because content of the captured image is unlikely to be important when a monitoring subject (for example, an invader) is not shown in the imaged image (in the case of the normal circumstances), the priority is on the reduction of the amount of data, and the image data (scalable encoded data) is stored at low quality. On the other hand, because the content of the imaged image is likely to be important when a monitoring target is shown as the subject 1211 in the imaged image (in the case of the notable circumstances), the priority is on the image quality, and the image data (scalable encoded data) is stored at high quality.

For example, whether the case is the case of the normal circumstances or the notable circumstances may be determined by the scalable encoded data storage device 1202 by analyzing the image. In addition, the image capturing device 1201 may be configured to make the determination and transmit the determination result to the scalable encoded data storage device 1202.

A determination criterion of whether the case is the case of the normal circumstances or the notable circumstances is optional and the content of the image which is the determination criterion is optional. Of course, a condition other than the content of the image can be designated as the determination criterion. For example, switching may be configured to be performed according to the magnitude or waveform of recorded sound, by a predetermined time interval, or by an external instruction such as the user's instruction.

In addition, although the two states of the normal circumstances and the notable circumstances have been described above, the number of the states is optional, and for example, switching may be configured to be performed among three or more states such as normal circumstances, slightly notable circumstances, notable circumstances, and highly notable circumstances. However, the upper limit number of states to be switched depends upon the number of layers of the scalable encoded data.

In addition, the image capturing device 1201 may determine the number of layers of the scalable video coding according to the state. For example, in the case of the normal circumstances, the image capturing device 1201 may generate the scalable encoded data (BL) 1222 of the base layer having a small amount of data at low quality and supply the data to the scalable encoded data storage device 1202. In addition, for example, in the case of the notable circumstances, the image capturing device 1201 may generate the scalable encoded data (BL+EL) 1221 of the base layer having a large amount of data at high quality and supply the data to the scalable encoded data storage device 1202.

Although the monitoring camera has been described above as the example, the usage of the image capturing system 1200 is optional and is not limited to the monitoring camera.

In addition, by applying the present technology to the image capturing system 1200 such as FIG. 34 described above in the same way as the application to the scalable video coding and scalable video decoding as described with reference to FIGS. 21 to 26, the same effect as that described with reference to FIGS. 21 to 26 can be obtained.

The present technology can also be applied to a system of selecting appropriate data from among a plurality of pieces of encoded data having different resolutions that are prepared in advance in units of segments and using the selected data, for example, HTTP streaming such as MPEG DASH. That is, information on encoding and decoding can be shared between pieces of such encoded data.

Further, in this specification, the example in which various kinds of information are multiplexed into an encoded stream and transmitted from the encoding side to the decoding side has been described. However, a technique of transmitting the information is not limited to this example. For example, the information may be transmitted or recorded as individual data associated with an encoded bitstream without being multiplexed in the encoded stream. Here, the term "associate" refers to that an image included in the bitstream (which may be part of an image such a slice or a block) and information corresponding to the image is configured to be linked at the time of decoding. That is, the information may be transmitted on a separate transmission path from an image (or bitstream). In addition, the information may be recorded on a separate recording medium (or a separate recording area of the same recording medium) from the image (or bitstream). Further, the information and the image (or the bitstream), for example, may be associated with each other in an arbitrary unit such as a plurality of frames, one frame, or a portion within the frame.

The preferred embodiments of the present disclosure have been described above with reference to the accompanying drawings, whilst the present invention is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)
An image decoding device including:
a decoding section configured to decode encoded data obtained by encoding image data for each of a plurality of certain areas obtained by dividing a picture using a plurality of blocks obtained by dividing the area as processing units, for each of the areas;
a reordering section configured to reorder decoding results of the encoded data of the respective blocks obtained for the respective areas by the decoding section in a raster scan order of the entire picture; and
a transform section configured to transform the decoding results of the respective blocks reordered in the raster scan order of the entire picture by the reordering section and generate decoded image data.

(2)
The image decoding device according to any one of (1), (3) to (14),
wherein the area is a tile or a slice.

(3)
The image decoding device according to any one of (1), (2), (4) to (14),
wherein the reordering section includes a storage section configured to store the decoding results, and reorders the decoding results of e the respective blocks by storing the decoding results of the respective blocks obtained for the respective areas by the decoding section in the storage section, and reading the decoding results of the respective blocks from the storage section in the raster scan order of the entire picture.

(4)
The image decoding device according to any one of (1) to (3) and (5) to (14),
wherein the storage section allocates a fixed length area to each of the blocks, and stores the decoding result of each of the blocks at an address corresponding to a position of each of the blocks in the picture.

(5)
The image decoding device according to any one of (1) to (4) and (6) to (14),
wherein the storage section sequentially stores the decoding results of the respective blocks, and manages start addresses of the decoding results of the respective blocks.

(6)

The image decoding device according to any one of (1) to (5) and (7) to (14), wherein the storage section sequentially stores the decoding results of the respective blocks, and manages start addresses of the decoding results of the respective blocks at left ends of the respective areas.

(7)

The image decoding device according to any one of (1) to (6) and (8) to (14), further including a filter section configured to sequentially perform a filter process on the decoded image data of the respective blocks generated by the transform section.

(8)

The image decoding device according to any one of (1) to (7) and (9) to (14), wherein the filter process is a deblock filter process.

(9)

The image decoding device according to any one of (1) to (8) and (10) to (14), wherein the encoded data is data obtained by encoding differential image data serving as data of a differential image between an image of the image data and a prediction image, the decoding section obtains the differential image data as the decoding result by decoding the encoded data, and the transform section transforms the differential image data into the decoded image data by generating the prediction image and adding the generated prediction image to the differential image of the differential image data.

(10)

The image decoding device according to any one of (1) to (9) and (11) to (14), wherein the encoded data is data obtained by encoding coefficient data obtained by performing an orthogonal transform on the differential image data, the decoding section obtains the coefficient data as the decoding result by decoding the encoded data, and the transform section transforms the coefficient image data into the decoded image data by performing an inverse orthogonal transform on the coefficient data to generate the differential image data, generating the prediction image, and adding the generated prediction image to the differential image of the generated differential image data.

(11)

The image decoding device according to any one of (1) to (10) and (12) to (14), wherein the encoded data is data obtained by encoding quantization coefficient data obtained by quantizing the coefficient data, the decoding section obtains the quantization coefficient data as the decoding result by decoding the encoded data, and the transform section transforms the quantization coefficient image data into the decoded image data by performing inverse quantization on the quantization coefficient data to generate the coefficient data, performing an inverse orthogonal transform on the generated coefficient data to generate the differential image data, generating the prediction image, and adding the generated prediction image to the differential image of the generated differential image data.

(12)

The image decoding device according to any one of (1) to (11), (13), and (14), wherein the decoding section performs lossless decoding on the encoded data.

(13)

The image decoding device according to any one of (1) to (12) and (14), wherein the decoding section performs variable length decoding on the encoded data.

(14)

The image decoding device according to any one of (1) to (13), wherein the decoding section performs arithmetic decoding on the encoded data.

(15)

An image decoding method including:

decoding encoded data obtained by encoding image data for each of a plurality of certain areas obtained by dividing a picture using a plurality of blocks obtained by dividing the area as processing units, for each of the areas;

reordering decoding results of the encoded data of the respective blocks obtained for the respective areas in a raster scan order of the entire picture; and transforming the decoding results of the respective blocks reordered in the raster scan order of the entire picture and generating decoded image data.

REFERENCE SIGNS LIST

100 Image encoding device
300 Image decoding device
301 Accumulation buffer
302 Lossless decoding section
303 Inverse quantization section
304 Inverse orthogonal transform section
305 Operation section
306 Loop filter
307 Screen reordering buffer
308 D/A conversion section
309 Frame memory
310 Intra prediction section
311 Inter prediction section
312 Prediction image selecting section
321 Reordering buffer

The invention claimed is:

1. An image decoding device comprising:
a decoding section configured to perform variable length decoding to decode scalable encoded data obtained by scalable encoding of image data for each area of a plurality of certain areas, wherein the scalable encoding of the image data is obtained by dividing a picture into a plurality of hierarchical layers and using a plurality of respective blocks within respective layers of the plurality of hierarchical layers;
a reordering section configured to reorder variable length decoding results of the scalable encoded data of the respective blocks obtained for each layer of the respective layers by the decoding section in a raster scan order of the entire picture by storing the variable length decoding results of the respective blocks obtained for the respective layers by the decoding section in a scalable storage section that allocates a variable length area to each of the respective blocks, stores the variable length decoding result of each block of the respective blocks at an address corresponding to a position of each of the respective blocks in the picture, and reads the variable length decoding results of the respective blocks from the scalable storage section in the raster scan order of the entire picture; and
a transform section configured to transform the decoding results of the respective blocks reordered in the raster scan order of the entire picture by the reordering section and generate decoded image data, wherein the decoding section, the reordering section, the storage section, and the transform section are each implemented via at least one processor.

2. The image decoding device according to claim 1, wherein each area is a tile or a slice.

3. The image decoding device according to claim 1, wherein the storage section sequentially stores the variable length decoding results of the respective blocks, and manages start addresses of the variable length decoding results of the respective blocks.

4. The image decoding device according to claim 1, wherein the storage section sequentially stores the variable length decoding results of the respective blocks, and manages start addresses of the variable length decoding results of the respective blocks at left ends of the respective blocks for each layer.

5. The image decoding device according to claim 1, further comprising:
a filter section configured to sequentially perform a filter process on the decoded image data of the respective blocks generated by the transform section,
wherein the filter section is implemented via at least one processor.

6. The image decoding device according to claim 5, wherein the filter process is a deblock filter process.

7. The image decoding device according to claim 1, wherein the encoded data is data obtained by encoding differential image data serving as data of a differential image between an image of the image data and a prediction image,
the decoding section obtains the differential image data as the decoding result by decoding the encoded data, and
the transform section transforms the differential image data into the decoded image data by generating the prediction image and adding the generated prediction image to the differential image of the differential image data.

8. The image decoding device according to claim 7, wherein the encoded data is data obtained by encoding coefficient data obtained by performing an orthogonal transform on the differential image data,
the decoding section obtains the coefficient data as the decoding result by decoding the encoded data, and
the transform section transforms the coefficient image data into the decoded image data by performing an inverse orthogonal transform on the coefficient data to generate the differential image data, generating the prediction image, and adding the generated prediction image to the differential image of the generated differential image data.

9. The image decoding device according to claim 8, wherein the encoded data is data obtained by encoding quantization coefficient data obtained by quantizing the coefficient data,
the decoding section obtains the quantization coefficient data as the decoding result by decoding the encoded data, and
the transform section transforms the quantization coefficient image data into the decoded image data by performing inverse quantization on the quantization coefficient data to generate the coefficient data, performing an inverse orthogonal transform on the generated coefficient data to generate the differential image data, generating the prediction image, and adding the generated prediction image to the differential image of the generated differential image data.

10. The image decoding device according to claim 1, wherein the decoding section performs lossless decoding on the encoded data.

11. The image decoding device according to claim 10, wherein the decoding section performs arithmetic decoding on the encoded data.

12. An image decoding method, implemented via at least one processor, the method comprising:
decoding scalable encoded data obtained by scalable encoding of image data for each area of a plurality of certain areas, wherein the scalable encoding of the image data is obtained by dividing a picture into a plurality of hierarchical layers and using a plurality of respective blocks within respective layers of the plurality of hierarchical layers;
reordering variable length decoding results of the scalable encoded data of the respective blocks obtained for each layer of the respective layers in a raster scan order of the entire picture by storing the variable length decoding results of the respective blocks obtained for the respective layers in a scalable storage section that allocates a variable length area to each of the respective blocks, stores the variable length decoding result of each of the respective blocks at an address corresponding to a position of each block of the respective blocks in the picture, and reads the variable length decoding results of the respective blocks from the scalable storage section in the raster scan order of the entire picture; and
transforming the decoding results of the respective blocks reordered in the raster scan order of the entire picture and generating decoded image data.

13. The image decoding device according to claim 1, wherein a number of respective layers of the plurality of hierarchical layers from which the plurality of respective blocks are used to obtain the scalable encoding of the image data is determined based on whether a monitoring target is shown in the picture.

14. The image decoding method according to claim 12, wherein a number of respective layers of the plurality of hierarchical layers from which the plurality of respective blocks are used to obtain the scalable encoding of the image data is determined based on whether a monitoring target is shown in the picture.

* * * * *